US 8,694,455 B2

(12) United States Patent
Eder

(10) Patent No.: US 8,694,455 B2
(45) Date of Patent: Apr. 8, 2014

(54) AUTOMATED RISK TRANSFER SYSTEM

(75) Inventor: Jeffrey Scott Eder, Mill Creek, WA (US)

(73) Assignee: Asset Reliance, Inc., Bothell, WA (US)

( * ) Notice: Subject to any disclaimer, the term of this patent is extended or adjusted under 35 U.S.C. 154(b) by 125 days.

(21) Appl. No.: 13/548,095

(22) Filed: Jul. 12, 2012

(65) Prior Publication Data
US 2012/0303408 A1   Nov. 29, 2012

Related U.S. Application Data

(63) Continuation of application No. 09/688,983, filed on Oct. 17, 2000.

(51) Int. Cl.
*G06N 5/02* (2006.01)
*G06N 99/00* (2010.01)
*G06Q 10/04* (2012.01)
*G06Q 10/06* (2012.01)

(52) U.S. Cl.
CPC ................ *G06N 5/02* (2013.01); *G06N 99/005* (2013.01); *G06Q 10/04* (2013.01); *G06Q 10/06375* (2013.01)
USPC .......................................................... 706/45

(58) Field of Classification Search
CPC ....... G06N 5/02; G06N 99/005; G06Q 10/04; G06Q 10/06375
USPC .......................................................... 706/45
See application file for complete search history.

(56) References Cited

U.S. PATENT DOCUMENTS

| | | | |
|---|---|---|---|
| 3,749,892 A | 7/1973 | Stenning | |
| 3,933,305 A | 1/1976 | Murphy | |
| 4,750,121 A | 6/1988 | Halley et al. | |
| 4,839,804 A | 6/1989 | Roberts et al. | |
| 4,989,141 A | 1/1991 | Lyons | |
| 5,128,861 A | 7/1992 | Kagami | |
| 5,148,365 A | 9/1992 | Dembo | |

(Continued)

FOREIGN PATENT DOCUMENTS

| | | |
|---|---|---|
| EP | 0 587 290 A2 | 3/1994 |
| GB | 2 253 081 A | 2/1992 |
| WO | WO 98 38 588 | 9/1998 |

OTHER PUBLICATIONS

Petruş el, et al., Implementing a Decision-Aware System for Loan Contracting Decision Process, Informatica Economică, 2011, pp. 1-15.*

(Continued)

*Primary Examiner* — Wilbert L Starks

(57) ABSTRACT

An automated method, computer program product and system for using artificial intelligence based cognitive learning methods to identify, measure and manage risks for a commercial enterprise on a continual basis. The elements of value, external factors, components of value and categories of value of the enterprise are analyzed and modeled using predictive models that are developed by learning from the data associated with said enterprise. Scenarios of both normal and extreme situations are also developed by learning from the data. The scenarios are then used to drive simulations of the predictive models. The output from these simulations are then used to measure a plurality of risks and complete optimization analyzes that identify the optimal mix of risk reduction activities for the enterprise. The optimal mix of risk reduction activities is then presented to the user for optional editing, rejection or acceptance.

20 Claims, 17 Drawing Sheets

(56) References Cited

U.S. PATENT DOCUMENTS

| | | |
|---|---|---|
| 5,191,522 A | 3/1993 | Bosco et al. |
| 5,193,055 A | 3/1993 | Brown |
| 5,224,034 A | 6/1993 | Katz |
| 5,237,495 A | 8/1993 | Morii |
| 5,237,946 A | 8/1993 | Copson |
| 5,311,421 A | 5/1994 | Nomura et al. |
| 5,317,504 A | 5/1994 | Nakayama |
| 5,361,201 A | 11/1994 | Jost et al. |
| 5,377,116 A | 12/1994 | Wayne et al. |
| 5,406,477 A | 4/1995 | Harhen |
| 5,414,621 A | 5/1995 | Hough |
| 5,435,565 A | 7/1995 | Benaderet |
| 5,471,611 A | 11/1995 | McGregor |
| 5,542,420 A | 8/1996 | Goldman et al. |
| 5,644,727 A | 7/1997 | Atkins |
| 5,649,181 A | 7/1997 | French et al. |
| 5,668,591 A | 9/1997 | Shintani |
| 5,680,305 A | 10/1997 | Apgar |
| 5,704,045 A | 12/1997 | King et al. |
| 5,704,055 A | 12/1997 | George et al. |
| 5,706,495 A | 1/1998 | Chadha et al. |
| 5,737,581 A | 4/1998 | Keane |
| 5,742,775 A | 4/1998 | King |
| 5,768,475 A | 6/1998 | Godbole et al. |
| 5,774,761 A | 6/1998 | Rai |
| 5,774,873 A | 6/1998 | Berent |
| 5,774,881 A | 6/1998 | Friend et al. |
| 5,794,219 A | 8/1998 | Brown |
| 5,799,287 A | 8/1998 | Dembo |
| 5,802,501 A | 9/1998 | Graff |
| 5,806,047 A | 9/1998 | Hackel et al. |
| 5,809,282 A | 9/1998 | Cooper |
| 5,812,404 A | 9/1998 | Hamalainen et al. |
| 5,812,987 A | 9/1998 | Luskin et al. |
| 5,812,988 A | 9/1998 | Sandretto |
| 5,819,237 A | 10/1998 | Garman |
| 5,825,653 A | 10/1998 | Huovila et al. |
| 5,852,811 A | 12/1998 | Atkins |
| 5,875,431 A | 2/1999 | Heckman et al. |
| 5,889,823 A | 3/1999 | Agazzi et al. |
| 5,933,345 A | 8/1999 | Martin et al. |
| 5,938,594 A | 8/1999 | Poon et al. |
| 5,950,182 A | 9/1999 | Godbole et al. |
| 5,951,300 A | 9/1999 | Brown |
| 5,985,559 A | 11/1999 | Brown |
| 6,014,629 A | 1/2000 | DeBruin-Ashton |
| 6,032,119 A | 2/2000 | Brown et al. |
| 6,064,971 A | 5/2000 | Hartnett |
| 6,064,972 A | 5/2000 | Jankowitz et al. |
| 6,078,901 A | 6/2000 | Ching |
| 6,092,056 A | 7/2000 | Tull, Jr. et al. |
| 6,112,188 A | 8/2000 | Hartnett |
| 6,125,355 A | 9/2000 | Bekaert et al. |
| 6,134,536 A | 10/2000 | Shepherd |
| 6,148,293 A | 11/2000 | King |
| 6,173,276 B1 | 1/2001 | Kant |
| 6,189,011 B1 | 2/2001 | Lim et al. |
| 6,207,936 B1 | 3/2001 | de Waard et al. |
| 6,209,124 B1 | 3/2001 | Vermeire et al. |
| 6,219,649 B1 | 4/2001 | Jameson |
| 6,221,009 B1 | 4/2001 | Doi et al. |
| 6,263,314 B1 | 7/2001 | Donner |
| 6,278,899 B1 | 8/2001 | Piche et al. |
| 6,278,981 B1 | 8/2001 | Dembo et al. |
| 6,282,531 B1 | 8/2001 | Haughton et al. |
| 6,301,584 B1 | 10/2001 | Ranger |
| 6,308,162 B1 | 10/2001 | Ouimet et al. |
| 6,315,735 B1 | 11/2001 | Joeken et al. |
| 6,332,163 B1 | 12/2001 | Bowman-Amuah |
| 6,336,103 B1 | 1/2002 | Baker |
| 6,366,934 B1 | 4/2002 | Cheng et al. |
| 6,375,469 B1 | 4/2002 | Brown |
| 6,411,939 B1 | 6/2002 | Parsons |
| 6,418,448 B1 | 7/2002 | Sarkar |
| 6,487,459 B1 | 11/2002 | Martin et al. |
| 6,499,843 B1 | 12/2002 | Cox et al. |
| 6,510,430 B1 | 1/2003 | Oberwager et al. |
| 6,518,069 B1 | 2/2003 | Otvos et al. |
| 6,576,471 B2 | 6/2003 | Otvos |
| 6,584,507 B1 | 6/2003 | Bradley et al. |
| 6,591,232 B1 | 7/2003 | Kassapoglou |
| 6,612,986 B2 | 9/2003 | Doi et al. |
| 6,625,577 B1 | 9/2003 | Jameson |
| 6,645,124 B1 | 11/2003 | Clem |
| 6,654,389 B1 | 11/2003 | Brunheroto et al. |
| 6,654,469 B1 | 11/2003 | Nelson et al. |
| 6,654,649 B2 | 11/2003 | Treiber et al. |
| 6,671,673 B1 | 12/2003 | Baseman et al. |
| 6,684,204 B1 | 1/2004 | Lal |
| 6,695,795 B2 | 2/2004 | Knoll |
| 6,700,923 B1 | 3/2004 | Dowling et al. |
| 6,732,095 B1 | 5/2004 | Warshavsky et al. |
| 6,735,483 B2 | 5/2004 | Martin et al. |
| 6,738,677 B2 | 5/2004 | Martin et al. |
| 6,738,753 B1 | 5/2004 | Hogan |
| 6,745,114 B2 | 6/2004 | Eglin |
| 6,757,689 B2 | 6/2004 | Battas et al. |
| 6,757,898 B1 | 6/2004 | Ilsen et al. |
| 6,823,253 B2 | 11/2004 | Brunell |
| 6,826,521 B1 | 11/2004 | Hess et al. |
| 6,826,531 B2 | 11/2004 | Fukada |
| 6,836,773 B2 | 12/2004 | Tamayo et al. |
| 6,866,024 B2 | 3/2005 | Rizzoni et al. |
| 6,892,155 B2 | 5/2005 | Gee et al. |
| 6,934,931 B2 | 8/2005 | Plumer et al. |
| 6,996,811 B2 | 2/2006 | Nishioka et al. |
| 7,006,939 B2 | 2/2006 | Voorakaranam et al. |
| 7,006,992 B1 | 2/2006 | Packwood |
| 7,039,475 B2 | 5/2006 | Sayyarrodsari et al. |
| 7,047,089 B2 | 5/2006 | Martin et al. |
| 7,050,866 B2 | 5/2006 | Martin et al. |
| 7,091,779 B2 | 8/2006 | Sahlman |
| 7,142,307 B1 | 11/2006 | Stark |
| 7,146,353 B2 | 12/2006 | Garg et al. |
| 7,155,390 B2 | 12/2006 | Fukada |
| 7,155,510 B1 | 12/2006 | Kaplan |
| 7,162,427 B1 | 1/2007 | Myrick et al. |
| 7,167,837 B1 | 1/2007 | Ciampi et al. |
| 7,177,822 B2 | 2/2007 | Mahmood et al. |
| 7,188,637 B2 | 3/2007 | Dreyer et al. |
| 7,219,040 B2 | 5/2007 | Renou et al. |
| 7,219,087 B2 | 5/2007 | Panfilov et al. |
| 7,222,095 B2 | 5/2007 | Squyres |
| 7,224,761 B2 | 5/2007 | Popa |
| 7,242,856 B2 | 7/2007 | Ishida et al. |
| 7,243,081 B2 | 7/2007 | Friend et al. |
| 7,249,004 B2 | 7/2007 | Lindeman et al. |
| 7,249,007 B1 | 7/2007 | Dutton |
| 7,249,089 B2 | 7/2007 | Mendizabal et al. |
| 7,272,820 B2 | 9/2007 | Klianev |
| 7,283,982 B2 | 10/2007 | Pednault |
| 7,296,734 B2 | 11/2007 | Pliha |
| 7,299,080 B2 | 11/2007 | Acosta et al. |
| 7,328,183 B1 | 2/2008 | Leisle |
| 7,347,365 B2 | 3/2008 | Rowe |
| 7,395,235 B2 | 7/2008 | Dhurandhar et al. |
| 7,426,423 B2 | 9/2008 | Schneider et al. |
| 7,433,809 B1 | 10/2008 | Guirguis |
| 7,496,534 B2 | 2/2009 | Olsen et al. |
| 7,542,932 B2 | 6/2009 | Chalermkraivuth et al. |
| 7,561,158 B2 | 7/2009 | Abe et al. |
| 7,596,523 B2 | 9/2009 | Sobel et al. |
| 7,599,870 B2 | 10/2009 | Merkoulovitch et al. |
| 7,606,727 B1 | 10/2009 | Pederson et al. |
| 7,617,141 B2 | 11/2009 | Chiappetta et al. |
| 7,617,142 B2 | 11/2009 | Markov et al. |
| 7,624,054 B2 | 11/2009 | Chen et al. |
| 7,640,201 B2 | 12/2009 | Chalermkraivuth et al. |
| 7,689,494 B2 | 3/2010 | Torre et al. |
| 7,716,073 B1 | 5/2010 | Martin |
| 7,716,108 B2 | 5/2010 | Chiappetta et al. |
| 7,725,374 B2 | 5/2010 | Van Erlach et al. |
| 7,756,770 B2 | 7/2010 | Dembo et al. |
| 7,774,179 B2 | 8/2010 | Guirguis |

(56) References Cited

U.S. PATENT DOCUMENTS

| | | | |
|---|---|---|---|
| 7,778,856 B2 | 8/2010 | Reynolds et al. |
| 7,778,910 B2 | 8/2010 | Ballow et al. |
| 7,788,195 B1 | 8/2010 | Subramanian et al. |
| 7,799,761 B2 | 9/2010 | Fein |
| 7,827,557 B2 | 11/2010 | Zhu et al. |
| 7,840,468 B2 | 11/2010 | Coughlan et al. |
| 7,848,939 B1 | 12/2010 | Martin |
| 7,853,509 B2 | 12/2010 | Mercier et al. |
| 7,870,061 B2 | 1/2011 | Mott |
| 7,877,308 B1 | 1/2011 | Padgette et al. |
| 7,912,738 B1 | 3/2011 | Martin |
| 7,921,061 B2 | 4/2011 | Rangarajan et al. |
| 7,949,597 B2 | 5/2011 | Zadoorian et al. |
| 8,005,739 B1 | 8/2011 | Reddy |
| 8,041,580 B1 | 10/2011 | Sholtis et al. |
| 8,065,209 B1 | 11/2011 | LaGuardia et al. |
| 8,082,207 B2 | 12/2011 | Bates et al. |
| 8,108,290 B2 | 1/2012 | Speth et al. |
| 8,255,346 B2 | 8/2012 | Abe et al. |
| 8,311,922 B2 | 11/2012 | Coughlan et al. |
| 8,335,732 B2 | 12/2012 | Dayanim |
| 8,401,950 B2 | 3/2013 | Lyons et al. |
| 8,473,431 B1 | 6/2013 | Mann et al. |
| 8,548,934 B2 | 10/2013 | Lay et al. |
| 8,560,359 B2 | 10/2013 | Salle et al. |
| 8,566,127 B1 | 10/2013 | Strech |
| 8,566,128 B2 | 10/2013 | Koziol |
| 8,566,206 B2 | 10/2013 | Stolerman et al. |
| 8,566,219 B2 | 10/2013 | Mintz |
| 8,566,222 B2 | 10/2013 | Hendrix |
| 8,566,229 B2 | 10/2013 | Choudhuri et al. |
| 8,577,712 B2 | 11/2013 | Douglas et al. |
| 8,577,769 B2 | 11/2013 | Fineout et al. |
| 8,577,774 B2 | 11/2013 | Glinberg et al. |
| 8,577,788 B1 | 11/2013 | Forsythe |
| 8,583,533 B2 | 11/2013 | Horton |
| 8,589,190 B1 | 11/2013 | Pugh et al. |
| 8,595,792 B2 | 11/2013 | Azagury et al. |
| 8,595,845 B2 | 11/2013 | Basavapatna et al. |
| 2001/0009590 A1 | 7/2001 | Holm |
| 2002/0002520 A1 | 1/2002 | Gatto |
| 2002/0016758 A1 | 2/2002 | Grigsby |
| 2002/0023034 A1 | 2/2002 | Brown et al. |
| 2002/0052820 A1 | 5/2002 | Gatto |
| 2002/0097245 A1 | 7/2002 | Jeong et al. |
| 2003/0028267 A1 | 2/2003 | Hales et al. |
| 2003/0046130 A1 | 3/2003 | Golightly et al. |
| 2003/0069986 A1 | 4/2003 | Petrone et al. |
| 2003/0083973 A1 | 5/2003 | Horsfall |
| 2003/0115090 A1 | 6/2003 | Mujtaba et al. |
| 2003/0115128 A1 | 6/2003 | Lange et al. |
| 2003/0120433 A1 | 6/2003 | Yokota et al. |
| 2003/0233310 A1 | 12/2003 | Stavrovski |
| 2004/0015906 A1 | 1/2004 | Goraya |
| 2004/0124742 A1 | 7/2004 | Takemura et al. |
| 2005/0144664 A1 | 6/2005 | Smith et al. |
| 2005/0193739 A1 | 9/2005 | Brunell et al. |
| 2005/0197994 A1 | 9/2005 | Fujii et al. |

OTHER PUBLICATIONS

Rauenzahn, Rick, "Declaration under Rule 132 for U.S. Appl. Nos. 09/688,983, 09/940,450, 13/548,095, 13/684,471 & 13/740,223", pp. 1-10, Oct. 21, 2013, Asset Reliance, Inc., U.S.A.

Rauenzahn, Rick, "Declaration under Rule 132 for U.S. Appl. Nos. 10/750,792, 11/360,087, 12/684,954 & 12/910,829", pp. 1-6, Jul. 7, 2013, Asset Reliance, Inc., U.S.A.

Patel, Jagdish, Office Action for U.S. Appl. No. 13/555,047, pp. 1-37, Jun. 7, 2013, USPTO, USA.

Patel, Jagdish, Office Action for U.S. Appl. No. 13/555,047, pp. 1-14, Oct. 31, 2013, USPTO, USA.

Patel, Jagdish, Advisory Action for U.S. Appl. No. 13/555,047, pp. 1-3, Nov. 7, 2013, USPTO, U.S.A.

Eder, Jeff, Response after final for U.S. Appl. No. 13/555,047, pp. 1-2, Nov. 10, 2013.

Zipp, Alan S.; Business valuation methods; 1993, AICPA.

Davidow, William; Accounting systems are completely wrong, Jan. 1995, Red Herring.

McTaggert, James, Kontes, Peter and Mankins, Michael, The value imperative, 1994, The Free Press.

Rappaport, Alfred; Creating shareholder value; 1986, The Free Press.

Ritchken, Peter, Options, Theory, Strategy and Applications, 1987, Foresman and Company.

Dixit, Avinash & Pindyck, Robert; Investment under uncertainty; 1994; Princeton University Press.

Garson, David; Interpreting neural network connection weights, Apr. 1, 1991, AI Expert.

Wellstead, Stephen; Neural network and fuzzy logic applications in C/C++; 1994; John Wiley & Sons.

Most, Kenneth; Accounting theory; 1977,Grid, Inc.

Hendriksen, Elden, Accounting theory, 1982, Richard D. Irwin.

Kulkarni, Arun; Artificial neural networks for image understanding; Jan. 1, 1994; Van Norstrand Reinhold.

Ward Systems Group; NeuroWindows User Manual; 1993; Wards Systems Group.

Brealey, Richard & Myers, Stewart; Principles of Corporate Finance; 1991; McGraw Hill.

Faulkner, Terrence; Applying options thinking to R&D valuation; May 1, 1996; Research Technology Manage.

Miller, Merton & Modigliani, Franco, Dividend policy, growth and the valuation of shares, Oct. 1, 1961.

Simensky, Melvin & Bryer, Lanning; The new role of intellectual property in commercial transactions.

Wilson, Albert, Emerging approaches to impaired property valuation, Apr. 1, 1996, Appraisal Journal, v64.

Brown, Gordon T, Free cash flow appraisal, a better way, Apr. 1, 1996, Appraisal Journal, V64, No. 2.

Business Editors & Real Estate Industry Writers, EQK Realty Investors I, Apr. 2, 1992, Press Release.

Swad, Randy, Business valuation, applicable standards for CPA's, Sep. 1, 1995, CPA Journal v65, No. 9.

Reilly, Robert; Valuation of intangibles for bankruptcy and reorganization purposes; Aug. 1, 1994; Ohio.

Liebich, Kim; How to value a bank; Aug. 1, 1995; ABA Banking Journal.

Baumann, Barbara H & Oxaal, Marjorie R; Estimating the value of a group medical practice, a primer.

Maxson, Mark; Will you get your money's worth?, May 1, 1993, Financial Executive.

Friedman, Richard; Business valuation: calculating it right; Oct. 1, 1994; Practical Accountant.

Mullen, Maggie; How to value intangibles; Nov. 1, 1993; Accountancy.

Stewart, Thomas; Trying to grasp the intangible; Oct. 2, 1995 Fortune.

Ourosoff, Alexandra; What the world's top brands are worth; Sep. 1, 1992; Finance World.

Phillips Business Information, Inc.; Five ways to reduce risk with neural networks; Sep. 27, 1993; Credi.

Lippitt, Jeffrey & Mastracchio, Nicholas, Developing capitalization rates for valuing a business, 11.

Hirsch, A. Ethan, What's it worth?, Dec. 21, 1992, Accounting Today, v6, No. 24, p. 16.

Myers, Stewart & Howe, Christopher; A life-cycle financial model of Pharmaceutical R&D; Apr. 1, 1997;MIT.

Simon, Carol J. & Sullivan, Mary W.; The Measurement and Determinants of Brand Equity; Oct. 1, 1993; Ma.

Sveiby, Karl Erik & Mellander, Klas; Tango Learning Guide Version 2.1; 1994; Celemi.

Kaufman, J. Jerry; Value Management; 1998; Crisp.

HBS Press; Measuring Corporate Performance; 1998; HBS Press.

Kaplan, Robert & Norton, David; The Balanced Scorecard; 1996; HBS Press.

Morris, Henry; Extending the Business Process, Oct. 6, 1998, IDC Presentation.

(56) References Cited

OTHER PUBLICATIONS

Amir, Eli; & Lev, Baruch, "Value-relevance of non-financial information", Journal of Accounting and.
Ernst & Young, Measures that Matter.
Bouquet, Paolo, Searafini, Luciano, et al; Modeling and Using Context—Context 99, Sep. 1999, Springer.
Akman, Varol, Bouquet, Paolo, et al; Modeling and Using Context—Context 2001, Jul. 2001, Springer.
Kuehne, Sven, et al, "SEQL: Category learning as progressive abstraction using structure mapping", 2.
Franke, Jurgen, Hardle, Wolfgang, et al; Measuring Risk in Complex Stochastic Systems; 2000, Springe.
Shimpi, Prakash, Integrating Corporate Risk Management, Oct. 1999, Swiss Re New Markets.
Brewka, Gerhard, Principles of Knowledge Representation, 1996, CSLI Publications.
Reiter, Raymond, Knowledge in Action, 2001, MIT Press.
Tissen, Rene, Andriessen, Daniel, et al; The Knowledge Dividend, 2000, Prentice Hall.
Brown, John Seely, et al, Loosening up: How process networks unlock the power of specialization, 20.
Blythe, Jim, "An Integrated Environment for Knowledge Acquisition", 2001, Intelligent User Interface.
Koller, Timothy, "What is value based management", McKinsey Quarterly, 1994, No. 3.
Brown, Carol; Coakley, James; Phillips, Mary Ellen, Neural Networks Enter World of Mgmt Accounting.
Bielinski, Daniel, "How to sort out the premium drivers of post deal value", Mergers & Acquisitions.
Bergstrom, Peter; Kimber Eliot, "Formal data models for SGML and HyTime", SGML, Mar. 1999, electrum.
Harold, Elliotte, XML Bible, IDG Books, 1999.
Knight, James, Value Based Management, McGraw Hill, 1998.
NeuroSolutions, Application Summaries.
Copeland, Tom, Koller, Tim, Murrin, Jack, Valuation, John Wiley and Sons, 1994.
Brown, Carolyn, Phillips, Mary Ellen, Expert Systems for Management Accounting Tasks, IMA Foundation.
Anonymous, "Survey: Too Clever by Half", The Economist, Jan. 24, 2004.
Culp, Christopher et al, "Value at Risk for Asset Managers", Derivatives Quarterly, vol. 5, Jan. 8, 1999.
Chicago Mercantile Exchange, "SPAN—Frequently Asked Questions", CME web site, Feb. 17, 2006.
Chicago Board of Trade, "SPAN Margin System", Aug. 27, 1991.
W3C, "Extensible Markup Language (XML)", W3C web site, Apr. 14, 2005.
Goldfarb, Charles; & Prescod, Paul; XML Handbook; Prentice Hall, 1998.
Maier, David, "Database Desiderata for an XML Query Language"; W3.org, 1998.
Widom, Jennifer, "Data Management for XML, Research Directions", IEEE, Jul. 1999.
Chambers, Robert; Quiggins, John; "Resource Allocation and Asset Pricing", Nov. 2002.
Haesendonckx, Michel, "VBM—Value Driver Tree", Jun. 8, 2005.
Barua, Anitesh; Lee, C.H. Sophie; Whinston, Andrew, "The Calculus of Reengineering", Aug. 1994.
Kluge, Jurgen, Stein, Wolfram, Licht, Thomas, Knowledge Unplugged, 2001, Palgrave.
Quinn, James Brian, Intelligent Enterprise, Free Press, 1992.
Fowler, Martin; Analysis Patterns: Reusable Object Models, 1997, Addison Wesley.
Shafer, Glenn & Vovk, Vladimir, Probability and Finance, 2001, John Wiley & Sons.
Fahy, Martin, Strategic Enterprise Management Systems, 2001, CIMA.
Caouette, John, Altman, Edward & Narayanan, Paul, Managing Credit Risk, John Wiley and Sons, Inc.
Ballow, John; Burgman, Roland; Burgoz, Scott; "Enhanced Business Reporting"; Oct. 2004, pp. 1.
Charoenrook, Anchanda; "Does Sentiment Matter?"; Dec. 2003, pp. 1-44, Financial Management Association International, U.S.A.
Bandopadhyaya, Arindam, Jones, Anne Leah; "Measuring investor sentiment in equity markets"; Feb. 2006, v7, pp. 208-215, Journal Asset Management, U.S.A.
physorg.com, "How much information is too much information?"; pp. 1-2;, Feb. 15, 2005, physorg.com, University of Queensland, Australia.
Brous, Peter, Declaration Under Rule 132 for U.S. Appl. No. 10/287,586, pp. 1-2, Jul. 21, 2008.
Cusanza, Greg, Declaration Under Rule 132 for U.S. Appl. No. 09/764,068, pp. 1-4, Apr. 4, 2008.
Cusanza, Greg, Declaration Under Rule 132 for U.S. Appl. No. 10/645,099, pp. 1-4, Apr. 28, 2009.
Rauenzahn, Rick, Declaration Under Rule 132 for U.S. Appl. No. 10/287,586, pp. 1-4, Jan. 4, 2009.
Rauenzahn, Rick, Declaration Under Rule 132 for U.S. Appl. No. 09/688,983, pp. 1-3, Apr. 30, 2006.
Rauenzahn, Rick, Declaration Under Rule 132 for U.S. Appl. No. 10/821,504, pp. 1-6, Jul. 11, 2008.
Rauenzahn, Rick, Declaration Under Rule 132 for U.S. Appl. No. 10/821,504, pp. 1-3, Dec. 20, 2007.
Rauenzahn, Rick, Declaration Under Rule 132 for U.S. Appl. No. 10/821,504, pp. 1-3, Nov. 19, 2007.
Zweig, Jason, "Does stock market data really go back 200 years?", Wall Street Journal, Jul. 11, 2009.
Science News Letter, The, "Unlearning is problem", The Science News Letter, Feb. 4, 1956, p. 67, vol. 69, Society for Science & the Public, USA.
Authers, John, "Is it back to the Fifties?", www.ft.com, Mar. 24, 2009, pp. 1-4, Financial Times, U.K.
Stiglitz, Joseph, "Prize Lecture: information and the change in the paradigm in economics", Dec. 8, 2001, pp. 472-540, The Nobel Foundation, Sweden.
Yang, Bo et al., BP Neural Network Optimization based on an improved genetic algorithm, Nov. 4, 2002, pp. 64-68, Proceedings for the First International Conference on Machine Learning and Cybernetics Beijing, China, IEEE, U.S.A.
Douglas, Niall; "In the light of current evidence, critically examine the efficient market hypothesis", Apr. 10, 2007, pp. 1-7, St. Andrews University, Scotland.
Somoye, Russell; Akintoye, Ishola; Oseni, Jimoh; "Asset pricing in an informational inefficient market"; Dec. 2008, pp. 7-15, European Journal of Economics, Finance and Administrative Science, Eurojournals, Cyprus.
Beechey, Merideth; Gruen, David; Vickery, James, "The efficient market hypothesis: a survey", Jan. 2000, pp. 1-30, Reserve Bank of Australia, Australia.
Luehrman, Timothy; "What's it worth", May-Jun. 1997, pp. 132-142, Harvard Business Review, U.S.A.
Damodaran, Aswath, "The adjusted present value approach", Dec. 4, 2003, pp. 1-4, Stern School of Business, N.Y.U., U.S.A.
Fernandez, Pablo, "Valuing companies by cash flow discounting", Oct. 16, 2008, pp. 1-19, University of Navarra, Spain.
Rigdon, ED, "Not positive definite matrices, causes and cures", Georgia State University web site, pp. 1-6, Jun. 11, 1997, USA.
Schulze, Mark; "Linear Programming for Optimization", 1998; pp. 1-8; Perceptive Scientific Instruments, USA.
Smith, Cole et al, "A Tutorial Guide to Mixed-Integer Programming Models and Solution Techniques", 2007, pp. 1-23, Univeristy of Florida, USA.
Heching, Aliza; and King, Alan; "Financial Engineering"; Operations research and management science handbook, pp. 21-1 through 21-37; 2008, CRC Press, USA.
Link, Jonathan, "Addendum to petition for relief for U.S. Appl. No. 11/360,087", Mar. 1, 2011, pp. 1-10, Kilpatrick Townsend, U.S.A.
Eppen, Gary; Martin, R.; Schrage, Linus; "A Scenario Approach to Capacity Planning", Operations Research, vol. 37, No. 4, Jul. 1989, pp. 517-527.

(56) References Cited

OTHER PUBLICATIONS

Stein, Jeremy et al, "A comparables approach to measuring cash flow at risk for non financial firms", Journal of Applied Corporate Finance, Winter 2001, pp. 100-109.
Hodder, J., "Financial Market Approaches to Facility Location under Uncertainty", Operations Research, vol. 32, pp. 1374-1380, 1984.
Hodder, J., et al., "A Simple Plant-Location Model for Quantity Setting Firms Subject to Price Uncertainty", European Journal of Operational Research; Amsterdam, vol. 21, pp. 39-46, 1985.
Bradley, Stepehen; Hax, Arnoldo; Magnanti, Thomas; "Applied Mathematical Programming", pp. 227-271, 1977, Addison Wesley, USA.
Zomaya, Albert; Kazman, Rick, "Simulated Annealing Techniques," Algorithms and theory of computation handbook, pp. 33-1 to 33-18, 2010, CRC Press, USA.
Botknowledge, "Botknowledge—Frequently Asked Questions", 2000, pp. 1-3, www.botknowledge.com, U.S.A.
Halford, Graeme et al, "Separating Cognitive Capacity from Knowledge", Trends in Cognitive Science, Jun. 2007, pp. 236-242, Cell Press, U.S.A.
Perignon, Christophe & Smith, Daniel, "The level and quality of Value at Risk disclosure by commercial banks", Jul. 7, 2009, pp. 1-49, SSRN.
Hoppe, Richard, "Its time we buried Value at Risk", Risk Professional, Jul./Aug. 1999, pp. 14-18, USA.
Taleb, Nassim, "Against VAR", Derivatives Strategy, Apr. 1997, www.derivativesstrategy.com, USA.
Link, Jonathan, "Petition for relief for U.S. Appl. No. 11/360,087", Jan. 7, 2011, pp. 1-89, Kilpatrick Townnsend, USA.
Jensen, Paul and Bard, Jonathan, Operations Research Models and Methods, pp. A1-A6, John Wiley and Sons, 2003.
Owens, Terry J; Lorin, Hubert C.; and Fetting, Anton, "Decision on Appeal 2009-012839, U.S. Appl. No. 09/688,983"; Mar. 16, 2011; pp. 1-18, U.S.P.T.O., USA.
Morris, Cohen, Fisher, Marshall, Ramchadran, Jaikumar; "Managing International Manufacturing", pp. 67-93, 1989, Elsevier, USA.
Someren, Maarten, Verdeneus, Floor; "Introducing inductive methods in knowledge acquisition by divide- and-conquer", 1998, pp. 20-28, AAAI, USA.
Geman, Stuart, Bienenstock, Elie; "Neural networks and the bias/variance dilemma", 1992, Neural Computation, pp. 1-58, MIT, USA.
Schuurmans, Dale; "A new metric based approach to model selection", 1997, pp. 1-7, AAAI National Conference Proceedings, AAAI, USA.
Kohavi, Ron, "Wrappers for feature subset selection", 1997, Artificial Intelligence, pp. 273-324, Elsevier, Holland.
Michalski, Ryzard, "A theory and methodology of inductive learning", 1982, pp. 111-161, Tioga Publishing, USA.
Mitchell, Tom, "Machine Learning", 1997, pp. 1-414, McGraw Hill, USA.
Piramuthu, Selwyn, et al, "Using Feature Construction to Improve the Performance of Neural Networks", 1998, pp. 416-430, Management Science, USA.
Kohavi, Ron; "Wrappers for performance enhancement and oblivious decision graphs"; 1995, pp. 1-302, Stanford University, USA.
Kira, Kenji, Rendell, Larry, "The feature selection problem, traditional methods and a new algorithm", 1992, pp. 129-134, Learning Inductive, AAAI, USA.
Jordan, Michael, Jacobs, Robert, "Hierarchical Mixtures of Experts and the EM Algorithm", 1993, pp. 1-30, MIT, USA.
Rabiner, Lawrence, "A Tutorial on Hidden Markov Models and Selected Applications in Speech Recognition", Proceedings of the IEEE, Feb. 1989, p. 257-286, USA.
Forney, David, "The Viterbi Algorithm", Proceedings of the IEEE, Mar. 1973, pp. 268-278, USA.
Viterbi, Andrew, "Error Bounds for Convolutional Codes", IEEE Transactions on Information Theory, Apr. 1967, pp. 260-269, USA.
Expert, Economic, "Viterbi Algorithm", www.economicexpert.com, Jul. 19, 2011, pp. 1-2, USA.
Hauser, John and Urban, Glen, "Assessment of attribute importances and consumer utility functions", Journal of Consumer Research, p. 251-262, Mar. 1979, USA.
Lu, Zhidong, et al., "A robust language independent OCR system", 1998, pp. 1-9, BBN Technologies, USA.
Englebrecht, Herman, "Efficient decoding of hidden markov models", Sep. 2007, pp. 1-151, University of Stellenbosch, South Africa.
Hsu, William, "Time Series Learning With Probabilistic Networks", 1998, pp. 1-135, University of Illinois, USA.
Link, Jonathan, "Addendum to petition for relief for U.S. Appl. No. 11/360,087", Aug. 31, 2011, pp. 1-52, Kilpatrick Townsend, U.S.A.
Chen, Peter, "The Entity Relationship Model", Mar. 1976, pp. 9-36, ACM Transactions on Database Systems, USA.
Rockefeller, R.T., Wets, Roger, "Scenario and policy aggregation in optimization under uncertainty", Mathematics of Operation Research, pp. 119-147, 1991, USA.
Mulvey, John and Andrzej Ruszczynski "A New Scenario Decomposition Method for Large-Scale Stochastic Optimization" Operations Research, vol. 43 (1995), No. 3, p. 477-490, USA.
Kon, Stanley and Jen, Frank, "The Investment Performance of Mutual Funds", The Journal of Business, vol. 52, No. 2 (Apr. 1979), pp. 263-289, USA.
Ippolito, Richard, On Studies of Mutual Fund Performance, 1962-1991, Financial Analysts Journal, vol. 49, No. 1 (Jan.-Feb. 1993), pp. 42-50, USA.
Treynor, Jack and Mazuy, Kay, "Can Mutual Funds Outguess the Market?", Harvard Business Review, Jul.-Aug. 1996, pp. 131-136, USA.
Fama, Eugene & French, Kenneth, "The Capital Asset Pricing Model: Theory and Evidence", Summer 2004, pp. 25-46, Journal of Economic Perspectives, U.S.A.
Quinn, Gene, "Is there a systematic denial of due process at the USPTO?", Feb. 26, 2012, pp. 1-7, IP Watchdog, USA.
Topol, Eric, "The creative destruction of medicine", 2012, pp. 1-285, Basic Books, New York, NY, USA.
Rauenzahn, Rick, "Declaration under Rule 132 for U.S. Appl. Nos. 09/688,983, 09/940,450, 13/548,095, 13/684,471 & 13/740,223", pp. 1-10, May 17, 2013, Asset Reliance, Inc., U.S.A.
Plager, J, "In re: Schrader", pp. 1-9, Apr. 13, 1994, U.S. Court of Appeals Federal Circuit, U.S.A.
College, Castleton; "Hypothesis Testing", pp. 1-2, 2013, Castleton State College, USA.
Arlot, Sylvain & Celisse, Alain, "A survey of cross validation procedures for model selection", pp. 40-79, 2010, Statistics Surveys, USA.
Bennett, BJ, "Request for reconsideration of petition under 37 CFR 1.182", pp. 1-85, Oct. 21, 2012, Asset Reliance, Inc., U.S.A.

\* cited by examiner

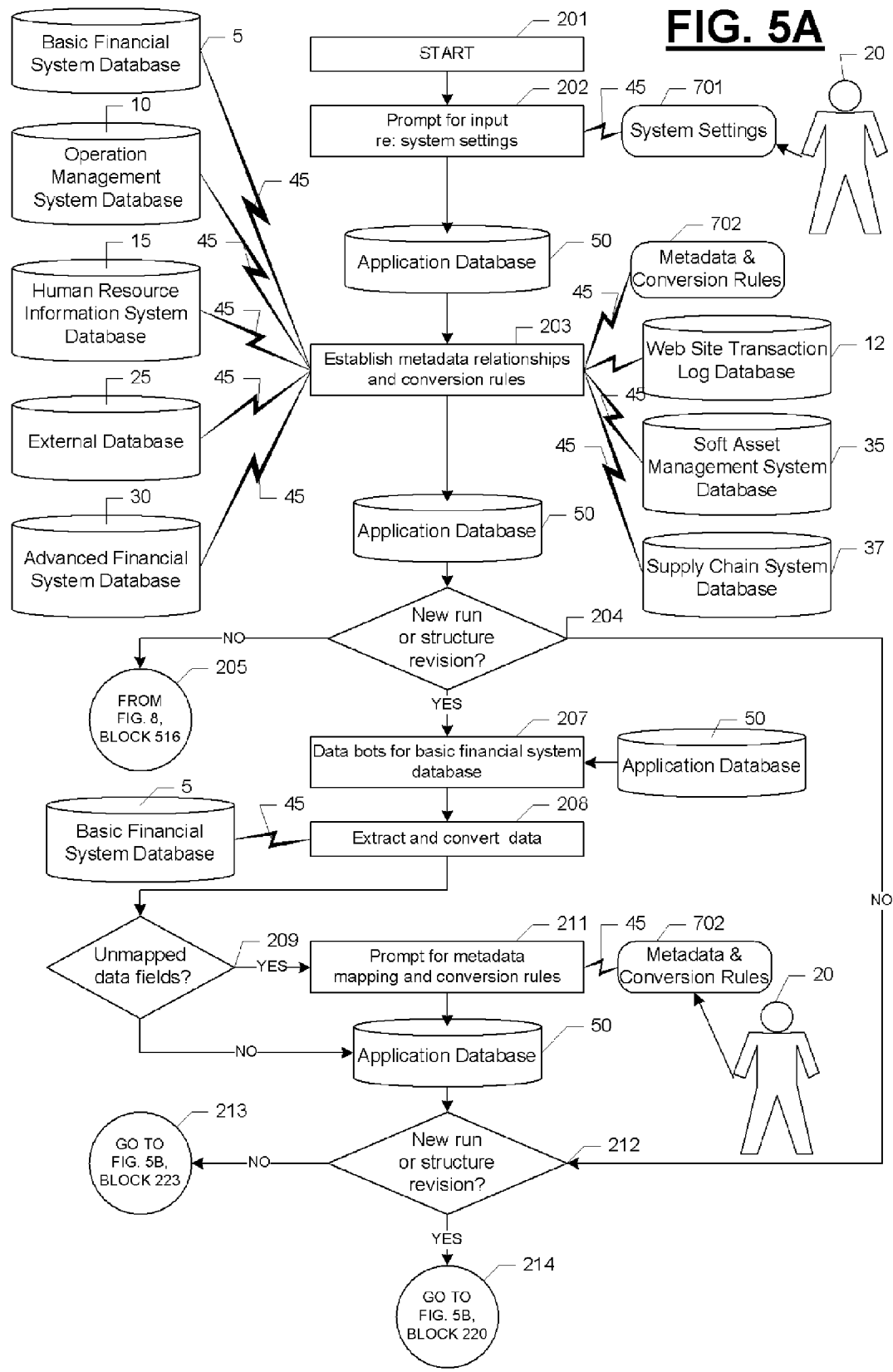

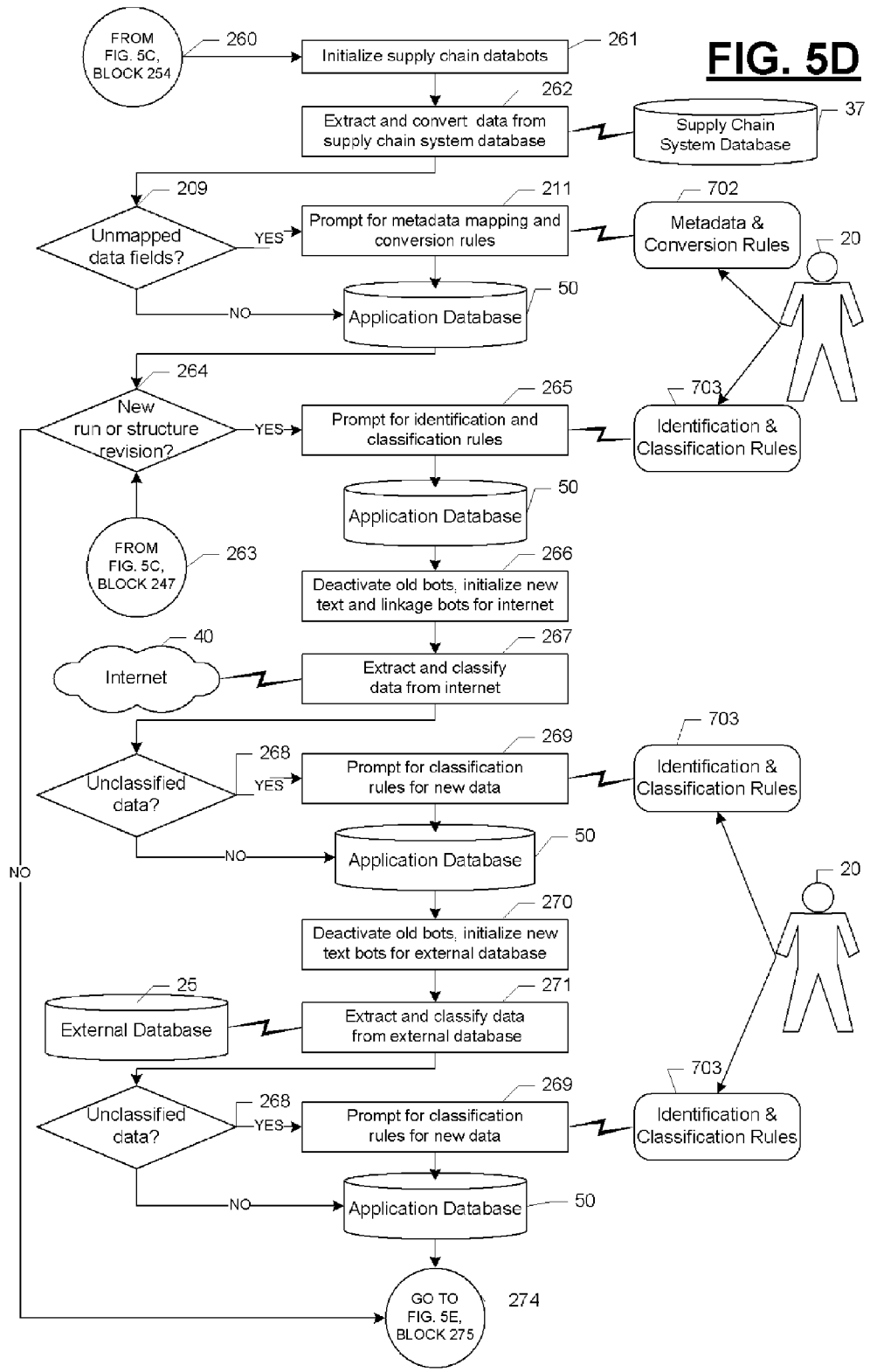

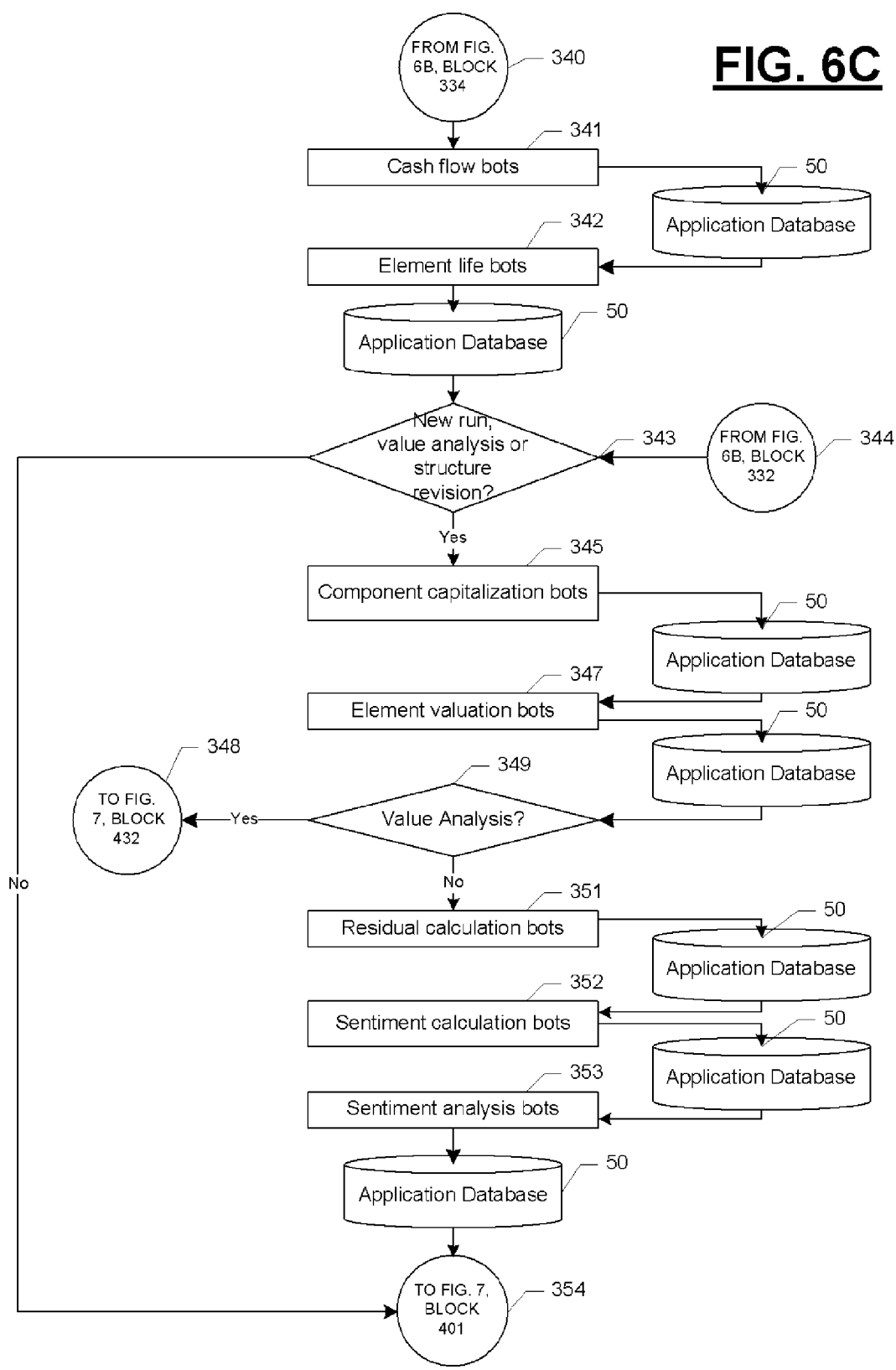

AUTOMATED RISK TRANSFER SYSTEM

CONTINUATION AND CROSS REFERENCE TO RELATED PATENT

This application is a continuation of U.S. patent application Ser. No. 09/688,983 filed Oct. 17, 2000, the disclosure of which is incorporated herein by reference. The subject matter of this application is also related to the subject matter of U.S. Pat. No. 5,615,109 for "Method of and System for Generating Feasible, Profit Maximizing Requisition Sets", by Jeff S. Eder, the disclosure of which is also incorporated herein by reference.

BACKGROUND OF THE INVENTION

This invention relates to a method of and system for developing and continuously operating an automated, on-line risk transfer system.

Managing a business in a manner that creates long term value is a complex and time-consuming undertaking. This task is complicated by the fact that traditional financial systems do not provide sufficient information for managers in the Knowledge Economy to make the proper decisions. Many have noted that traditional accounting systems are driving modern managers to make the wrong decisions and the wrong investments. Accounting systems are "wrong" for several reasons. One of the most obvious reasons—they track tangible assets while ignoring intangible assets. Intangible assets such as the skills of the employees, intellectual property, business infrastructure, databases, management processes, relationships with customers and relationships with suppliers are not measured with current accounting systems. This oversight is critical because in the present economy the success of an enterprise is determined more by its ability to use its intangible assets than by its ability to amass and control the physical ones that are tracked by traditional accounting systems. The absence of intangible asset information is particularly notable in high technology companies that are highly valued for their intangible assets and their options to enter new markets.

Even when intangible assets have been considered in risk analysis, the limitations in the existing methodology have severely restricted the utility of the information that has been produced. All known prior efforts to value individual intangible assets have been restricted to independent valuations of different types of assets with only limited attempts to measure the actual impact of the asset on the enterprise that owns it. Some of the intangible assets that have been valued separately in this fashion are: brand names, customers and intellectual property. Problems associated with the known methods for valuing individual intangible assets include:

1. Interaction between intangible assets is ignored. For example, the value of a brand name is in part a function of the customers that use the product—the more prestigious the customers, the stronger the brand name. In a similar fashion the stronger the brand name, the more likely it will be that customers will stay a long time. Valuing either of these assets in isolation will not provide a meaningful valuation; and;
2. The value of an intangible asset is a function of the benefit that it provides the enterprise. Therefore, measuring the value of an intangible asset requires a method for measuring the actual impact of the asset on the enterprise—something that is missing from all known existing methods.

Another aspect of the increasing importance of "intangible" assets is the fact that the primary risks faced by most companies have now shifted from hard asset damage (fire, flood, etc.) to soft asset impairment or loss. A recent study found that between June 1993 and May 1998, ten percent of the Fortune 1000 lost more than one quarter (25%) of their total shareholder value in one month. Almost two thirds of these "large losses" were caused by problems related to intangible assets.

The deficiencies of traditional accounting reports exacerbate the difficulty companies face when reporting problems with intangible assets because:

1. The absence of regular reporting means that all problems with intangible assets come "out of the blue"; and
2. The absence or regular reporting makes it difficult to monitor company efforts to correct the problems.

Given the absence of reporting on many of the intangible assets driving the success of companies in the Knowledge Economy, it should not be surprising to learn that traditional accounting systems are also deficient in reporting significant information relevant to the liability side of the balance sheet. Traditional financial statements footnote or in some cases ignore large potential liabilities including: loss from litigation, environmental clean-up costs and shortfalls on leasing revenues. The absence of routine reporting on these risks does not alter the fact that they have a material, negative impact on the value of the company that has these risks. Recent studies completed at Oxford University have confirmed that "off balance sheet risk" has a negative impact on market value for firms that have these risks.

This negative impact of these risks on market value can be substantial. A recently completed study found that exposure to future, un-booked liabilities for environmental cleanup reduced share price by an average of 16% for electric utilities targeted by the Clean Air Act Amendments of 1990. It is worth noting that as more information became public regarding the actual cost of the environmental cleanup and pollution abatement the reduction in share price moderated. A transparent analysis of the liability associated with the environmental cleanup would have given the market the information required to more rapidly reach the proper conclusion regarding the impact of these new costs.

In addition to risks from intangible asset impairment and unrecognized liabilities, companies face other risks that are more readily analyzed. These risks are shown in Table 1.

TABLE 1

| Risks that are typically analyzed |
|---|
| 1. Foreign exchange risk; |
| 2. Interest rate risk; |
| 3. Portfolio risk; |
| 4. Credit risk; and |
| 5. Commodity price risk; |

These risks are usually analyzed using a standardized risk analysis product such as Dun and Bradstreet's Risk Assessment Manager™ for credit risk and Barra's Cosmos™ System for portfolio risk. The analyses of the risks listed in Table 1 are generally completed in isolation so their impact on the overall firm is not clear and opportunities for natural "self hedging" aren't apparent.

Another problem associated with developing risk programs for isolated assets is that they have generated severe losses for firms that didn't fully understand the potential liability their "risk reduction programs" were creating. One of the most common mechanisms for minimizing the risks shown in Table 1 is to hedge the exposure using a derivative or option to "lock in" the maximum amount of exposure the firm is faced with over a given time period. In some cases, when the risk factors moved in a direction opposite to the direction being hedged (i.e. interest rates dropped when they were expected to increase) the firm hedging its risk experience a far greater loss than any loss ever envisioned under the worst case analysis of their risk exposure.

Unexpected losses aren't the biggest shortcoming of traditional risk management systems. Because traditional risk management systems are driven by a statistical analysis of prior history, they are generally limited to dealing with events that vary within parameters that have already been experienced. The problem with this is that most large losses are caused by events that fall outside the bounds of normal experience (i.e. hundred-year floods and once-in-a-lifetime events).

It is also worth noting that the limitations of the general ledger accounting systems discussed previously (lack of information about intangible assets and off balance sheet risk) also extend to the risk analyses that are completed based largely on the information provided by general ledger systems. These same limitations also extend to the all known efforts to analyze and/or simulate the impact of changes in the business on financial performance and risk. Put simply—it is impossible to analyze the impact on risk with no prior information. The lack of detailed information on intangible assets and their impact on risk has also limited simulation products such as the Dynamic Financial Analysis (DFA) and the Small Business Financial Manager to projecting the impact of changes in revenue, expense or balance sheet items (tangible assets and financial liabilities) on financial performance. Given the growing importance of intangible assets to financial performance and risk, the utility of these systems is very limited. In a similar manner the lack of quantitative information on the impact of intangibles on financial performance has limited the usefulness of simulation products such as Tango that incorporate generic information regarding intangibles.

The complexity and relatively high cost of obtaining people that understand how to use the traditional risk analysis systems has generally limited the analysis and active management of risk to larger companies. This is ironic because large companies are the ones that are in the best position to absorb the risks that are being managed while smaller companies that don't have the resources to survive a large loss are left even more vulnerable by their inability to examine their risks in detail. Clearly, an automated system for developing comprehensive risk management programs for companies of all sizes would be beneficial.

However, even when comprehensive risk analyses are available the numerous coverage restrictions, general lack of precision in the policies and the high cost of traditional insurance dissuade many from obtaining the coverage that could, in some cases, save their companies from financial ruin. The multi-line, multi-period insurance policies some firms are selling only partially alleviate these problems. At the same time, the lack of precision in the risks being covered is understandable in so far as the insurers have only very limited information about the actual risks being faced by the companies they are insuring. A system that provided the insurers with continuous, detailed information regarding the risks faced by their clients would clearly help alleviate this problem.

Another barrier to effective use of insurance and risk reduction products like derivatives is the time required to analyze and purchase them. In some cases the need arises and disappears before the traditional systems and labor intensive review systems can respond. If the risk does not materialize, then everything is fine. If it does, then the company may go out of business before it faces the next risk. In either event, the large amount of time required to obtain these products leaves many companies exposed to risks that they could easily avoid if a more automated system was available.

The underlying cause of all these problems is that insurance and most financial services are delivered in a manner that is similar to the U.S. manufacturing sector twenty five years ago when obtaining the right product required an army of people to sift through a variety of quotes, place an order and then monitor the orders to make sure what was ordered actually arrived on time. The manufacturing and retail sectors have replaced their old, labor-intensive systems with electronic supply chain systems that tightly link them with their suppliers. Using these systems, suppliers provide the specific products and services that are required for smooth operation "just-in-time". A similar system that would enable financial service firms to provide financial "products" like insurance, foreign exchange, capital and credit tailored to the specific situation on a "just-in-time" would clearly be beneficial. The system could also work in real time providing One of the biggest problems with achieving this goal has been that there has been no agreed upon method for analyzing risk, liquidity and foreign exchange requirements and for communicating that information to financial service firms. It is worth noting at this point that while XML is widely touted as a panacea for inter-firm communication it is only useful in establishing the language for the communication—not the substance of what is being communicated. To satisfy all the potential providers of financial services, the substance of the communication regarding risk, liquidity and foreign exchange requirements would have to overcome the limitations of traditional systems that:

1) Ignore intangible assets;
2) Ignore real options;
3) Analyze individual assets in isolation, and
4) Ignore or footnote contingent liabilities and other off balance sheet risk;

In light of the preceding discussion, it is clear that it would be desirable to have an automated, real time system that could quantify and communicate information to financial service providers regarding the full spectrum of risk transfer (and liquidity) needs for an enterprise in a way that that was supported by a detailed, rigorous evaluation of all the elements of the enterprise that create business value and business risk. Ideally, this system would allow financial service firms to provide "just in time" and/or real time financial products and services in a manner that is customized to the exact needs of the enterprise using the system.

SUMMARY OF THE INVENTION

It is a general object of the present invention to provide a novel and useful system for on-line risk transfer that overcomes the limitations and drawbacks of the existing art that were described previously.

A preferable object to which the present invention is applied is fully quantifying and then satisfying the risk reduction needs for a commercial business. Comprehensive quantification of enterprise requirements is enabled by:

1) Systematically analyzing and valuing contingent liabilities using real option algorithms as required to ensure that the most current information regarding the magnitude of potential liabilities is included in all analyses;

2) Developing an improved understanding of the variability and risk associated with all elements of enterprise value—tangible and intangible;
3) Incorporating insights from the analyses of performance by asset management systems (i.e. Customer Relationship Management, Supply Chain Management, Brand Management, etc.) and the analyses of risk by asset risk management systems (credit risk, currency risk, etc.) for individual assets;
4) Integrating or fusing the information from the first three items as required to develop a complete, three hundred sixty degree (360°) view of the risk and opportunities faced by the company;
5) Clearly identifying the liquidity and foreign exchange position of the enterprise; and
6) Developing the optimal risk reduction program for the company within the constraints specified by the user.

The system of the present invention also calculates and displays an optimal value enhancement program for the commercial enterprise using the system. Because information on liquidity and foreign exchange needs is developed and transmitted along with the risk information, the system of the present invention is also capable of functioning as an automated, on-line liquidity transfer system, alone or in combination with the risk transfer system.

The information for each enterprise using the system is continuously communicated in summary format to the central exchange (such as an insurance company or bank) that analyzes the information for all enterprises to:
1) Arrange swaps of risk, between enterprises with complementary, offsetting needs for a fee; and/or
2) Arrange for insurance for a larger fee as required to meet the needs of each enterprise using the system and the profit goals (and reserve requirements) of the firm operating the central exchange.

To provide the most secure system for transferring risk, the system of the present invention goes on to analyze the information provided by each enterprise and the firm operating the central exchange (hereinafter, the central exchange operator) to determine if standby credit lines and/or reinsurance are required. If either of these "back-up" facilities for capital is required, then the appropriate amount of standby credit and/or reinsurance is determined by the system of the present invention.

In addition to enabling the just in time provision of financial services, the present invention has the added benefit of eliminating a great deal of time-consuming and expensive effort by automating the extraction of data from the databases, tables, and files of existing computer-based corporate finance, operations, human resource, supply chain, web-site and "soft" asset management system databases as required to operate the system. In accordance with the invention, the automated extraction, aggregation and analysis of data from a variety of existing computer-based systems significantly increases the scale and scope of the analysis that can be completed. The system of the present invention further enhances the efficiency and effectiveness of the business valuation by automating the retrieval, storage and analysis of information useful for valuing elements of value from external databases, external publications and the internet. Uncertainty over which method is being used for completing the valuation and the resulting inability to compare different valuations is eliminated by the present invention by consistently utilizing the same set of valuation methodologies for valuing the different elements of enterprise value as shown in Table 2.

TABLE 2

| Enterprise Element of Value | | Valuation Methodology |
|---|---|---|
| Excess Cash & Marketable Securities | | GAAP |
| Market Sentiment | | Market Value* − (COPTOT + ΣReal option Values) |
| Total current-operation value (COPTOT): | | Income Valuation |
| Financial Assets: | Cash & Marketable Securities (CASH) | GAAP |
| Financial Assets: | Accounts Receivable (AR) | GAAP |
| Financial Assets: | Inventory (IN) | GAAP |
| Financial Assets: | Prepaid Expenses (PE) | GAAP |
| Financial Assets: | Other Assets (OA) | Lower of GAAP or liquidation value |
| Elements of Value: | Production Equipment (PEQ) | If calculated value> liquidation value, then use system calculated value, else use liquidation value |
| Elements of Value: | Intangible Elements (IE): Customers, Employees, Vendors, Strategic Partnerships, Brands, Other Intangibles | System calculated value for each IE |
| Elements of Value: | General Going Concern Value (GCV) | GCV = COPTOT − CASH − AR − IN − PE − PEQ − OA − ΣIE |
| Real Options | | Real option algorithms & industry real option allocation each based on relative strength of intangible elements |
| Contingent Liabilities | | Real option algorithms |

*The user also has the option of specifying the total value

The market value of the enterprise is calculated by combining the market value of all debt and equity as shown in Table 3.

TABLE 3

| Enterprise Market Value = |
|---|
| Σ Market value of enterprise equity − Σ Market value of company debt |

Consultants from McKinsey & Company recently completed a three year study of companies in 10 industry segments in 12 countries that confirmed the importance of intangible elements of value as enablers of new business expansion and profitable growth. The results of the study, published in the book *The Alchemy of Growth*, revealed three common characteristics of the most successful businesses in the current economy:
1. They consistently utilize "soft" or intangible assets like brands, customers and employees to support business expansion;
2. They systematically generate and harvest real options for growth; and
3. Their management focuses on three distinct "horizons"—short term (1-3 years), growth (3-5 years out) and options (beyond 5 years).

The experience of several of the most important companies in the U.S. economy, e.g. IBM, General Motors and DEC, in the late 1980s and early 1990s illustrate the problems that can arise when intangible asset information is omitted from corporate financial statements and companies focus only on the short term horizon. All three companies were showing large profits using current accounting systems while their businesses were deteriorating. If they had been forced to take write-offs when the declines in intangible assets were occurring, the problems would have been visible to the market and management would have been forced to act to correct the problems much more quickly than they actually did. These deficiencies of traditional accounting systems are particularly noticeable in high technology companies that are highly valued for their intangible assets and their options to enter growing markets rather than their tangible assets.

The utility of the valuations produced by the system of the present invention are further enhanced by explicitly calculating the expected purchase longevity of the different customers and different elements of value as required to improve the accuracy and usefulness of the valuations.

As shown in Table 2, real options and contingent liabilities are valued using real option algorithms. Because real option algorithms explicitly recognize whether or not an investment is reversible and/or if it can be delayed, the values calculated using these algorithms are more realistic than valuations created using more traditional approaches like Net Present Value. The use of real option analysis for valuing growth opportunities and contingent liabilities (hereinafter, real options) gives the present invention a distinct advantage over traditional approaches to risk management.

The innovative system has the added benefit of providing a large amount of detailed information to the enterprise and central exchange users concerning both tangible and intangible elements of value. Because intangible elements are by definition not tangible, they can not be measured directly. They must instead be measured by the impact they have on their surrounding environment. There are analogies in the physical world. For example, electricity is an "intangible" that is measured by the impact it has on the surrounding environment. Specifically, the strength of the magnetic field generated by the flow of electricity through a conductor is used to determine the amount of electricity that is being consumed. The system of the present invention measures intangible elements of value by identifying the attributes that, like the magnetic field, reflect the strength of the element in driving components of value (revenue, expense and change in capital) and market prices for company equity and are easy to measure. Once the attributes related to the strength of each element are identified, they can be summarized into a single expression (a composite variable or vector). The vectors for all elements are then evaluated to determine their relative contribution to driving each of the components of value. The system of the present invention calculates the product of the relative contribution and the forecast longevity of each element to determine the relative contribution to each of the components of value. The contributions to each component of value are then added together to determine the value of each element (see Table 5).

The method for tracking all the elements of value for a business enterprise provided by the present invention eliminates many of the limitations associated with current systems for risk management that were described previously. To facilitate its use as a tool for managing risk for a commercial enterprise, the system of the present invention produces reports in formats that are similar to the reports provided by traditional accounting systems. Incorporating information regarding all the elements of value is just one of the ways the system of the present invention overcomes the limitations of existing systems. Other advances include:
1. The integrated analysis of all risks,
2. The automated analysis of both "normal" risks and extreme risks, and
3. The preparation of an xml summary of enterprise risk that enable the automated delivery of risk management products and services.

By eliminating many of the gaps in information available to personnel in the enterprise and the central exchange, the system of the present invention enables the just-in-time provision of financial services that are tailored to the exact needs of the enterprise. The electronic linkage also eliminates the time lag that prevents many from companies from obtaining the risk reduction products they need

BRIEF DESCRIPTION OF DRAWINGS

These and other objects, features and advantages of the present invention will be more readily apparent from the following description of the preferred embodiment of the invention in which:

FIG. 5A, FIG. 5B, FIG. 5C, FIG. 5D, FIG. 5E and FIG. 5F are block diagrams showing the sequence of steps in the present invention used for specifying system settings and for initializing and operating the data bots that extract, aggregate, store and manipulate information utilized in system processing from: user input, the basic financial system database, the operation management system database, the web site transaction log database, the human resource information system database, risk management system database, external databases, the advanced finance system database, soft asset management system databases, the supply chain system database and the internet;

FIG. 6A, FIG. 6B and FIG. 6C are block diagrams showing the sequence of steps in the present invention that are utilized for initializing and operating the analysis bots;

DETAILED DESCRIPTION OF THE PREFERRED EMBODIMENT

Figure 1:
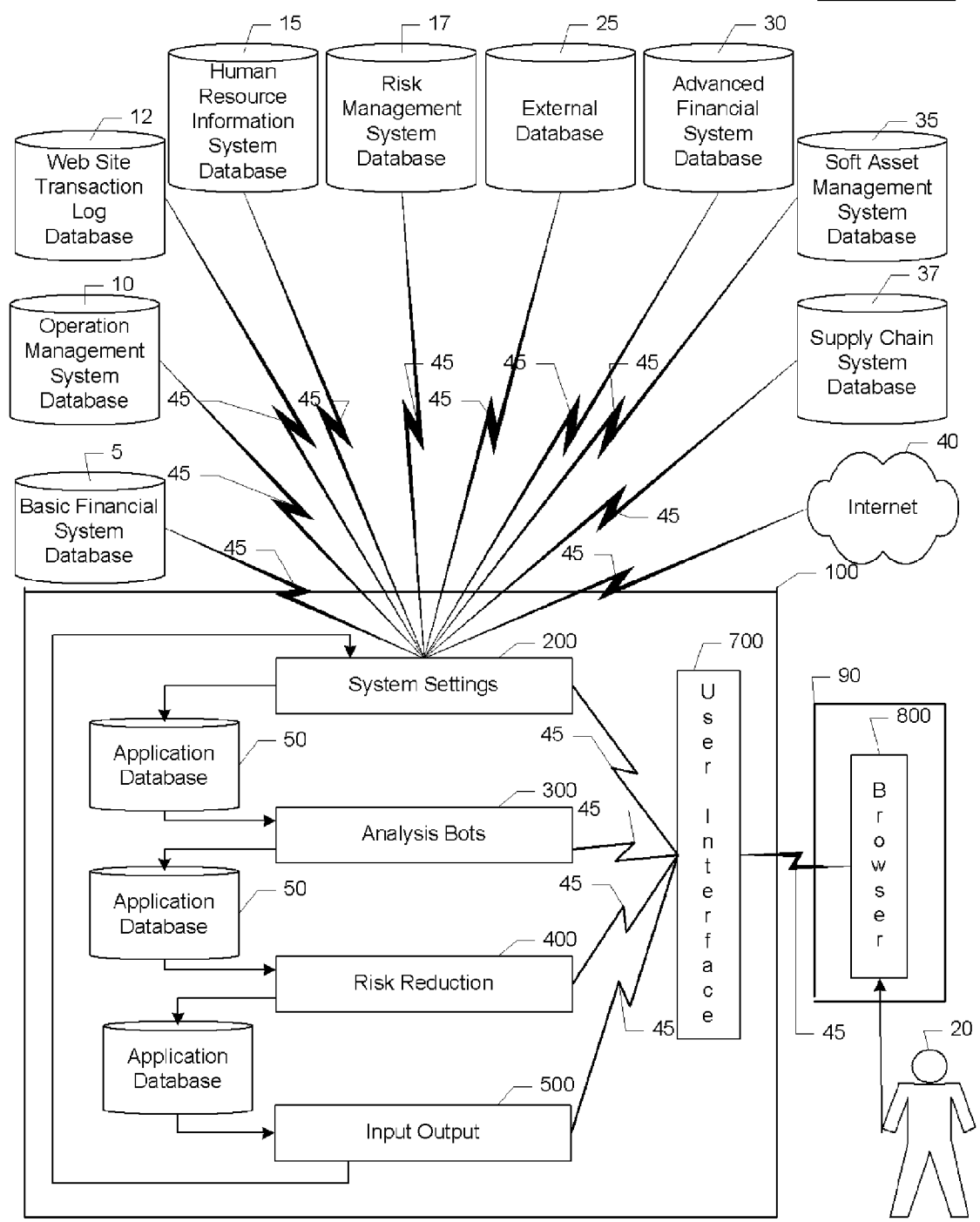
FIG. 1 is a block diagram showing the major processing steps of the present invention.

FIG. 1 provides an overview of the processing completed by the innovative system for risk transfer. In accordance with the present invention, an automated method of and system (100) for risk transfer is provided. Processing starts in this system (100) with the specification of system settings and the initialization and activation of software data "bots" (200) that extract, aggregate, manipulate and store the data and user (20) input required for completing system processing. This information is extracted via a network (45) from: a basic financial system database (5), an operation management system database (10), a web site transaction log database (12), a human resource information system database (15), a risk management system database (17), an external database (25), an advanced financial system database (30), a soft asset management system database (35), a supply chain system database (37) and the internet (40). These information extractions and aggregations may be influenced by a user (20) through interaction with a user-interface portion of the application software (700) that mediates the display, transmission and receipt of all information to and from browser software (800) such as the Microsoft Internet Explorer in an access device (90) such as a phone or personal computer that the user (20) interacts with. In a similar manner, an exchange operator (21) has the ability to influence the operation of the exchange portion of the application software (600) using browser software (800) such as the Microsoft Internet Explorer in the access device (90) to interact with the user-interface portion of the application software (700). While only one database of each type (5, 10, 12, 15, 17, 25, 30, 35 and 37) is shown in FIG. 1, it is to be understood that the system (100) can extract data from multiple databases of each type via the network (45). It also to be understood that the user (20) and the exchange operator (21) can operate separate access devices (90). The preferred embodiment of the present invention contains a soft asset management system for each element of value being analyzed. Automating the extraction and analysis of data from each soft asset management system ensures that each soft asset is considered within the overall financial models for the enterprise. It should also be understood that it is possible to complete a bulk extraction of data from each database (5, 10, 12, 15, 17, 25, 30, 35 and 37) via the network (45) using data extraction applications such as Data Transformation Services from Microsoft or Aclue from Decisionism before initializing the data bots. The data extracted in bulk could be stored in a single datamart or data warehouse where the data bots could operate on the aggregated data.

Figure 2:
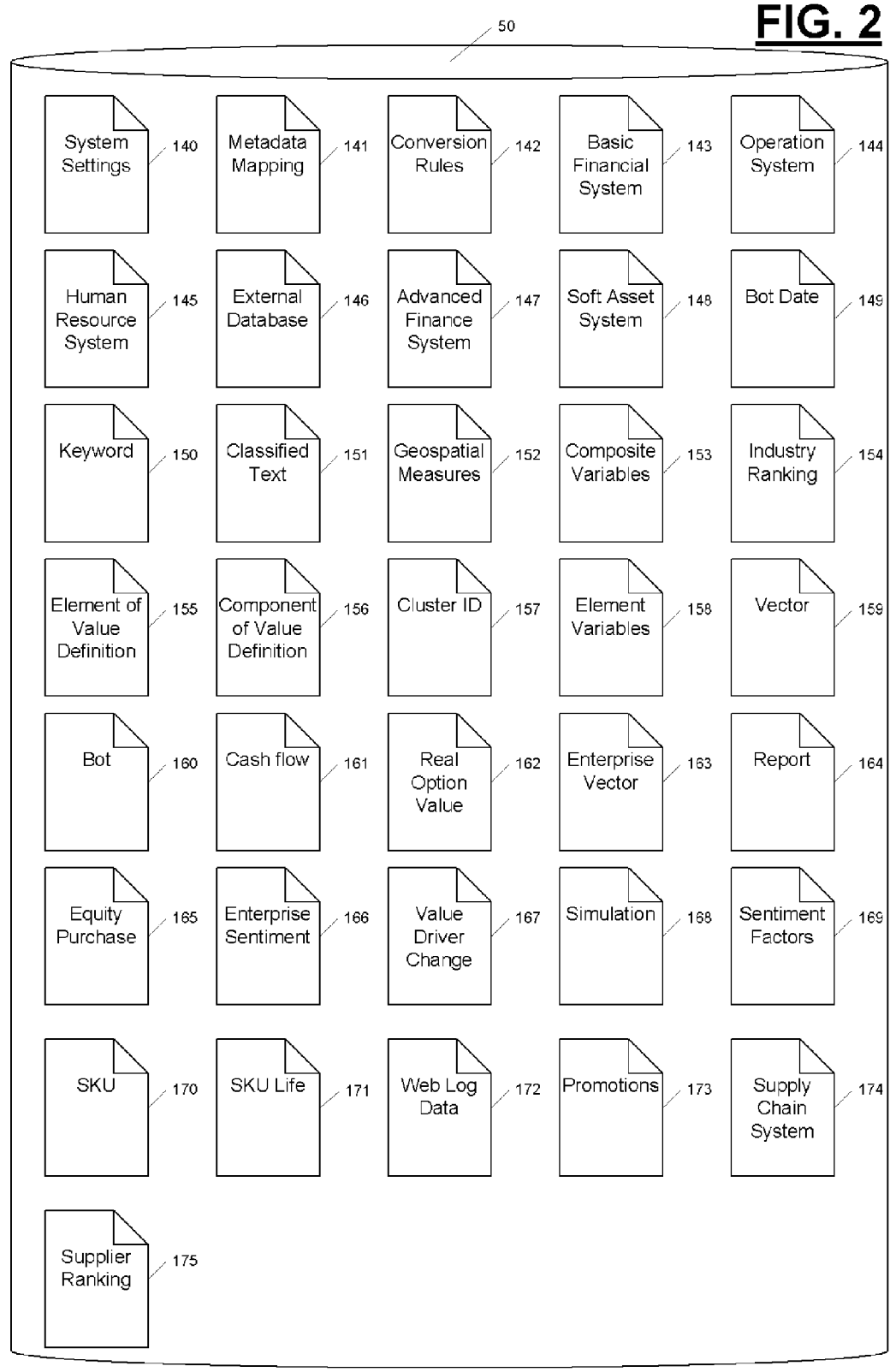
FIG. 2 is a diagram showing the files or tables in the application database (50) of the present invention that are utilized for data storage and retrieval during the processing in the innovative risk transfer system.
Figure 10:
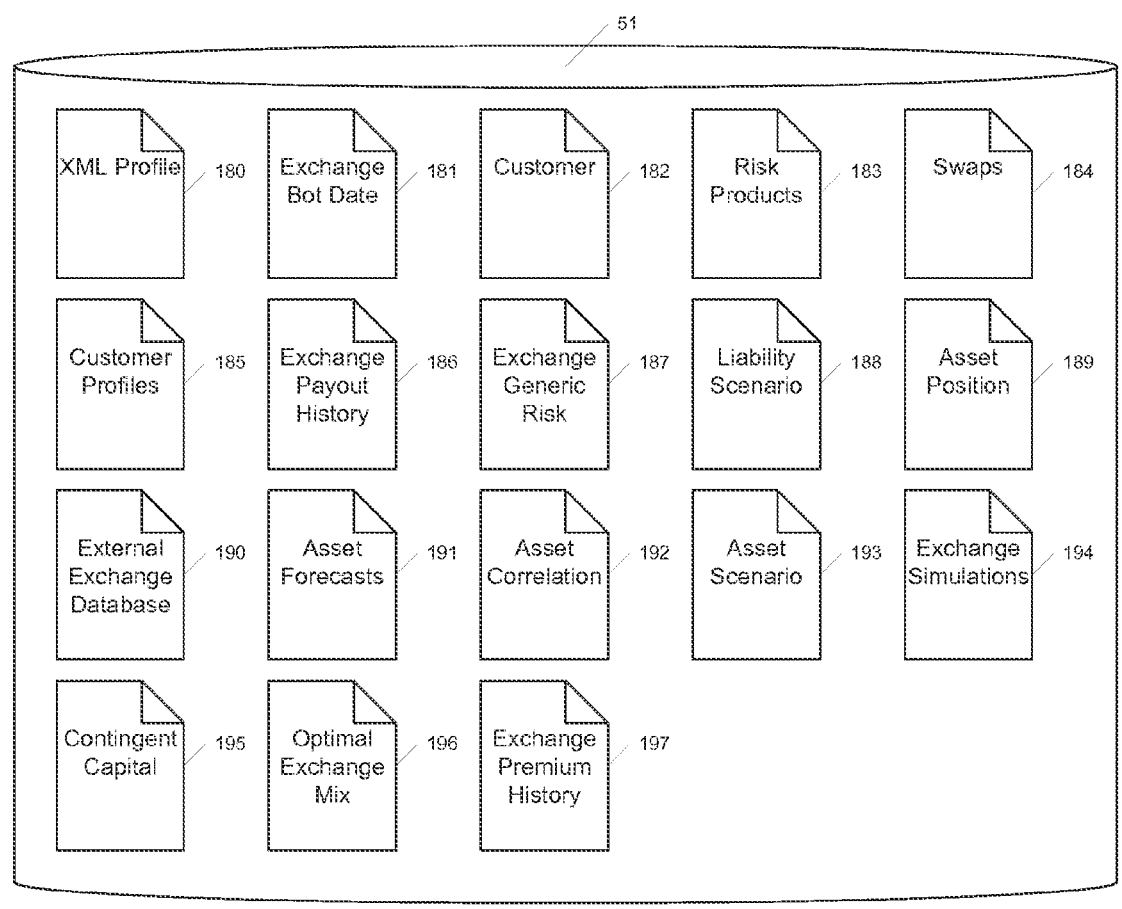
FIG. 10 is a diagram showing the files or tables in the exchange database (51) of the present invention that are utilized for data storage and retrieval during the processing in the innovative risk transfer system.

All extracted information is stored in a file or table (hereinafter, table) within an application database (50) as shown in FIG. 2 or an exchange database (51) as shown in FIG. 10. The application database (50) contains tables for storing user input, extracted information and system calculations including a system settings table (140), a metadata mapping table (141), a conversion rules table (142), a basic financial system table (143), an operation system table (144), a human resource system table (145), an external database table (146), an advanced finance system table (147), a soft asset system table (148), a bot date table (149), a keyword table (150), a classified text table (151), a geospatial measures table (152), a composite variables table (153), an industry ranking table (154), an element of value definition table (155), a component of value definition table (156), a cluster ID table (157), an element variables table (158), a vector table (159), a bot table (160), a cash flow table (161), a real option value table (162), an enterprise vector table (163), a report table (164), an risk reduction purchase table (165), an enterprise sentiment table (166), a value driver change table (167), a simulation table (168), a sentiment factors table (169), an statistics table (170), a scenarios table (171), a web log data table (172), a risk reduction products table (173), a supply chain system table (174), an optimal mix table (175), a risk system table (176), an xml summary table (177), a generic risk table (178) and a risk reduction activity table (179). The application database (50) can optionally exist as a datamart, data warehouse or departmental warehouse. The system of the present invention has the ability to accept and store supplemental or primary data directly from user input, a data warehouse or other electronic files in addition to receiving data from the databases described previously. The system of the present invention also has the ability to complete the necessary calculations without receiving data from one or more of the specified databases. However, in the preferred embodiment all required information is obtained from the specified data sources (5, 10, 12, 15, 17, 25, 30, 35, 37 and 40).

The exchange database (51) contains tables for storing user input, extracted information and system calculations including an xml profile table (180), an exchange bot date table (181), a customer table (182), a risk products table (183), a swaps table (184), a customer profile table (185), an exchange payout history table (186), an exchange generic risk table (187), a liability scenario table (188), an asset position table (189), an external exchange database table (190), an asset forecasts table (191), an asset correlation table (192), an asset scenario table (193), an exchange simulations table (194), a contingent capital table (195), an optimal exchange mix table (196) and an exchange premium history table (157). The exchange database (51) can optionally exist as a datamart, data warehouse or departmental warehouse.

Figure 3:
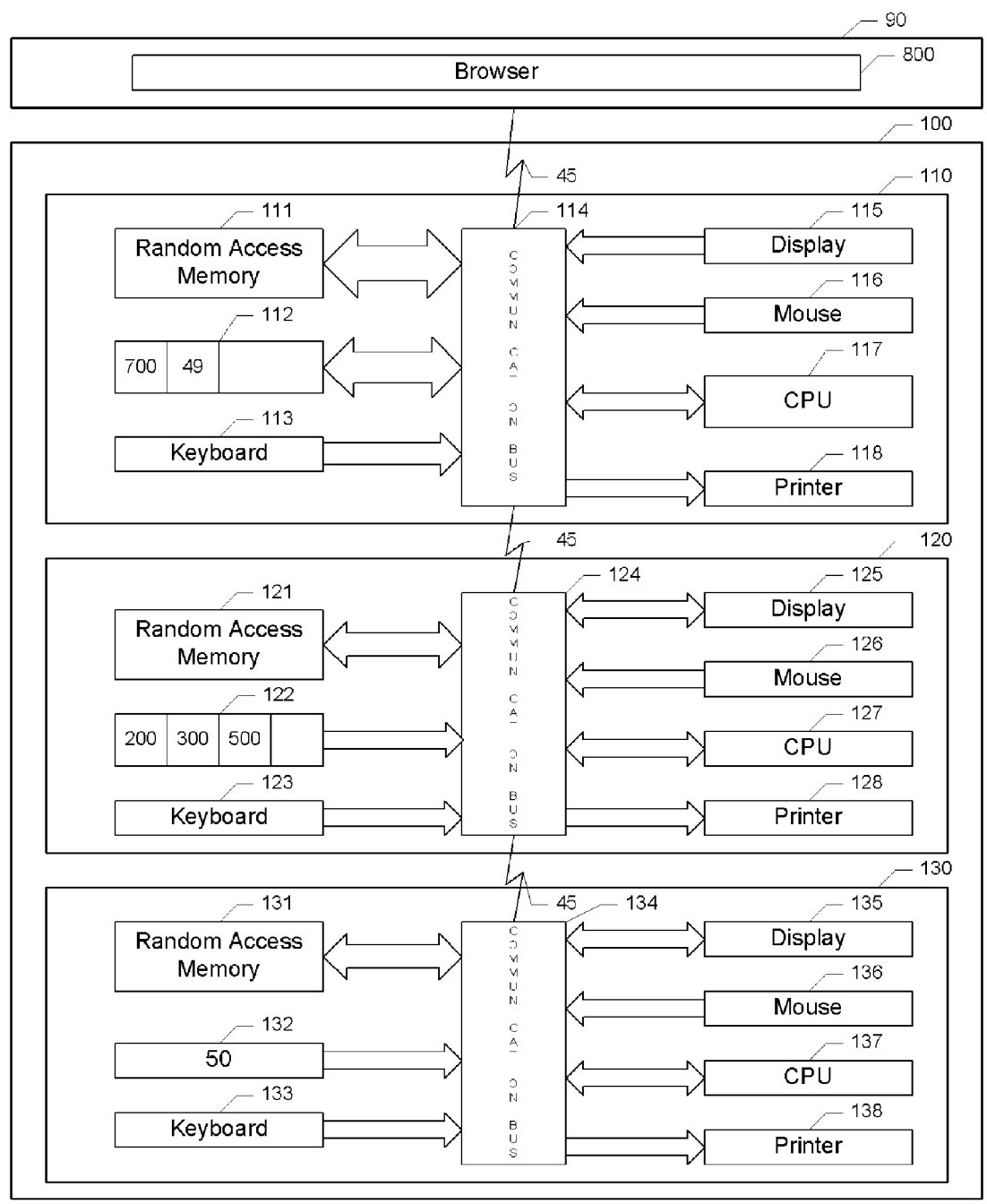
FIG. 3 is a block diagram of an implementation of the present invention.
Figure 4:
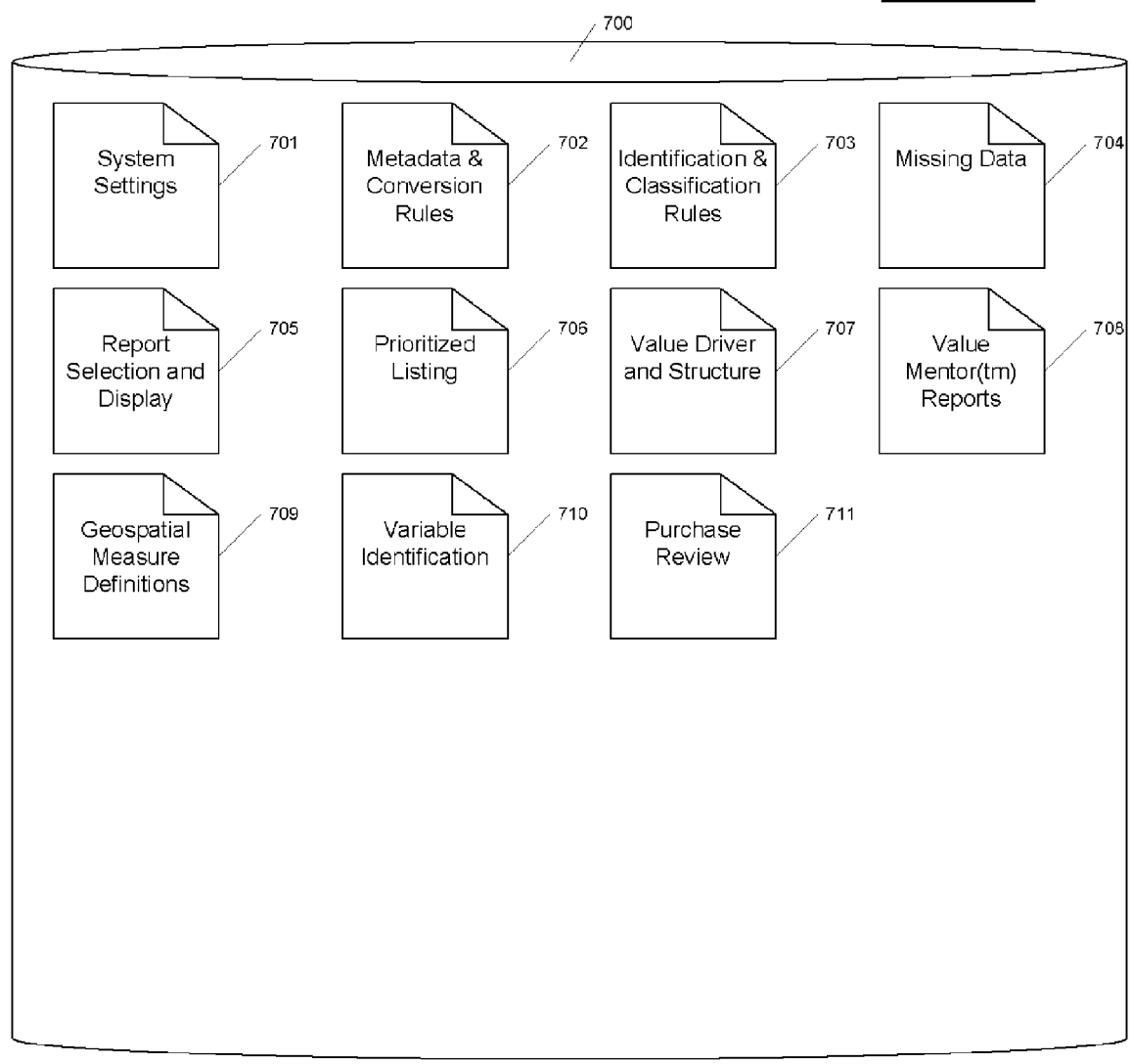
FIG. 4 is a diagram showing the data windows that are used for receiving information from and transmitting information to the user (20) during system processing.
Figure 5B:
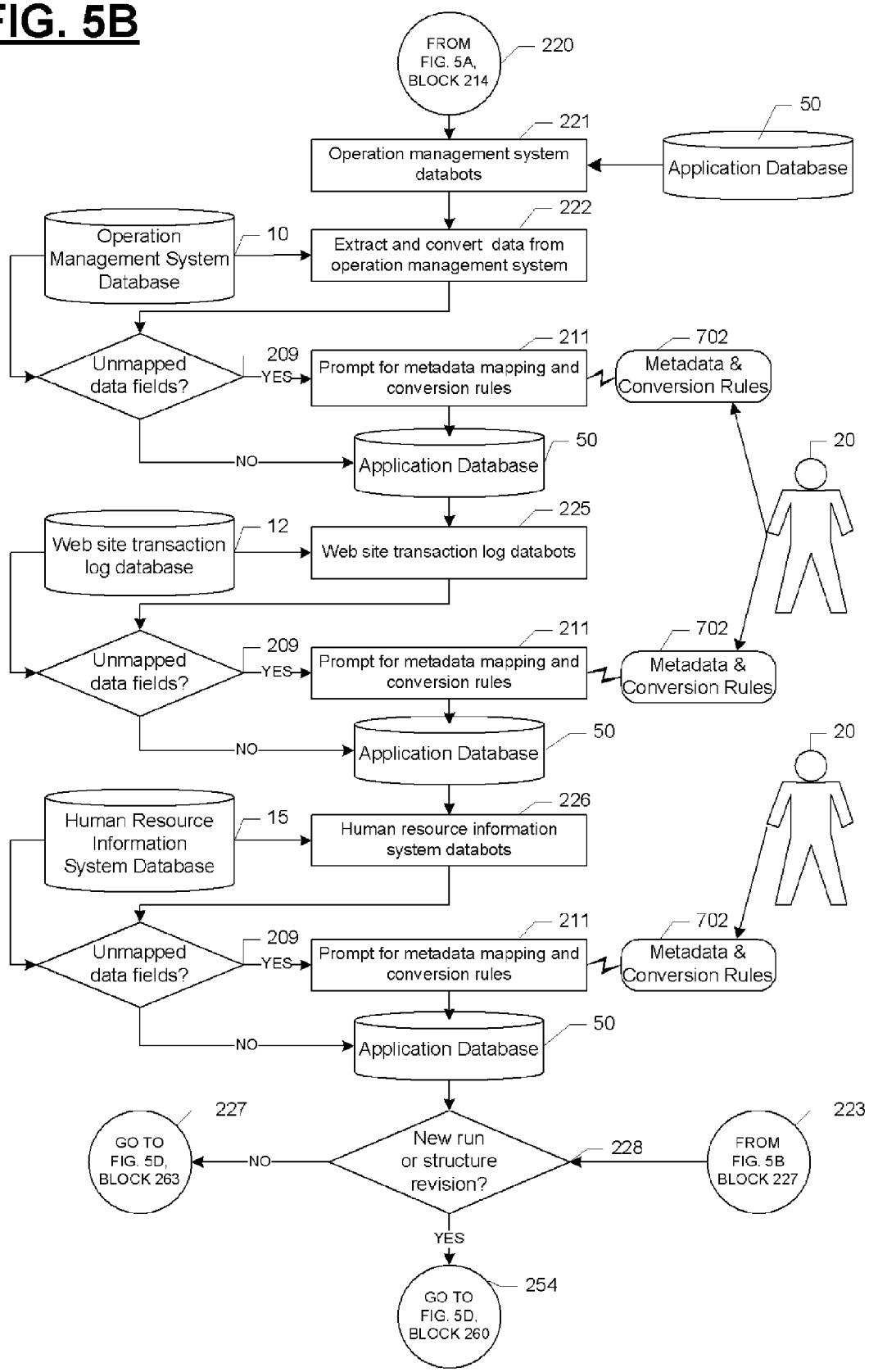
Figure 5C:
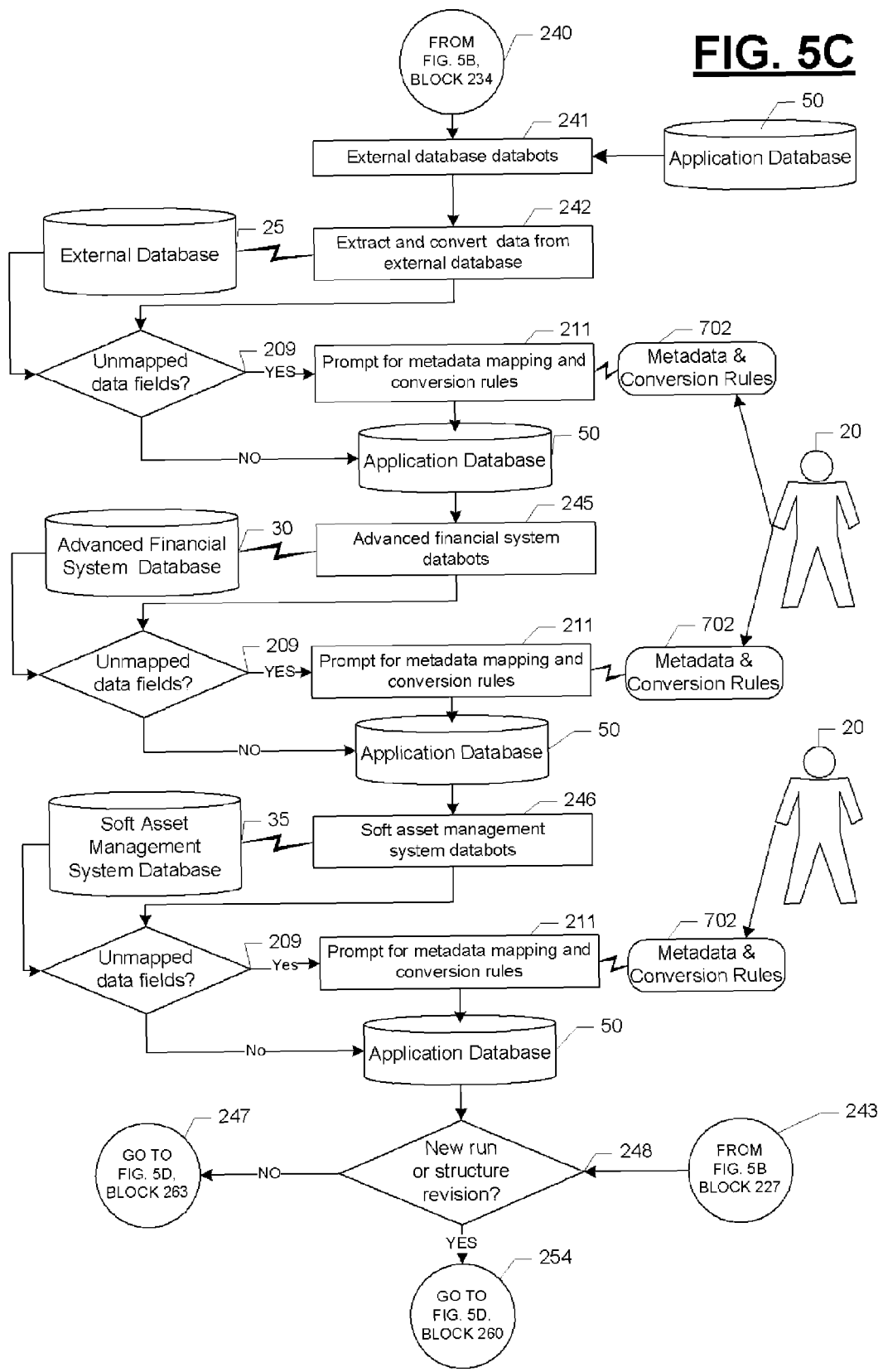
Figure 5E:
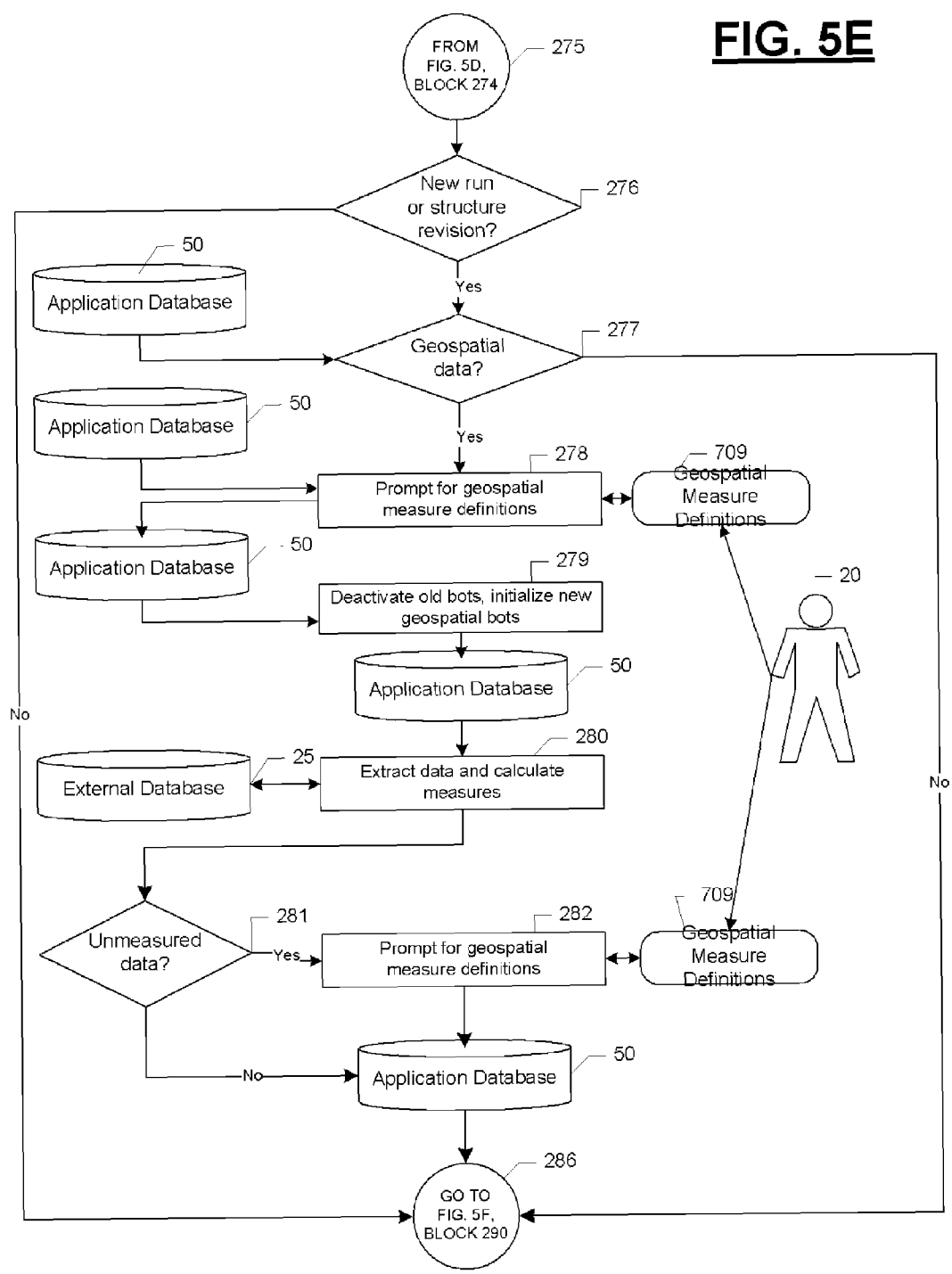
Figure 5F:
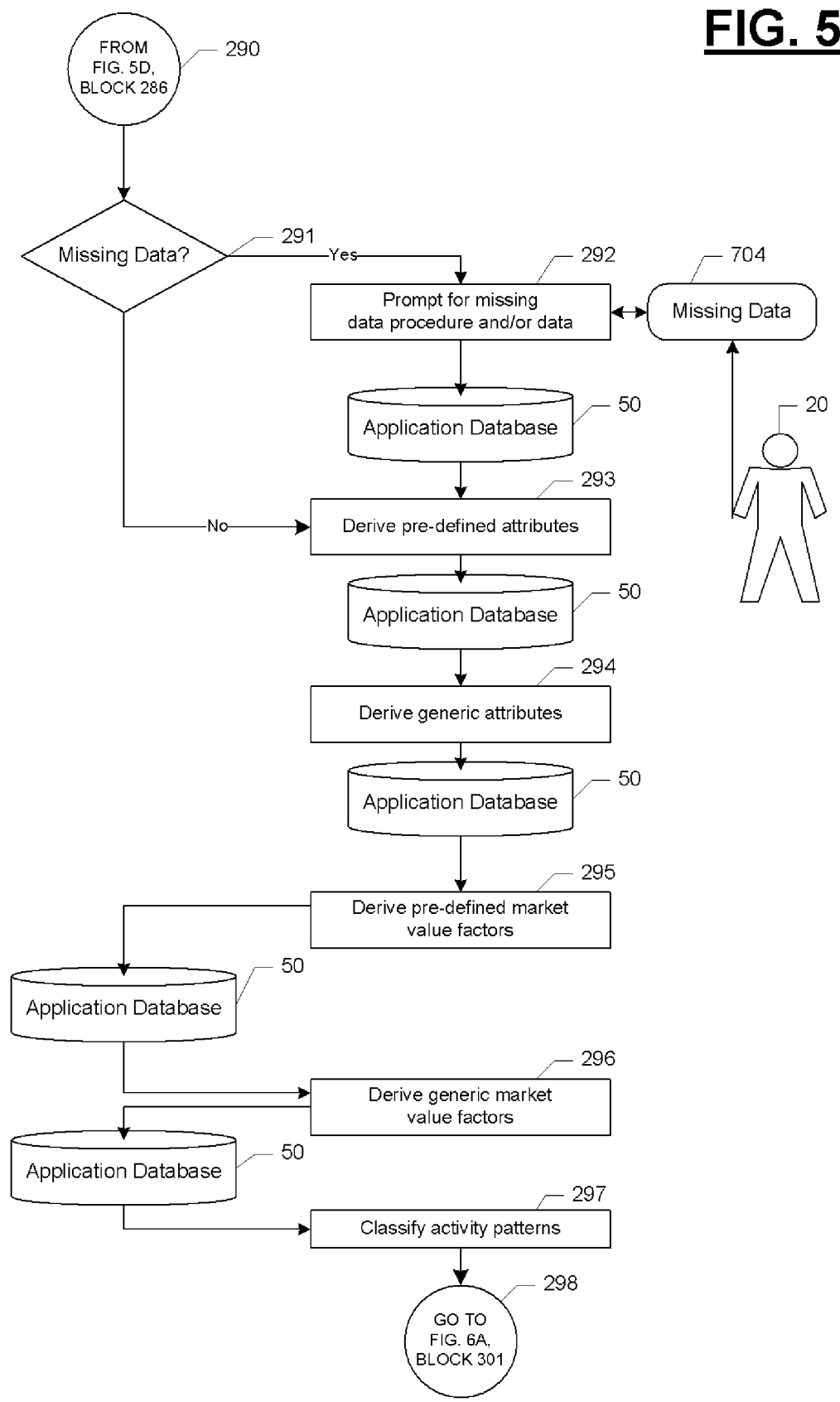

As shown in FIG. 3, the preferred embodiment of the present invention is a computer system (100) illustratively comprised of a user-interface personal computer (110) connected to an application-server personal computer (120) via a network (45). The application server personal computer (120) is in turn connected via the network (45) to a database-server personal computer (130). The database-server personal computer (130) is also connected to the exchange-server personal computer (140). The user interface personal computer (110) is also connected via the network (45) to an internet browser appliance (90) that contains browser software (800) such as Microsoft Internet Explorer or Netscape Navigator.

The exchange-server personal computer (140) has a read/write random access memory (141), a hard drive (142) for storage of the exchange database (51), a keyboard (143), a communications bus (144), a display (145), a mouse (146), a CPU (147) and a printer (148).

The database-server personal computer (130) has a read/write random access memory (131), a hard drive (132) for storage of the application database (50), a keyboard (133), a communications bus (134), a display (135), a mouse (136), a CPU (137) and a printer (138).

While only one database server personal computer is shown in FIG. 3, it is to be understood that the exchange-server personal computer (140) can be networked to one thousand or more database server personal computers (130) via the network (45).

The application-server personal computer (120) has a read/write random access memory (121), a hard drive (122) for storage of the non-user-interface portion of the enterprise portion of the application software (200, 300, 400 and 500) of the present invention, a keyboard (123), a communications bus (124), a display (125), a mouse (126), a CPU (127) and a printer (128). While only one client personal computer is shown in FIG. 3, it is to be understood that the application-server personal computer (120) can be networked to fifty or more client personal computers (110) via the network (45). The application-server personal computer (120) can also be networked to fifty or more server, personal computers (130) via the network (45). It is to be understood that the diagram of FIG. 3 is merely illustrative of one embodiment of the present invention.

The user-interface personal computer (110) has a read/write random access memory (111), a hard drive (112) for storage of a client data-base (49) and the user-interface portion of the application software (700), a keyboard (113), a communications bus (114), a display (115), a mouse (116), a CPU (117) and a printer (118).

The application software (200, 300, 400, 500 and 700) controls the performance of the central processing unit (127) as it completes the calculations required to support the enterprise portion of the risk transfer system. The application software (600) in the exchange server personal computer (140) controls the performance of the central processing unit (147) for the exchange portion of the risk transfer system. In the embodiment illustrated herein, the application software program (200, 300, 400, 500, 600 and 700) is written in a combination of C++ and Visual Basic®. The application software (200, 300, 400, 500, 600 and 700) can use Structured Query Language (SQL) for extracting data from the databases and the internet (5, 10, 12, 15, 17, 25, 30, 35, 37 and 40). The user (20) can optionally interact with the user-interface portion of the application software (700) using the browser software (800) in the browser appliance (90) to provide information to the application software (200, 300, 400, 500 and 700) for use in determining which data will be extracted and transferred to the application database (50) by the data bots.

User input is initially saved to the client database (49) before being transmitted to the communication bus (124) and on to the hard drive (122) of the application-server computer via the network (45). Following the program instructions of the application software, the central processing unit (127) accesses the extracted data and user input by retrieving it from the hard drive (122) using the random access memory (121) as computation workspace in a manner that is well known. The computers (110, 120, 130 and 140) shown in FIG. 3 illustratively are IBM PCs or clones or any of the more powerful computers or workstations that are widely available. Typical memory configurations for client personal computers (110) used with the present invention should include at least 512 megabytes of semiconductor random access memory (111) and at least a 100 gigabyte hard drive (112). Typical memory configurations for the application-server personal computer (120) used with the present invention should include at least 2056 megabytes of semiconductor random access memory (121) and at least a 250 gigabyte hard drive (122). Typical memory configurations for the database-server personal computer (130) used with the present invention should include at least 4112 megabytes of semiconductor random access memory (131) and at least a 500 gigabyte hard drive (132). Typical memory configurations for the exchange-server personal computer (140) used with the present invention should include at least 8224 megabytes of semiconductor random access memory (145) and at least a 750 gigabyte hard drive (141).

Using the system described above, enterprise activity is analyzed, a comprehensive risk management program is developed and implemented for each enterprise after element of value within the enterprise is analyzed using the formulas and data listed in Table 2. As shown in Table 2, the value of the current-operation will be calculated using an income valuation. An integral part of most income valuation models is the calculation of the present value of the expected cash flows, income or profits associated with the current-operation. The present value of a stream of cash flows is calculated by discounting the cash flows at a rate that reflects the risk associated with realizing the cash flow. For example, the present value (PV) of a cash flow of ten dollars ($10) per year for five (5) years would vary depending on the rate used for discounting future cash flows as shown below.

Discount rate = 25%

$$PV = \frac{10}{1.25} + \frac{10}{(1.25)^2} + \frac{10}{(1.25)^3} + \frac{10}{(1.25)^4} + \frac{10}{(1.25)^5} = 26.89$$

Discount rate = 35%

$$PV = \frac{10}{1.35} + \frac{10}{(1.35)^2} + \frac{10}{(1.35)^3} + \frac{10}{(1.35)^4} + \frac{10}{(1.35)^5} = 22.20$$

One of the first steps in evaluating the elements of current-operation value is extracting the data required to complete calculations in accordance with the formula that defines the value of the current-operation as shown in Table 4.

TABLE 4

Value of current-operation =

(R) Value of forecast revenue from current-operation (positive) +
(E) Value of forecast expense for current-operation (negative) +
(C)* Value of current operation capital change forecast

*Note: (C) can have a positive or negative value

The three components of current-operation value will be referred to as the revenue value (R), the expense value (E) and the capital value (C). Examination of the equation in Table 4 shows that there are three ways to increase the value of the current-operation—increase the revenue, decrease the expense or decrease the capital requirements (note: this statement ignores a fourth way to increase value—decrease the interest rate used for discounting future cash flows).

In the preferred embodiment, the revenue, expense and capital requirement forecasts for the current operation, the real options and the contingent liabilities are obtained from an advanced financial planning system database (30) derived from an advanced financial planning system similar to the one disclosed in U.S. Pat. No. 5,615,109. The extracted revenue, expense and capital requirement forecasts are used to calculate a cash flow for each period covered by the forecast for the enterprise by subtracting the expense and change in capital for each period from the revenue for each period. A steady state forecast for future periods is calculated after determining the steady state growth rate that best fits the calculated cash flow for the forecast time period. The steady state growth rate is used to calculate an extended cash flow forecast. The extended cash flow forecast is used to determine the Competitive Advantage Period (CAP) implicit in the enterprise market value.

While it is possible to use analysis bots to sub-divide each of the components of current operation value into a number of sub-components for analysis, the preferred embodiment has a pre-determined number of sub-components for each component of value for the enterprise. The revenue value is not subdivided. In the preferred embodiment, the expense value is subdivided into five sub-components: the cost of raw materials, the cost of manufacture or delivery of service, the cost of selling, the cost of support and the cost of administration. The capital value is subdivided into six sub-components: cash, non-cash financial assets, production equipment, other assets (non financial, non production assets), financial liabilities and equity. The production equipment and equity sub-components are not used directly in evaluating the elements of value.

The components and sub-components of current-operation value will be used in valuing the elements and sub-elements of value. An element of value will be defined as "an identifiable entity or group of items that as a result of past transactions and other data has provided and/or is expected to provide economic benefit to an enterprise". An item will be defined as a single member of the group that defines an element of value. For example, an individual salesman would be an "item" in the "element of value" sales staff. The data associated with performance of an individual item will be referred to as "item variables".

Analysis bots are used to determine element of value lives and the percentage of: the revenue value, the expense value, and the capital value that are attributable to each element of value. The resulting values are then added together to determine the valuation for different elements as shown by the example in Table 5.

TABLE 5

| Gross Value | Percentage | Element Life/CAP* | Net Value |
|---|---|---|---|
| Revenue value = $120M | 20% | 80% | Value = $19.2 M |
| Expense value = ($80M) | 10% | 80% | Value = ($6.4) M |
| Capital value = ($5M) | 5% | 80% | Value = ($0.2) M |
| Total value = $35M | | | |
| Net value for this element: | | | Value = $12.6 M |

*CAP = Competitive Advantage Period

Figure 6A:
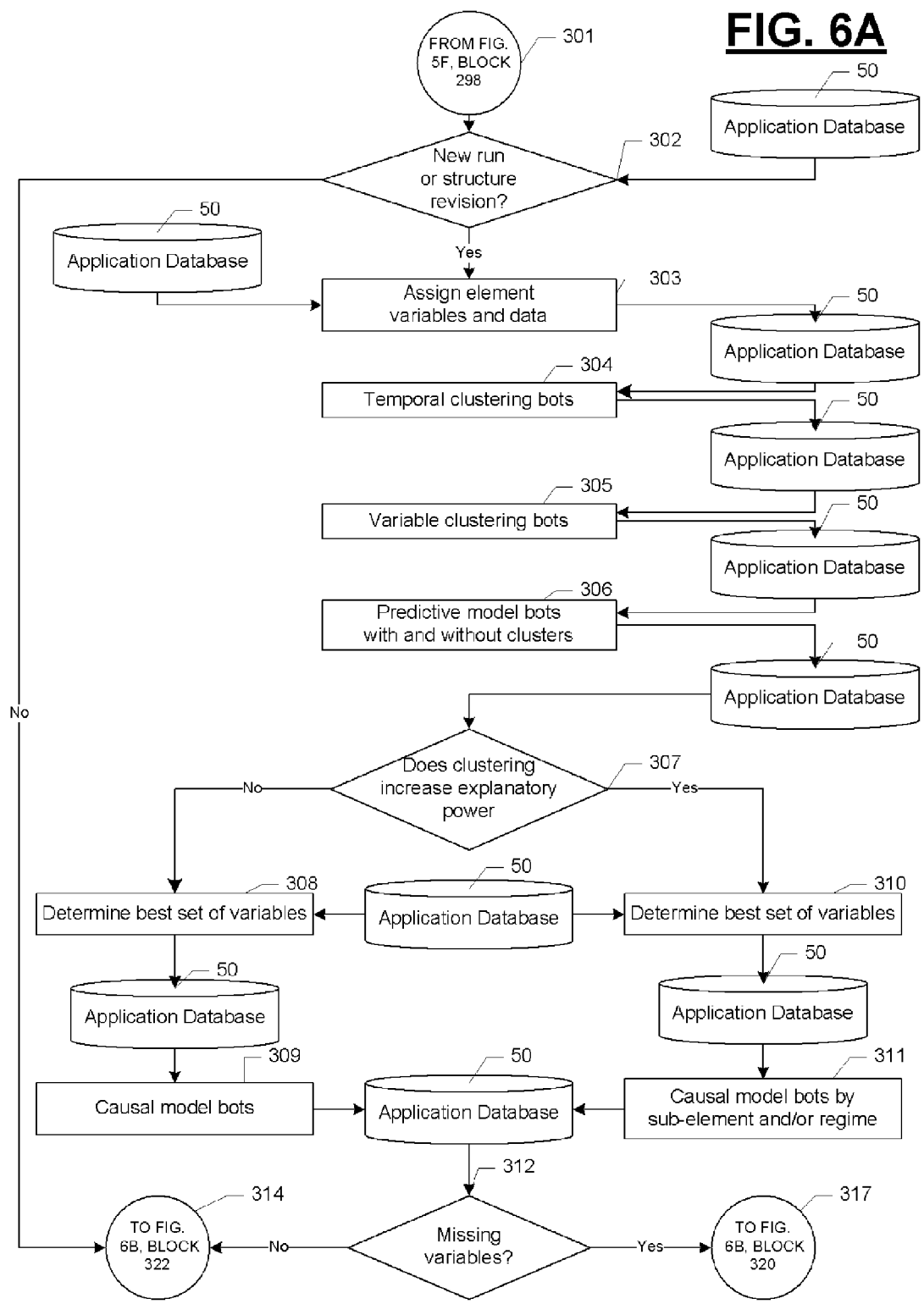
Figure 6B:
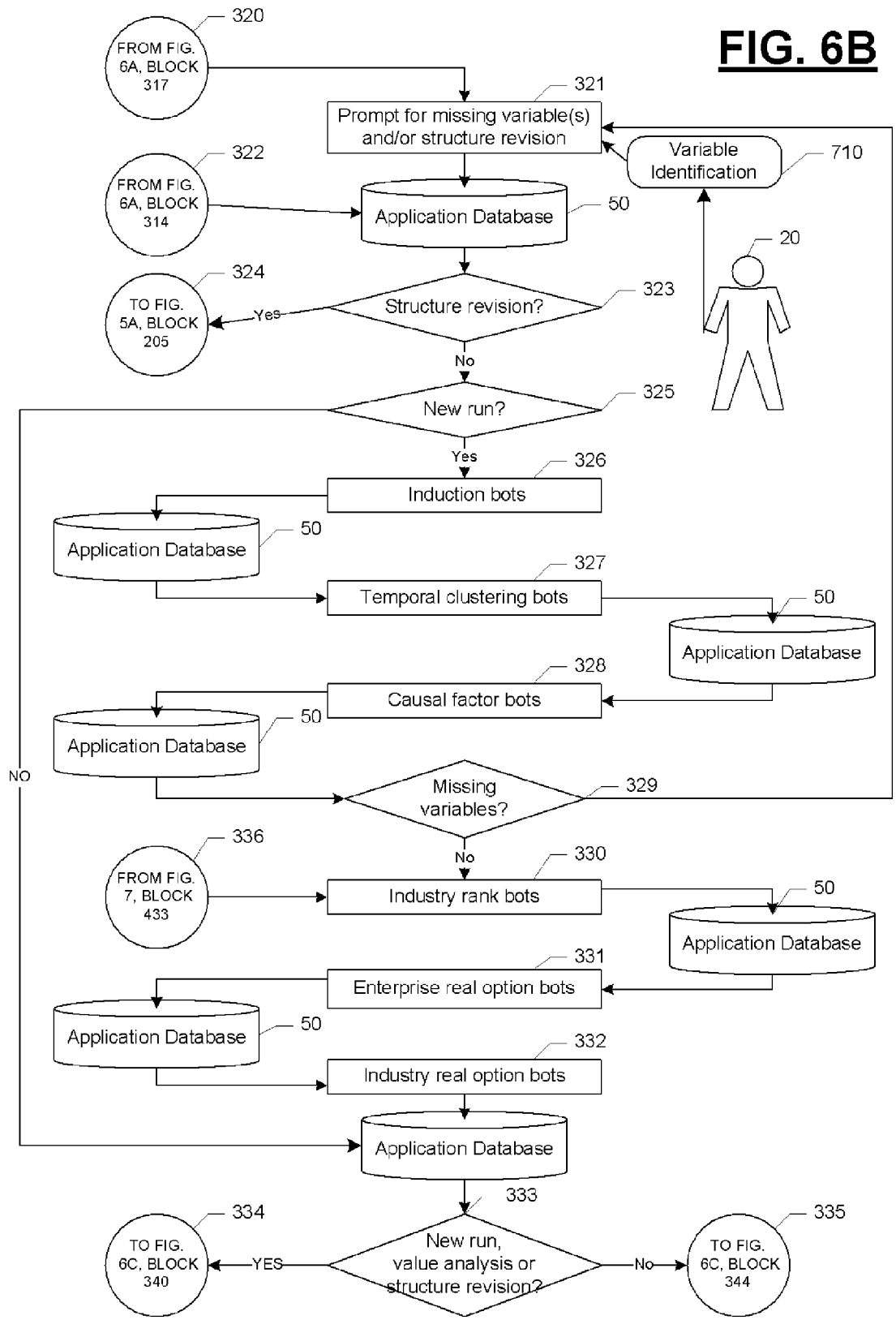

The risk reduction program development using the approach outlined above is completed in five distinct stages. As shown in FIG. 5A, FIG. 5B, FIG. 5C, FIG. 5D, FIG. 5E and FIG. 5F the first stage of processing (block 200 from FIG. 1) programs bots to continually extract, aggregate, manipulate and store the data from user input and databases and the internet (5, 10, 12, 15, 17, 25, 30, 35, 37 and 40) as required for the analysis of business value. Bots are independent components of the application that have specific tasks to perform. As shown in FIG. 6A, FIG. 6B and FIG. 6C the second stage of processing (block 300 from FIG. 1) programs analysis bots that continually:

1. Identify the item variables, item performance indicators and composite variables for each element of value and sub-element of value that drive the components of value (revenue, expense and changes in capital) and the market price of company equity,
2. Create vectors that summarize the performance of the item variables and item performance indicators for each element of value and sub-element of value,
3. Determine the appropriate discount rate on the basis of relative causal element strength and value the enterprise real options and contingent liabilities;
4. Determine the appropriate discount rate, value and allocate the industry real options to the enterprise on the basis of relative causal element strength;
5. Determine the expected life of each element of value and sub-element of value;
6. Calculate the enterprise current operation value and value the revenue, expense and capital components of said current operations using the information prepared in the previous stage of processing;
7. Specify and optimize predictive models to determine the relationship between the vectors determined in step 2 and the revenue, expense and capital component values determined in step 6,
8. Combine the results of the fifth, sixth and seventh stages of processing to determine the value of each element and sub-element (as shown in Table 5); and
9. Determine the causal factors for company stock price movement, calculate market sentiment and analyze the causes of market sentiment.

The third stage of processing (block 400 from FIG. 1) analyzes the risks faced by the enterprise in normal and extreme conditions as required to develop a comprehensive risk management program for the enterprise. The fourth stage of processing (block 500 from FIG. 1) implements the risk reduction program by communicating with the exchange, purchasing the required risk reduction and/or by updating soft asset, finance and operation management systems to implement risk reduction programs. The fifth and final stage of processing (block 600 from FIG. 1) analyzes the risks from all the enterprises using the exchange, sets prices and communicates with each enterprise as required to complete risk reduction program transactions.

System Settings and Data Bots

The flow diagrams in FIG. 5A, FIG. 5B, FIG. 5C, FIG. 5D, FIG. 5E and FIG. 5F detail the processing that is completed by the portion of the application software (200) that extracts, aggregates, transforms and stores the information required for system operation from the: basic financial system database (5), operation management system database (10), the web site transaction log database (12), human resource information system database (15), risk management system database (17), external database (25), advanced financial system database (30), soft asset management system database (35), the supply chain system database (37), the internet (40) and the user (20). A brief overview of the different databases will be presented before reviewing each step of processing completed by this portion (200) of the application software.

Corporate financial software systems are generally divided into two categories, basic and advanced. Advanced financial systems utilize information from the basic financial systems to perform financial analysis, financial planning and financial reporting functions. Virtually every commercial enterprise uses some type of basic financial system as they are required to use these systems to maintain books and records for income tax purposes. An increasingly large percentage of these basic financial systems are resident in microcomputer and workstation systems. Basic financial systems include general-ledger accounting systems with associated accounts receivable, accounts payable, capital asset, inventory, invoicing, payroll and purchasing subsystems. These systems incorporate worksheets, files, tables and databases. These databases, tables and files contain information about the company operations and its related accounting transactions. As will be detailed below, these databases, tables and files are accessed by the application software of the present invention as required to extract the information required for completing a business valuation. The system is also capable of extracting the required information from a data warehouse (or datamart) when the required information has been pre-loaded into the warehouse.

General ledger accounting systems generally store only valid accounting transactions. As is well known, valid accounting transactions consist of a debit component and a credit component where the absolute value of the debit component is equal to the absolute value of the credit component. The debits and the credits are posted to the separate accounts maintained within the accounting system. Every basic accounting system has several different types of accounts. The effect that the posted debits and credits have on the different accounts depends on the account type as shown in Table 6.

TABLE 6

| Account Type: | Debit Impact: | Credit Impact: |
| --- | --- | --- |
| Asset | Increase | Decrease |
| Revenue | Decrease | Increase |
| Expense | Increase | Decrease |
| Liability | Decrease | Increase |
| Equity | Decrease | Increase |

General ledger accounting systems also require that the asset account balances equal the sum of the liability account balances and equity account balances at all times.

The general ledger system generally maintains summary, dollar only transaction histories and balances for all accounts while the associated subsystems, accounts payable, accounts receivable, inventory, invoicing, payroll and purchasing, maintain more detailed historical transaction data and balances for their respective accounts. It is common practice for each subsystem to maintain the detailed information shown in Table 7 for each transaction.

TABLE 7

| Subsystem | Detailed Information |
| --- | --- |
| Accounts Payable | Vendor, Item(s), Transaction Date, Amount Owed, Due Date, Account Number |
| Accounts Receivable | Customer, Transaction Date, Product Sold, Quantity, Price, Amount Due, Terms, Due Date, Account Number |
| Capital Assets | Asset ID, Asset Type, Date of Purchase, Purchase Price, Useful Life, Depreciation Schedule, Salvage Value |
| Inventory | Item Number, Transaction Date, Transaction Type, Transaction Qty, Location, Account Number |
| Invoicing | Customer Name, Transaction Date, Product(s) Sold, Amount Due, Due Date, Account Number |
| Payroll | Employee Name, Employee Title, Pay Frequency, Pay Rate, Account Number |
| Purchasing | Vendor, Item(s), Purchase Quantity, Purchase Price(s), Due Date, Account Number |

As is well known, the output from a general ledger system includes income statements, balance sheets and cash flow statements in well defined formats which assist management in measuring the financial performance of the firm during the prior periods when data input and system processing have been completed.

While basic financial systems are similar between firms, operation management systems vary widely depending on the type of company they are supporting. These systems typically have the ability to not only track historical transactions but to forecast future performance. For manufacturing firms, operation management systems such as Enterprise Resource Planning Systems (ERP), Material Requirement Planning Systems (MRP), Purchasing Systems, Scheduling Systems and Quality Control Systems are used to monitor, coordinate, track and plan the transformation of materials and labor into products. Systems similar to the one described above may also be useful for distributors to use in monitoring the flow of products from a manufacturer.

Operation Management Systems in manufacturing firms may also monitor information relating to the production rates and the performance of individual production workers, production lines, work centers, production teams and pieces of production equipment including the information shown in Table 8.

TABLE 8

Operation Management System - Production Information

1. ID number (employee id/machine id)
2. Actual hours - last batch
3. Standard hours - last batch
4. Actual hours - year to date
5. Actual/Standard hours - year to date %
6. Actual setup time - last batch
7. Standard setup time - last batch
8. Actual setup hours - year to date
9. Actual/Standard setup hrs - yr to date %
10. Cumulative training time
11. Job(s) certifications
12. Actual scrap - last batch
13. Scrap allowance - last batch
14. Actual scrap/allowance - year to date
15. Rework time/unit last batch
16. Rework time/unit year to date
17. QC rejection rate - batch
18. QC rejection rate - year to date Operation management systems are also useful for tracking requests for service to repair equipment in the field or in a centralized repair facility. Such systems generally store information similar to that shown below in Table 9.

TABLE 9

Operation Management System - Service Call Information

1. Customer name
2. Customer number
3. Contract number
4. Service call number
5. Time call received
6. Product(s) being fixed
7. Serial number of equipment
8. Name of person placing call
9. Name of person accepting call
10. Promised response time
11. Promised type of response
12. Time person dispatched to call
13. Name of person handling call
14. Time of arrival on site
15. Time of repair completion
16. Actual response type
17. Part(s) replaced
18. Part(s) repaired
19. 2nd call required
20. 2nd call number Web site transaction log databases keep a detailed record of every visit to a web site, they can be used to trace the path of each visitor to the web site and upon further analysis can be used to identify patterns that are most likely to result in purchases and those that are most likely to result in abandonment. This information can also be used to identify which promotion would generate the most value for the company using the system. Web site transaction logs generally contain the information shown in Table 10.

TABLE 10

Web Site Transaction Log Database

1. Customer's URL
2. Date and time of visit
3. Pages visited
4. Length of page visit (time)
5. Type of browser used
6. Referring site
7. URL of site visited next
8. Downloaded file volume and type
9. Cookies
10. Transactions Computer based human resource systems may some times be packaged or bundled within enterprise resource planning systems such as those available from SAP, Oracle and Peoplesoft. Human resource systems are increasingly used for storing and maintaining corporate records concerning active employees in sales, operations and the other functional specialties that exist within a modern corporation. Storing records in a centralized system facilitates timely, accurate reporting of overall manpower statistics to the corporate management groups and the various government agencies that require periodic updates. In some cases human resource systems include the company payroll system as a subsystem. In the preferred embodiment of the present invention, the payroll system is part of the basic financial system. These systems can also be used for detailed planning regarding future manpower requirements. Human resource systems typically incorporate worksheets, files, tables and databases that contain information about the current and future employees. As will be detailed below, these databases, tables and files are accessed by the application software of the present invention as required to extract the information required for completing a business valuation. It is common practice for human resource systems to store the information shown in Table 11 for each employee.

TABLE 11

Human Resource System Information

1. Employee name
2. Job title
3. Job code
4. Rating
5. Division
6. Department
7. Employee No./(Social Security Number)
8. Year to date - hours paid
9. Year to date - hours worked
10. Employee start date - company
11. Employee start date - department
12. Employee start date - current job
13. Training courses completed
14. Cumulative training expenditures
15. Salary history
16. Current salary
17. Educational background
18. Current supervisor Risk management systems databases (17) contain statistical data about the past behavior and forecasts of likely future behavior of interest rates, currency exchange rates and commodity prices. They also contain information about the current mix of risk reduction products (derivatives, insurance, etc.) the enterprise has purchased. Some companies also use risk management systems to evaluate the desirability of extending or increasing credit lines to customers. The information from these systems can be used to supplement the risk information developed by the system of the present invention.

External databases can be used for obtaining information that enables the definition and evaluation of a variety of things including elements of value, market value factors, industry real options and composite variables. In some cases information from these databases can be used to supplement information obtained from the other databases and the internet (5, 10, 12, 15, 17, 30, 35, 37 and 40). In the system of the present invention, the information extracted from external databases (25) can be in the forms listed in Table 12.

TABLE 12

Types of information 1) numeric information such as that found in the SEC Edgar database and the databases of financial infomediaries such as FirstCall, IBES and Compustat,
2) text information such as that found in the Lexis Nexis database and databases containing past issues from specific publications,
3) risk management products such as derivatives and standardized insurance contracts that can be purchased on line,
4) geospatial data;
5) multimedia information such as video and audio clips, and
6) generic risk data including information about the likelihood of earthquake and weather damage by geospatial location The system of the present invention uses different "bot" types to process each distinct data type from external databases (25). The same "bot types" are also used for extracting each of the different types of data from the internet (40). The system of the present invention must have access to at least one external database (25) that provides information regarding the equity prices for the enterprise and the equity prices and financial performance of competitors.

Advanced financial systems may also use information from external databases (25) and the internet (40) in completing their processing. Advanced financial systems include financial planning systems and activity based costing systems. Activity based costing systems may be used to supplement or displace the operation of the expense component analysis segment of the present invention as disclosed previously. Financial planning systems generally use the same format used by basic financial systems in forecasting income statements, balance sheets and cash flow statements for future periods. Management uses the output from financial planning systems to highlight future financial difficulties with a lead time sufficient to permit effective corrective action and to identify problems in company operations that may be reducing the profitability of the business below desired levels. These systems are most often developed by individuals within companies using two and three dimensional spreadsheets such as Lotus 1-2-3®, Microsoft Excel ® and Quattro Pro®. In some cases, financial planning systems are built within an executive information system (EIS) or decision support system (DSS). For the preferred embodiment of the present invention, the advanced finance system database is similar to the financial planning system database detailed in U.S. Pat. No. 5,165,109 for "Method of and System for Generating Feasible, Profit Maximizing Requisition Sets", by Jeff S. Eder, the disclosure of which is incorporated herein by reference.

While advanced financial planning systems have been around for some time, soft asset management systems are a relatively recent development. Their appearance is further proof of the increasing importance of "soft" assets. Soft asset management systems include: alliance management systems, brand management systems, customer relationship management systems, channel management systems, intellectual property management systems, process management systems and vendor management systems. Soft asset management systems are similar to operation management systems in that they generally have the ability to forecast future events as well as track historical occurrences. Customer relationship management systems are the most well established soft asset management systems at this point and will be the focus of the discussion regarding soft asset management system data. In firms that sell customized products, the customer relationship management system is generally integrated with an estimating system that tracks the flow of estimates into quotations, orders and eventually bills of lading and invoices. In other firms that sell more standardized products, customer relationship management systems generally are used to track the sales process from lead generation to lead qualification to sales call to proposal to acceptance (or rejection) and delivery. All customer relationship management systems would be expected to track all of the customer's interactions with the enterprise after the first sale and store information similar to that shown below in Table 13.

TABLE 13

Customer Relationship Management System - Information

1. Customer/Potential customer name
2. Customer number
3. Address
4. Phone number
5. Source of lead
6. Date of first purchase
7. Date of last purchase
8. Last sales call/contact
9. Sales call history
10. Sales contact history
11. Sales history: product/qty/price
12. Quotations: product/qty/price
13. Custom product percentage
14. Payment history
15. Current A/R balance
16. Average days to pay Supply chain management system databases (37) contain information that may have been in operation management system databases (10) in the past. These systems provide enhanced visibility into the availability of goods and promote improved coordination between customers and their suppliers. All supply chain management systems would be expected to track all of the items ordered by the enterprise after the first purchase and store information similar to that shown below in Table 14.

TABLE 14

Supply Chain Management System Information

1. Stock Keeping Unit (SKU)
2. Vendor
3. Total Quantity on Order
4. Total Quantity in Transit
5. Total Quantity on Back Order
6. Total Quantity in Inventory
7. Quantity available today
8. Quantity available next 7 days
9. Quantity available next 30 days
10. Quantity available next 90 days
11. Quoted lead time
12. Actual average lead time System processing of the information from the different databases (5, 10, 12, 15, 17, 25, 30, 35 and 37) and the internet (40) described above starts in a block 201, FIG. 5A, which immediately passes processing to a software block 202. The software in block 202 prompts the user (20) via the system settings data window (701) to provide system setting information. The system setting information entered by the user (20) is transmitted via the network (45) back to the application server (120) where it is stored in the system settings table (140) in the application database (50) in a manner that is well known. The specific inputs the user (20) is asked to provide at this point in processing are shown in Table 15.

TABLE 15

1. New run or structure revision?
2. Continuous, If yes, frequency? (hourly, daily, weekly, monthly or quarterly)
3. Structure of enterprise (department, etc.)
4. Enterprise checklist
5. Base account structure
6. Metadata standard (XML, MS OIM, MDC)
7. Location of basic financial system database and metadata
8. Location of advanced finance system database and metadata
9. Location of human resource information system database and metadata
10. Location of operation management system database and metadata
11. Location of soft asset management system databases and metadata
12. Location of external databases and metadata
13. Location of web site transaction log database and metadata
14. Location of supply chain management system database and metadata
15. Location of risk management system database and metadata
16. Location of account structure
17. Base currency
18. Location of database and metadata for equity information
19. Location of database and metadata for debt information
20. Location of database and metadata for tax rate information
21. Location of database and metadata for currency conversion rate information
22. Geospatial data? If yes, identity of geocoding service.
23. The maximum number of generations to be processed without improving fitness
24. Default clustering algorithm (selected from list) and maximum cluster number
25. Amount of cash and marketable securities required for day to day operations
26. Total cost of capital (weighted average cost of equity, debt and risk capital)
27. Number of months a product is considered new after it is first produced
28. Enterprise industry segments (SIC Code)
29. Primary competitors by industry segment
30. Management report types (text, graphic, both)
31. Default reports
32. Default Missing Data Procedure
33. Maximum time to wait for user input
34. Maximum discount rate for new projects (real option valuation)
35. Maximum number of sub-elements
36. Maximum amount to be spent on risk reduction per year
37. Confidence interval for risk reduction programs
38. On line account information for risk reduction products The enterprise checklists are used by a "rules" engine (such as the one available from Neuron Data) in block 202 to influence the number and type of items with pre-defined metadata mapping for each category of value. For example, if the checklists indicate that the enterprise is focused on branded, consumer markets, then additional brand related factors will be pre-defined for mapping. The application of these system settings will be further explained as part of the detailed explanation of the system operation.

The software in block 202 uses the current system date to determine the time periods (months) that require data to complete the current operation and the real option valuations. After the date range is calculated it is stored in the system settings table (140). In the preferred embodiment the valuation of the current operation by the system utilizes basic financial, advanced financial, soft asset management, supply chain, web-site transaction, external database and human resource data for the three year period before and the three year forecast period after the current date. The user (20) also has the option of specifying the data periods that will be used for completing system calculations.

After the storage of system setting data is complete, processing advances to a software block 203. The software in block 203 prompts the user (20) via the metadata and conversion rules window (702) to map metadata using the standard specified by the user (20) (XML, Microsoft Open Information Model or the Metadata Coalitions specification) from the basic financial system database (5), the operation management system database (10), the web site transaction log database (12), the human resource information system database (15), the risk management system database (17), the external database (25), the advanced financial system database (30), the soft asset management system database (35) and the supply chain system database (37) to the enterprise hierarchy stored in the system settings table (140) and to the pre-specified fields in the metadata mapping table (141). Pre-specified fields in the metadata mapping table include, the revenue, expense and capital components and sub-components for the enterprise and pre-specified fields for expected value drivers. Because the bulk of the information being extracted is financial information, the metadata mapping often takes the form of specifying the account number ranges that correspond to the different fields in the metadata mapping table (141). Table 16 shows the base account number structure that the account numbers in the other systems must align with. For example, using the structure shown below, the revenue component for the enterprise could be specified as enterprise 01, any department number, accounts 400 to 499 (the revenue account range) with any sub-account.

TABLE 16

| Account Number | 01 - | 902 (any) - | 477- | 86 (any) |
|---|---|---|---|---|
| Segment Subgroup Position | Enterprise Workstation 4 | Department Marketing 3 | Account Revenue 2 | Sub-account Singapore 1 |

As part of the metadata mapping process, any database fields that are not mapped to pre-specified fields are defined by the user (20) as component of value elements of value or non-relevant attributes and "mapped" in the metadata mapping table (141) to the corresponding fields in each database in a manner identical to that described above for the pre-specified fields. After all fields have been mapped to the metadata mapping table (141), the software in block 203 prompts the user (20) via the metadata and conversion rules window (702) to provide conversion rules for each metadata field for each data source. Conversion rules will include information regarding currency conversions and conversion for units of measure that may be required to accurately and consistently analyze the data. The inputs from the user (20) regarding conversion rules are stored in the conversion rules table (142) in the application database (50). When conversion rules have been stored for all fields from every data source, then processing advances to a software block 204.

The software in block 204 checks the system settings table (140) in the application database (50) to determine if the current calculation is a new calculation or a structure change. If the calculation is not a new calculation or a structure change then processing advances to a software block 212. Alternatively, if the calculation is new or a structure change, then processing advances to a software block 207.

The software in block 207 checks the bot date table (149) and deactivates any basic financial system data bots with creation dates before the current system date and retrieves information from the system settings table (140), metadata mapping table (141) and conversion rules table (142). The software in block 207 then initializes data bots for each field in the metadata mapping table (141) that mapped to the basic financial system database (5) in accordance with the frequency specified by user (20) in the system settings table (140). Bots are independent components of the application that have specific tasks to perform. In the case of data acquisition bots, their tasks are to extract and convert data from a specified source and then store it in a specified location. Each data bot initialized by software block 207 will store its data in the basic financial system table (143). Every data acquisition bot for every data source contains the information shown in Table 17.

TABLE 17

1. Unique ID number (based on date, hour, minute, second of creation)
2. The data source location
3. Mapping information
4. Timing of extraction
5. Conversion rules (if any)
6. Storage Location (to allow for tracking of source and destination events)
7. Creation date (date, hour, minute, second)

After the software in block 207 initializes all the bots for the basic financial system database, processing advances to a block 208. In block 208, the bots extract and convert data in accordance with their preprogrammed instructions in accordance with the frequency specified by user (20) in the system settings table (140). As each bot extracts and converts data from the basic financial system database (5), processing advances to a software block 209 before the bot completes data storage. The software in block 209 checks the basic financial system metadata to see if all fields have been extracted. If the software in block 209 finds no unmapped data fields, then the extracted, converted data are stored in the basic financial system table (143). Alternatively, if there are fields that haven't been extracted, then processing advances to a block 211. The software in block 211 prompts the user (20) via the metadata and conversion rules window (702) to provide metadata and conversion rules for each new field. The information regarding the new metadata and conversion rules is stored in the metadata mapping table (141) and conversion rules table (142) while the extracted, converted data are stored in the basic financial system table (143). It is worth noting at this point that the activation and operation of bots where all the fields have been mapped to the application database (50) continues. Only bots with unmapped fields "wait" for user input before completing data storage. The new metadata and conversion rule information will be used the next time bots are initialized in accordance with the frequency established by the user (20). In either event, system processing passes on to software block 212.

The software in block 212 checks the system settings table (140) in the application database (50) to determine if the current calculation is a new calculation or a structure change. If the calculation is not a new calculation or a structure change then processing advances to a software block 228. Alternatively, if the calculation is new or a structure change, then processing advances to a software block 221.

The software in block 221 checks the bot date table (149) and deactivates any operation management system data bots with creation dates before the current system date and retrieves information from the system settings table (140), metadata mapping table (141) and conversion rules table (142). The software in block 221 then initializes data bots for each field in the metadata mapping table (141) that mapped to the operation management system database (10) in accordance with the frequency specified by user (20) in the system settings table (140). Each data bot initialized by software block 221 will store its data in the operation system table (144).

After the software in block 221 initializes all the bots for the operation management system database, processing advances to a block 222. In block 222, the bots extract and convert data in accordance with their preprogrammed instructions in accordance with the frequency specified by user (20) in the system settings table (140). As each bot extracts and converts data from the operation management system database (10), processing advances to a software block 209 before the bot completes data storage. The software in block 209 checks the operation management system metadata to see if all fields have been extracted. If the software in block 209 finds no unmapped data fields, then the extracted, converted data are stored in the operation system table (144). Alternatively, if there are fields that haven't been extracted, then processing advances to a block 211. The software in block 211 prompts the user (20) via the metadata and conversion rules window (702) to provide metadata and conversion rules for each new field. The information regarding the new metadata and conversion rules is stored in the metadata mapping table (141) and conversion rules table (142) while the extracted, converted data are stored in the operation system table (144). It is worth noting at this point that the activation and operation of bots where all the fields have been mapped to the application database (50) continues. Only bots with unmapped fields "wait" for user input before completing data storage. The new metadata and conversion rule information will be used the next time bots are initialized in accordance with the frequency established by the user (20). In either event, system processing then passes on to a software block 225.

The software in block 225 checks the bot date table (149) and deactivates any web site transaction log data bots with creation dates before the current system date and retrieves information from the system settings table (140), metadata mapping table (141) and conversion rules table (142). The software in block 225 then initializes data bots for each field in the metadata mapping table (141) that mapped to the web site transaction log database (12) in accordance with the frequency specified by user (20) in the system settings table (140). Each data bot initialized by software block 225 will store its data in the web log data table (172).

After the software in block 225 initializes all the bots for the web site transaction log database, the bots extract and convert data in accordance with their preprogrammed instructions in accordance with the frequency specified by user (20) in the system settings table (140). As each bot extracts and converts data from the web site transaction log database (12), processing advances to a software block 209 before the bot completes data storage. The software in block 209 checks the web site transaction log metadata to see if all fields have been extracted. If the software in block 209 finds no unmapped data fields, then the extracted, converted data are stored in the web log data table (172). Alternatively, if there are fields that haven't been extracted, then processing advances to a block 211. The software in block 211 prompts the user (20) via the metadata and conversion rules window (702) to provide metadata and conversion rules for each new field. The information regarding the new metadata and conversion rules is stored in the metadata mapping table (141) and conversion rules table (142) while the extracted, converted data are stored in the web log data table (172). It is worth noting at this point that the activation and operation of bots where all the fields have been mapped to the application database (50) continues. Only bots with unmapped fields "wait" for user input before completing data storage. The new metadata and conversion rule information will be used the next time bots are initialized in accordance with the frequency established by the user (20). In either event, system processing then passes on to a software block 226.

The software in block 226 checks the bot date table (149) and deactivates any human resource information system data bots with creation dates before the current system date and retrieves information from the system settings table (140), metadata mapping table (141) and conversion rules table (142). The software in block 226 then initializes data bots for each field in the metadata mapping table (141) that mapped to the human resource information system database (15) in accordance with the frequency specified by user (20) in the system settings table (140). Each data bot initialized by software block 226 will store its data in the human resource system table (145).

After the software in block 226 initializes all the bots for the human resource information system database, the bots extract and convert data in accordance with their preprogrammed instructions in accordance with the frequency specified by user (20) in the system settings table (140). As each bot extracts and converts data from the human resource information system database (15), processing advances to a software block 209 before the bot completes data storage. The software in block 209 checks the human resource information system metadata to see if all fields have been extracted. If the software in block 209 finds no unmapped data fields, then the extracted, converted data are stored in the human resource system table (145). Alternatively, if there are fields that haven't been extracted, then processing advances to a block 211. The software in block 211 prompts the user (20) via the metadata and conversion rules window (702) to provide metadata and conversion rules for each new field. The information regarding the new metadata and conversion rules is stored in the metadata mapping table (141) and conversion rules table (142) while the extracted, converted data are stored in the human resource system table (145). It is worth noting at this point that the activation and operation of bots where all the fields have been mapped to the application database (50) continues. Only bots with unmapped fields "wait" for user input before completing data storage. The new metadata and conversion rule information will be used the next time bots are initialized in accordance with the frequency established by the user (20). In either event, system processing then passes on to software block 228.

The software in block 228 checks the system settings table (140) in the application database (50) to determine if the current calculation is a new calculation or a structure change. If the calculation is not a new calculation or a structure change then processing advances to a software block 248. Alternatively, if the calculation is new or a structure change, then processing advances to a software block 241.

The software in block 241 checks the bot date table (149) and deactivates any external database data bots with creation dates before the current system date and retrieves information from the system settings table (140), metadata mapping table (141) and conversion rules table (142). The software in block 241 then initializes data bots for each field in the metadata mapping table (141) that mapped to the external database (25)

in accordance with the frequency specified by user (20) in the system settings table (140). Each data bot initialized by software block 241 will store its data in the external database table (146).

After the software in block 241 initializes all the bots for the external database, processing advances to a block 242. In block 242, the bots extract and convert data in accordance with their preprogrammed instructions. As each bot extracts and converts data from the external database (25), processing advances to a software block 209 before the bot completes data storage. The software in block 209 checks the external database metadata to see if all fields have been extracted. If the software in block 209 finds no unmapped data fields, then the extracted, converted data are stored in the external database table (146). Alternatively, if there are fields that haven't been extracted, then processing advances to a block 211. The software in block 211 prompts the user (20) via the metadata and conversion rules window (702) to provide metadata and conversion rules for each new field. The information regarding the new metadata and conversion rules is stored in the metadata mapping table (141) and conversion rules table (142) while the extracted, converted data are stored in the external database table (146). It is worth noting at this point that the activation and operation of bots where all the fields have been mapped to the application database (50) continues. Only bots with unmapped fields "wait" for user input before completing data storage. The new metadata and conversion rule information will be used the next time bots are initialized in accordance with the frequency established by the user (20). In either event, system processing then passes on to a software block 245.

The software in block 245 checks the bot date table (149) and deactivates any advanced financial system data bots with creation dates before the current system date and retrieves information from the system settings table (140), metadata mapping table (141) and conversion rules table (142). The software in block 245 then initializes data bots for each field in the metadata mapping table (141) that mapped to the advanced financial system database (30) in accordance with the frequency specified by user (20) in the system settings table (140). Each data bot initialized by software block 245 will store its data in the advanced finance system database table (147).

After the software in block 245 initializes all the bots for the advanced finance system database, the bots extract and convert data in accordance with their preprogrammed instructions in accordance with the frequency specified by user (20) in the system settings table (140). As each bot extracts and converts data from the advanced financial system database (30), processing advances to a software block 209 before the bot completes data storage. The software in block 209 checks the advanced finance system database metadata to see if all fields have been extracted. If the software in block 209 finds no unmapped data fields, then the extracted, converted data are stored in the advanced finance system database table (147). Alternatively, if there are fields that haven't been extracted, then processing advances to a block 211. The software in block 211 prompts the user (20) via the metadata and conversion rules window (702) to provide metadata and conversion rules for each new field. The information regarding the new metadata and conversion rules is stored in the metadata mapping table (141) and conversion rules table (142) while the extracted, converted data are stored in the advanced finance system database table (147). It is worth noting at this point that the activation and operation of bots where all the fields have been mapped to the application database (50) continues. Only bots with unmapped fields "wait" for user input before completing data storage. The new metadata and conversion rule information will be used the next time bots are initialized in accordance with the frequency established by the user (20). In either event, system processing then passes on to software block 246.

The software in block 246 checks the bot date table (149) and deactivates any soft asset management system data bots with creation dates before the current system date and retrieves information from the system settings table (140), metadata mapping table (141) and conversion rules table (142). The software in block 246 then initializes data bots for each field in the metadata mapping table (141) that mapped to a soft asset management system database (35) in accordance with the frequency specified by user (20) in the system settings table (140). Extracting data from each soft asset management system ensures that the management of each soft asset is considered and prioritized within the overall financial models for the each enterprise. Each data bot initialized by software block 246 will store its data in the soft asset system table (148).

After the software in block 246 initializes bots for all soft asset management system databases, the bots extract and convert data in accordance with their preprogrammed instructions in accordance with the frequency specified by user (20) in the system settings table (140). As each bot extracts and converts data from the soft asset management system databases (35), processing advances to a software block 209 before the bot completes data storage. The software in block 209 checks the metadata for the soft asset management system databases to see if all fields have been extracted. If the software in block 209 finds no unmapped data fields, then the extracted, converted data are stored in the soft asset system table (148). Alternatively, if there are fields that haven't been extracted, then processing advances to a block 211. The software in block 211 prompts the user (20) via the metadata and conversion rules window (702) to provide metadata and conversion rules for each new field. The information regarding the new metadata and conversion rules is stored in the metadata mapping table (141) and conversion rules table (142) while the extracted, converted data are stored in the soft asset system table (148). It is worth noting at this point that the activation and operation of bots where all the fields have been mapped to the application database (50) continues. Only bots with unmapped fields "wait" for user input before completing data storage. The new metadata and conversion rule information will be used the next time bots are initialized in accordance with the frequency established by the user (20). In either event, system processing then passes on to software block 248.

The software in block 248 checks the system settings table (140) in the application database (50) to determine if the current calculation is a new calculation or a structure change. If the calculation is not a new calculation or a structure change then processing advances to a software block 264. Alternatively, if the calculation is new or a structure change, then processing advances to a software block 261.

The software in block 261 checks the bot date table (149) and deactivates any risk management system data bots with creation dates before the current system date and retrieves information from the system settings table (140), metadata mapping table (141) and conversion rules table (142). The software in block 261 then initializes data bots for each field in the metadata mapping table (141) that mapped to a risk management system database (17) in accordance with the frequency specified by user (20) in the system settings table (140). Each data bot initialized by software block 261 will store its data in the risk system table (176).

After the software in block 261 initializes bots for all risk management system databases, the bots extract and convert data in accordance with their preprogrammed instructions in accordance with the frequency specified by user (20) in the system settings table (140). As each bot extracts and converts data from the risk management system databases (17), processing advances to a software block 209 before the bot completes data storage. The software in block 209 checks the metadata for the risk management system database (17) to see if all fields have been extracted. If the software in block 209 finds no unmapped data fields, then the extracted, converted data are stored in the risk management system table (174). Alternatively, if there are fields that haven't been extracted, then processing advances to a block 211. The software in block 211 prompts the user (20) via the metadata and conversion rules window (702) to provide metadata and conversion rules for each new field. The information regarding the new metadata and conversion rules is stored in the metadata mapping table (141) and conversion rules table (142) while the extracted, converted data are stored in the risk management system table (174). It is worth noting at this point that the activation and operation of bots where all the fields have been mapped to the application database (50) continues. Only bots with unmapped fields "wait" for user input before completing data storage. The new metadata and conversion rule information will be used the next time bots are initialized in accordance with the frequency established by the user (20). In either event, system processing then passes on to software block 262.

The software in block 262 checks the bot date table (149) and deactivates any supply chain system data bots with creation dates before the current system date and retrieves information from the system settings table (140), metadata mapping table (141) and conversion rules table (142). The software in block 262 then initializes data bots for each field in the metadata mapping table (141) that mapped to a supply chain system database (37) in accordance with the frequency specified by user (20) in the system settings table (140). Each data bot initialized by software block 262 will store its data in the supply chain system table (174).

After the software in block 262 initializes bots for all supply chain system databases, the bots extract and convert data in accordance with their preprogrammed instructions in accordance with the frequency specified by user (20) in the system settings table (140). As each bot extracts and converts data from the supply chain system databases (37), processing advances to a software block 209 before the bot completes data storage. The software in block 209 checks the metadata for the supply chain system database (37) to see if all fields have been extracted. If the software in block 209 finds no unmapped data fields, then the extracted, converted data are stored in the supply chain system table (174). Alternatively, if there are fields that haven't been extracted, then processing advances to a block 211. The software in block 211 prompts the user (20) via the metadata and conversion rules window (702) to provide metadata and conversion rules for each new field. The information regarding the new metadata and conversion rules is stored in the metadata mapping table (141) and conversion rules table (142) while the extracted, converted data are stored in the supply chain system table (174). It is worth noting at this point that the activation and operation of bots where all the fields have been mapped to the application database (50) continues. Only bots with unmapped fields "wait" for user input before completing data storage. The new metadata and conversion rule information will be used the next time bots are initialized in accordance with the frequency established by the user (20). In either event, system processing then passes on to software block 264.

The software in block 264 checks the system settings table (140) in the application database (50) to determine if the current calculation is a new calculation or a structure change. If the calculation is not a new calculation or a structure change then processing advances to a software block 276. Alternatively, if the calculation is new or a structure change, then processing advances to a software block 265.

The software in block 265 prompts the user (20) via the identification and classification rules window (703) to identify keywords such as company names, brands, trademarks and competitors for pre-specified fields in the metadata mapping table (141). The user (20) also has the option of mapping keywords to other fields in the metadata mapping table (141). After specifying the keywords, the user (20) is prompted to select and classify descriptive terms for each keyword. The input from the user (20) is stored in the keyword table (150) in the application database before processing advances to a software block 267.

The software in block 267 checks the bot date table (149) and deactivates any internet text and linkage bots with creation dates before the current system date and retrieves information from the system settings table (140), the metadata mapping table (141) and the keyword table (150). The software in block 267 then initializes internet text and linkage bots for each field in the metadata mapping table (141) that mapped to a keyword in accordance with the frequency specified by user (20) in the system settings table (140).

Bots are independent components of the application that have specific tasks to perform. In the case of text and linkage bots, their tasks are to locate, count and classify keyword matches and linkages from a specified source and then store their findings in a specified location. Each text and linkage bot initialized by software block 267 will store the location, count and classification data it discovers in the classified text table (151). Multimedia data can be processed using bots with essentially the same specifications if software to translate and parse the multimedia content is included in each bot. Every internet text and linkage bot contains the information shown in Table 18.

TABLE 18

1. Unique ID number (based on date, hour, minute, second of creation)
2. Creation date (date, hour, minute, second)
3. Storage location
4. Mapping information
5. Home URL
6. Keyword
7. Descriptive term 1
To
7 + n. Descriptive term n After being initialized, the text and linkage bots locate and classify data from the internet (40) in accordance with their programmed instructions with the frequency specified by user (20) in the system settings table (140). As each text bot locates and classifies data from the internet (40) processing advances to a software block 268 before the bot completes data storage. The software in block 268 checks to see if all linkages are identified and all keyword hits are associated with descriptive terms that have been classified. If the software in block 268 doesn't find any unclassified "hits" or "links", then the address, counts and classified text are stored in the classified text table (151). Alternatively, if there are terms that haven't been classified or links that haven't been identified, then processing advances to a block 269. The software in block 269 prompts the user (20) via the identification and classification rules window (703) to provide classification rules for each new term. The information regarding the new classification rules is stored in the keyword table (150) while the newly classified text and linkages are stored in the classified text table (151). It is worth noting at this point that the activation and operation of bots where all fields map to the application database (50) continues. Only bots with unclassified fields will "wait" for user input before completing data storage. The new classification rules will be used the next time bots are initialized in accordance with the frequency established by the user (20). In either event, system processing then passes on to a software block 270.

The software in block 270 checks the bot date table (149) and deactivates any external database bots with creation dates before the current system date and retrieves information from the system settings table (140), the metadata mapping table (141) and the keyword table (150). The software in block 270 then initializes external database bots for each field in the metadata mapping table (141) that mapped to a keyword in accordance with the frequency specified by user (20) in the system settings table (140). Every bot initialized by software block 270 will store the location, count and classification of data it discovers in the classified text table (151). Every external database bot contains the information shown in Table 19.

TABLE 19

1. Unique ID number (based on date, hour, minute, second of creation)
2. Creation date (date, hour, minute, second)
3. Storage location
4. Mapping information
5. Data source
6. Keyword
7. Storage location
8. Descriptive term 1
To
8 + n. Descriptive term n After being initialized the bots locate data from the external database (25) in accordance with its programmed instructions with the frequency specified by user (20) in the system settings table (140). As each bot locates and classifies data from the external database (25) processing advances to a software block 268 before the bot completes data storage. The software in block 268 checks to see if all keyword hits are associated with descriptive terms that have been classified. If the software in block 268 doesn't find any unclassified "hits", then the address, count and classified text are stored in the classified text table (151) or the external database table (146) as appropriate. Alternatively, if there are terms that haven't been classified, then processing advances to a block 269. The software in block 269 prompts the user (20) via the identification and classification rules window (703) to provide classification rules for each new term. The information regarding the new classification rules is stored in the keyword table (150) while the newly classified text is stored in the classified text table (151). It is worth noting at this point that the activation and operation of bots where all fields map to the application database (50) continues. Only bots with unclassified fields "wait" for user input before completing data storage. The new classification rules will be used the next time bots are initialized in accordance with the frequency established by the user (20). In either event, system processing then passes on to software block 276.

The software in block 276 checks the system settings table (140) in the application database (50) to determine if the current calculation is a new calculation or a structure change.

If the calculation is not a new calculation or a structure change then processing advances to a software block 291. Alternatively, if the calculation is new or a structure change, then processing advances to a software block 277.

The software in block 277 checks the system settings table (140) to see if there is geocoded data in the application database (50) and to determine which on-line geocoding service (Centrus™ from QM Soft or MapMarker™ from Mapinfo) is being used. If geospatial data are not being used, then processing advances to a block 291. Alternatively, if the software in block 277 determines that geospatial data are being used, processing advances to a software block 278.

The software in block 278 prompts the user (20) via the geospatial measure definitions window (709) to define the measures that will be used in evaluating the elements of value. After specifying the measures, the user (20) is prompted to select the geospatial locus for each measure from the data already stored in the application database (50). The input from the user (20) is stored in the geospatial measures table (152) in the application database before processing advances to a software block 279.

The software in block 279 checks the bot date table (149) and deactivates any geospatial bots with creation dates before the current system date and retrieves information from the system settings table (140), the metadata mapping table (141) and the geospatial measures table (152). The software in block 279 then initializes geospatial bots for each field in the metadata mapping table (141) that mapped to geospatial data in the application database (50) in accordance with the frequency specified by user (20) in the system settings table (140) before advancing processing to a software block 280.

Bots are independent components of the application that have specific tasks to perform. In the case of geospatial bots, their tasks are to calculate user specified measures using a specified geocoding service and then store the measures in a specified location. Each geospatial bot initialized by software block 279 will store the measures it calculates in the application database table where the geospatial data was found. Tables that could include geospatial data include: the basic financial system table (143), the operation system table (144), the human resource system table (145), the external database table (146), the advanced finance system table (147) and the soft asset system table (148). Every geospatial bot contains the information shown in Table 20.

TABLE 20

1. Unique ID number (based on date, hour, minute, second of creation)
2. Creation date (date, hour, minute, second)
3. Mapping information
4. Storage location
5. Geospatial locus
6. Geospatial measure
7. Geocoding service In block 280 the geospatial bots locate data and complete measurements in accordance with their programmed instructions with the frequency specified by the user (20) in the system settings table (140). As each geospatial bot retrieves data and calculates the geospatial measures that have been specified, processing advances to a block 281 before the bot completes data storage. The software in block 281 checks to see if all geospatial data located by the bot has been measured. If the software in block 281 doesn't find any unmeasured data, then the measurement is stored in the application database (50). Alternatively, if there are data elements that haven't been measured, then processing advances to a block 282. The software in block 282 prompts the user (20) via the geospatial measure definition window (709) to provide measurement rules for each new term. The information regarding the new measurement rules is stored in the geospatial measures table (152) while the newly calculated measurement is stored in the appropriate table in the application database (50). It is worth noting at this point that the activation and operation of bots that don't have unmeasured fields continues. Only the bots with unmeasured fields "wait" for user input before completing data storage. The new measurement rules will be used the next time bots are initialized in accordance with the frequency established by the user (20). In either event, system processing then passes on to a software block 291.

The software in block 291 checks: the basic financial system table (143), the operation system table (144), the human resource system table (145), the external database table (146), the advanced finance system table (147), the soft asset system table (148), the classified text table (151) and the geospatial measures table (152) to see if data are missing from any of the periods required for system calculation. The range of required dates was previously calculated by the software in block 202. If there are no data missing from any period, then processing advances to a software block 293. Alternatively, if there are missing data for any field for any period, then processing advances to a block 292.

The software in block 292, prompts the user (20) via the missing data window (704) to specify the method to be used for filling the blanks for each item that is missing data. Options the user (20) can choose from for filling the blanks include: the average value for the item over the entire time period, the average value for the item over a specified period, zero, the average of the preceding item and the following item values and direct user input for each missing item. If the user (20) doesn't provide input within a specified interval, then the default missing data procedure specified in the system settings table (140) is used. When all the blanks have been filled and stored for all of the missing data, system processing advances to a block 293.

The software in block 293 calculates attributes by item for each numeric data field in the basic financial system table (143), the operation system table (144), the human resource system table (145), the external database table (146), the advanced finance system table (147) and the soft asset system table (148). The attributes calculated in this step include: cumulative total value, the period-to-period rate of change in value, the rolling average value and a series of time lagged values. In a similar fashion the software in block 293 calculates attributes for each date field in the specified tables including time since last occurrence, cumulative time since first occurrence, average frequency of occurrence and the rolling average frequency of occurrence. The numbers derived from numeric and date fields are collectively referred to as "item performance indicators". The software in block 293 also calculates pre-specified combinations of variables called composite variables for measuring the strength of the different elements of value. The item performance indicators are stored in the table where the item source data was obtained and the composite variables are stored in the composite variables table (153) before processing advances to a block 294.

The software in block 294 uses attribute derivation algorithms such as the AQ program to create combinations of the variables that weren't pre-specified for combination. While the AQ program is used in the preferred embodiment of the present invention, other attribute derivation algorithms, such as the LINUS algorithms, may be used to the same effect. The software creates these attributes using both item variables that were specified as "element" variables and item variables that were not. The resulting composite variables are stored in the composite variables table (153) before processing advances to a block 295.

The software in block 295 derives market value factors by enterprise for each numeric data field with data in the sentiment factors table (169). Market value factors include: the ratio of enterprise earnings to expected earnings, commodity prices not captured in process valuations, inflation rate, growth in g.d.p., volatility, volatility vs. industry average volatility, interest rates, increases in interest rates, insider trading direction and levels, consumer confidence and the unemployment rate that have an impact on the market price of the equity for an enterprise and/or an industry. The market value factors derived in this step include: cumulative totals, the period to period rate of change, the rolling average value and a series of time lagged values. In a similar fashion the software in block 295 calculates market value factors for each date field in the specified table including time since last occurrence, cumulative time since first occurrence, average frequency of occurrence and the rolling average frequency of occurrence. The numbers derived from numeric and date fields are collectively referred to as "market performance indicators". The software in block 295 also calculates pre-specified combinations of variables called composite factors for measuring the strength of the different market value factors. The market performance indicators and the composite factors are stored in the sentiment factors table (169) before processing advances to a block 296.

The software in block 296 uses attribute derivation algorithms, such as the Linus algorithm, to create combinations of the factors that were not pre-specified for combination. While the Linus algorithm is used in the preferred embodiment of the present invention, other attribute derivation algorithms, such as the AQ program, may be used to the same effect. The software creates these attributes using both market value factors that were included in "composite factors" and market value factors that were not. The resulting composite variables are stored in the sentiment factors table (169) before processing advances to a block 297.

The software in block 297 uses pattern-matching algorithms to assign pre-designated data fields for different elements of value to pre-defined groups with numerical values. This type of analysis is useful in classifying purchasing patterns and/or communications patterns as "heavy", "light", "moderate" or "sporadic". The classification and the numeric value associated with the classification are stored in the application database (50) table where the data field is located before processing advances to a block 298.

The software in block 298 retrieves data from the metadata mapping table (141), creates and then stores the definitions for the pre-defined components of value in the components of value definition table (155). As discussed previously, the revenue component of value is not divided into sub-components, the expense value is divided into five sub-components: the cost of raw materials, the cost of manufacture or delivery of service, the cost of selling, the cost of support and the cost of administration and the capital value is divided into six sub-components: cash, non-cash financial assets, production equipment, other assets, financial liabilities and equity in the preferred embodiment. Different subdivisions of the components of value can be used to the same effect. When data storage is complete, processing advances to a software block 302 to begin the analysis of the extracted data using analysis bots.

Analysis Bots

The flow diagrams in FIG. 6A, FIG. 6B and FIG. 6C detail the processing that is completed by the portion of the application software (300) that programs analysis bots to:

1. Identify the item variables, item performance indicators and composite variables for each enterprise, element of value and sub-element of value that drive the components of value (revenue, expense and changes in capital),
2. Create vectors that use item variables, item performance indicators and composite variables to summarize the performance of each enterprise, element of value and sub-element of value,
3. Determine the causal factors for industry value, determine the appropriate interest rate, value and allocate the industry real options to each enterprise on the basis of relative element strength;
4. Determine the appropriate interest rate on the basis of relative causal element strength and value the enterprise real options;
5. Determine the expected life of each element of value and sub-element of value;
6. Calculate the enterprise current operation value and value the revenue, expense and capital components using the information prepared in the previous stage of processing;
7. Specify and optimize predictive causal models to determine the relationship between the vectors determined in step 2 and the revenue, expense and capital values determined in step 6,
8. Combine the results of the fifth, sixth and seventh stages of processing to determine the value of each, enterprise contribution, element and sub-element (as shown in Table 5);
9. Calculate the market sentiment by subtracting the current operation value, the total value of real options and the allocated industry options from market value for the enterprise (if it has a public stock market price); and
10. Analyze the sources of market sentiment.

Each analysis bot generally normalizes the data being analyzed before processing begins.

Processing in this portion of the application begins in software block 302. The software in block 302 checks the system settings table (140) in the application database (50) to determine if the current calculation is a new calculation or a structure change. If the calculation is not a new calculation or a structure change then processing advances to a software block 314. Alternatively, if the calculation is new or a structure change, then processing advances to a software block 303.

The software in block 303 retrieves data from the meta data mapping table (141) and the soft asset system table (148) and then assigns item variables, item performance indicators and composite variables to each element of value using a two-step process. First, item variables and item performance indicators are assigned to elements of value based on the soft asset management system they correspond to (for example, all item variables from a brand management system and all item performance indicators derived from brand management system variables are assigned to the brand element of value). Second, pre-defined composite variables are assigned to the element of value they were assigned to measure in the metadata mapping table (141). After the assignment of variables and indicators to elements is complete, the resulting assignments are saved to the element of value definition table (155) and processing advances to a block 304.

The software in block 304 checks the bot date table (149) and deactivates any temporal clustering bots with creation dates before the current system date. The software in block 304 then initializes bots as required for each component of value. The bots: activate in accordance with the frequency specified by the user (20) in the system settings table (140), retrieve the information from the system settings table (140), the metadata mapping table (141) and the component of value definition table (156) as required and define segments for the component of value data before saving the resulting cluster information in the application database (50).

Bots are independent components of the application that have specific tasks to perform. In the case of temporal clustering bots, their primary task is to segment the component and sub-component of value variables into distinct time regimes that share similar characteristics. The temporal clustering bot assigns a unique identification (id) number to each "regime" it identifies and stores the unique id numbers in the cluster id table (157). Every time period with data are assigned to one of the regimes. The cluster id for each regime is saved in the data record for each item variable in the table where it resides. The item variables are segmented into a number of regimes less than or equal to the maximum specified by the user (20) in the system settings. The data are segmented using a competitive regression algorithm that identifies an overall, global model before splitting the data and creating new models for the data in each partition. If the error from the two models is greater than the error from the global model, then there is only one regime in the data. Alternatively, if the two models produce lower error than the global model, then a third model is created. If the error from three models is lower than from two models then a fourth model is added. The process continues until adding a new model does not improve accuracy. Other temporal clustering algorithms may be used to the same effect. Every temporal clustering bot contains the information shown in Table 21.

TABLE 21

1. Unique ID number (based on date, hour, minute, second of creation)
2. Creation date (date, hour, minute, second)
3. Mapping information
4. Storage location
5. Maximum number of clusters
6. Variable 1
. . .
6 + n. Variable n When bots in block 304 have identified and stored regime assignments for all time periods with data, processing advances to a software block 305.

The software in block 305 checks the bot date table (149) and deactivates any variable clustering bots with creation dates before the current system date. The software in block 305 then initializes bots as required for each element of value. The bots: activate in accordance with the frequency specified by the user (20) in the system settings table (140), retrieve the information from the system settings table (140), the metadata mapping table (141) and the element of value definition table (155) as required and define segments for the element of value data before saving the resulting cluster information in the application database (50).

Bots are independent components of the application that have specific tasks to perform. In the case of variable clustering bots, their primary task is to segment the element of value variables into distinct clusters that share similar characteristics. The clustering bot assigns a unique id number to each "cluster" it identifies and stores the unique id numbers in the cluster id table (157). Every item variable for every element of value is assigned to one of the unique clusters. The cluster id for each variable is saved in the data record for each item variable in the table where it resides. The item variables are segmented into a number of clusters less than or equal to the maximum specified by the user (20) in the system settings table (140). The data are segmented using the "default" clustering algorithm the user (20) specified in the system settings. The system of the present invention provides the user (20) with the choice of several clustering algorithms including: an unsupervised "Kohonen" neural network, neural network, decision tree, support vector method, K-nearest neighbor, expectation maximization (EM) and the segmental K-means algorithm. For algorithms that normally require the number of clusters to be specified, the bot will iterate the number of clusters until it finds the cleanest segmentation for the data. Every variable clustering bot contains the information shown in Table 22.

TABLE 22

1. Unique ID number (based on date, hour, minute, second of creation)
2. Creation date (date, hour, minute, second)
3. Mapping information
4. Storage location
5. Element of value
6. Clustering algorithm type
7. Maximum number of clusters
8. Variable 1
... to
8 + n. Variable n When bots in block 305 have identified and stored cluster assignments for the item variables associated with each component and subcomponent of value, processing advances to a software block 306.

The software in block 306 checks the bot date table (149) and deactivates any predictive model bots with creation dates before the current system date. The software in block 306 then retrieves the information from the system settings table (140), the metadata mapping table (141), the element of value definition table (155) and the component of value definition table (156) required to initialize predictive model bots for each component of value.

Bots are independent components of the application that have specific tasks to perform. In the case of predictive model bots, their primary task is to determine the relationship between the item variables, item performance indicators and composite variables (collectively hereinafter, "the variables") and the components of value (and sub-components of value). Predictive model bots are initialized for each component and sub-component of value. They are also initialized for each cluster and regime of data in accordance with the cluster and regime assignments specified by the bots in blocks 304 and 305. A series of predictive model bots is initialized at this stage because it is impossible to know in advance which predictive model type will produce the "best" predictive model for the data from each commercial enterprise. The series for each model includes 12 predictive model bot types: neural network; CART; GARCH, projection pursuit regression; generalized additive model (GAM), redundant regression network; rough-set analysis, boosted Naïve Bayes Regression; MARS; linear regression; support vector method and stepwise regression. Additional predictive model types can be used to the same effect. The software in block 306 generates this series of predictive model bots for the levels of the enterprise shown in Table 23.

TABLE 23

Predictive models by enterprise level

Enterprise:
Element variables relationship to enterprise revenue component of value
Element variables relationship to enterprise expense subcomponents of value
Element variables relationship to enterprise capital change subcomponents of value
Element of Value:
Sub-element of value variables relationship to element of value Every predictive model bot contains the information shown in Table 24.

TABLE 24

1. Unique ID number (based on date, hour, minute, second of creation)
2. Creation date (date, hour, minute, second)
3. Mapping information
4. Storage location
5. Component or subcomponent of value
6. Global or Cluster (ID) and/or Regime (ID)
7. Element or Sub-Element ID
8. Predictive Model Type
9. Variable 1
... to
9 + n. Variable n After predictive model bots are initialized, the bots activate in accordance with the frequency specified by the user (20) in the system settings table (140). Once activated, the bots retrieve the required data from the appropriate table in the application database (50) and randomly partition the item variables, item performance indicators and composite variables into a training set and a test set. The software in block 306 uses "bootstrapping" where the different training data sets are created by re-sampling with replacement from the original training set so data records may occur more than once. The same sets of data will be used to train and then test each predictive model bot. When the predictive model bots complete their training and testing, processing advances to a block 307.

The software in block 307 determines if clustering improved the accuracy of the predictive models generated by the bots in software block 306. The software in block 307 uses a variable selection algorithm such as stepwise regression (other types of variable selection algorithms can be used) to combine the results from the predictive model bot analyses for each type of analysis—with and without clustering—to determine the best set of variables for each type of analysis. The type of analysis having the smallest amount of error as measured by applying the mean squared error algorithm to the test data is given preference in determining the best set of variables for use in later analysis. There are four possible outcomes from this analysis as shown in Table 25.

TABLE 25

1. Best model has no clustering
2. Best model has temporal clustering, no variable clustering
3. Best model has variable clustering, no temporal clustering
4. Best model has temporal clustering and variable clustering If the software in block 307 determines that clustering improves the accuracy of the predictive models, then processing advances to a software block 310. Alternatively, if clustering doesn't improve the overall accuracy of the predictive models, then processing advances to a software block 308.

The software in block 308 uses a variable selection algorithm such as stepwise regression (other types of variable selection algorithms can be used) to combine the results from the predictive model bot analyses for each model to determine the best set of variables for each model. The models having the smallest amount of error as measured by applying the mean squared error algorithm to the test data is given preference in determining the best set of variables. As a result of this processing, the best set of variables contain: the item variables, item performance indicators and composite variables that correlate most strongly with changes in the components of value. The best set of variables will hereinafter be referred to as the "value drivers". Eliminating low correlation factors from the initial configuration of the vector creation algorithms increases the efficiency of the next stage of system processing. Other error algorithms alone or in combination may be substituted for the mean squared error algorithm. After the best set of variables have been selected and stored in the element variables table (158) for all models at all levels, the software in block 308 tests the independence of the value drivers at the enterprise, element and sub-element level before processing advances to a block 309.

The software in block 309 checks the bot date table (149) and deactivates any causal model bots with creation dates before the current system date. The software in block 309 then retrieves the information from the system settings table (140), the metadata mapping table (141), the component of value definition table (156) and the element variables table (158) as required to initialize causal model bots for each enterprise, element of value and sub-element of value in accordance with the frequency specified by the user (20) in the system settings table (140).

Bots are independent components of the application that have specific tasks to perform. In the case of causal model bots, their primary task is to refine the item variable, item performance indicator and composite variable selection to reflect only causal variables. (Note: these variables are grouped together to represent an element vector when they are dependent). A series of causal model bots are initialized at this stage because it is impossible to know in advance which causal model will produce the "best" vector for the best fit variables from each model. The series for each model includes five causal model bot types: Tetrad, MML, LaGrange, Bayesian and path analysis. The software in block 309 generates this series of causal model bots for each set of variables stored in the element variables table (158) in the previous stage in processing. Every causal model bot activated in this block contains the information shown in Table 26.

TABLE 26

1. Unique ID number (based on date, hour, minute, second of creation)
2. Creation date (date, hour, minute, second)
3. Mapping information
4. Storage location
5. Component or subcomponent of value
6. Enterprise, Element or Sub-Element ID
7. Variable set
8. Causal model type After the causal model bots are initialized by the software in block 309, the bots activate in accordance with the frequency specified by the user (20) in the system settings table (140). Once activated, they retrieve the element variable information for each model from the element variables table (158) and sub-divides the variables into two sets, one for training and one for testing. The same set of training data is used by each of the different types of bots for each model. After the causal model bots complete their processing for each model, the software in block 309 uses a model selection algorithm to identify the model that best fits the data for each enterprise, element or sub-element being analyzed. For the system of the present invention, a cross validation algorithm is used for model selection. The software in block 309 saves the best fit causal factors in the vector table (159) in the application database (50) and processing advances to a block 312. The software in block 312 tests the value drivers or vectors to see if there are "missing" value drivers that are influencing the results. If the software in block 312 does not detect any missing value drivers, then system processing advances to a block 323. Alternatively, if missing value drivers are detected by the software in block 312, then processing advances to a software block 321.

If software in block 307 determines that clustering improves predictive model accuracy, then processing advances to block 310 as described previously. The software in block 310 uses a variable selection algorithm such as stepwise regression (other types of variable selection algorithms can be used) to combine the results from the predictive model bot analyses for each model and cluster to determine the best set of variables for each model. The models having the smallest amount of error as measured by applying the mean squared error algorithm to the test data is given preference in determining the best set of variables. As a result of this processing, the best set of variables contain: the item variables, item performance indicators and composite variables that correlate most strongly with changes in the components of value. The best set of variables will hereinafter be referred to as the "value drivers". Eliminating low correlation factors from the initial configuration of the vector creation algorithms increases the efficiency of the next stage of system processing. Other error algorithms alone or in combination may be substituted for the mean squared error algorithm. After the best set of variables have been selected and stored in the element variables table (158) for all models at all levels, the software in block 310 tests the independence of the value drivers at the enterprise, element and sub-element level before processing advances to a block 311.

The software in block 311 checks the bot date table (149) and deactivates any causal model bots with creation dates before the current system date. The software in block 311 then retrieves the information from the system settings table (140), the metadata mapping table (141), the component of value definition table (156) and the element variables table (158) as required to initialize causal model bots for each enterprise, element of value and sub-element of value at every level in accordance with the frequency specified by the user (20) in the system settings table (140).

Bots are independent components of the application that have specific tasks to perform. In the case of causal model bots, their primary task is to refine the item variable, item performance indicator and composite variable selection to reflect only causal variables. (Note: these variables are grouped together to represent a single element vector when they are dependent). In some cases it may be possible to skip the correlation step before selecting causal the item variable, item performance indicator and composite variables. A series of causal model bots are initialized at this stage because it is impossible to know in advance which causal model will produce the "best" vector for the best fit variables from each model. The series for each model includes four causal model bot types: Tetrad, LaGrange, Bayesian and path analysis. The software in block 311 generates this series of causal model bots for each set of variables stored in the element variables table (158) in the previous stage in processing. Every causal model bot activated in this block contains the information shown in Table 27.

TABLE 27

1. Unique ID number (based on date, hour, minute, second of creation)
2. Creation date (date, hour, minute, second)
3. Mapping information
4. Storage location
5. Component or subcomponent of value
6. Cluster (ID) and/or Regime (ID)

TABLE 27-continued

7. Enterprise, Element or Sub-Element ID
8. Variable set
9. Causal model type

After the causal model bots are initialized by the software in block 311, the bots activate in accordance with the frequency specified by the user (20) in the system settings table (140). Once activated, they retrieve the element variable information for each model from the element variable table (158) and sub-divides the variables into two sets, one for training and one for testing. The same set of training data is used by each of the different types of bots for each model. After the causal model bots complete their processing for each model, the software in block 311 uses a model selection algorithm to identify the model that best fits the data for each enterprise, element or sub-element being analyzed. For the system of the present invention, a cross validation algorithm is used for model selection. The software in block 311 saves the best fit causal factors in the vector table (159) in the application database (50) and processing advances to block 312. The software in block 312 tests the value drivers or vectors to see if there are "missing" value drivers that are influencing the results. If the software in block 312 doesn't detect any missing value drivers, then system processing advances to a block 323. Alternatively, if missing value drivers are detected by the software in block 312, then processing advances to a software block 321.

The software in block 321 prompts the user (20) via the variable identification window (710) to adjust the specification(s) for the affected enterprise, element of value or subelement of value. After the input from the user (20) is saved in the system settings table (140) and/or the element of value definition table (155), system processing advances to a software block 323. The software in block 323 checks the in the system settings table (140) and/or the element of value definition table (155) to see if there any changes in structure. If there have been changes in the structure, then processing advances to a block 205 and the system processing described previously is repeated. Alternatively, if there are no changes in structure, then processing advances to a block 325.

The software in block 325 checks the system settings table (140) in the application database (50) to determine if the current calculation is a new one. If the calculation is new, then processing advances to a software block 326. Alternatively, if the calculation is not a new calculation, then processing advances to a software block 333.

The software in block 326 checks the bot date table (149) and deactivates any vector generation bots with creation dates before the current system date. The software in block 326 then initializes bots for each element and sub-element of value for the enterprise. The bots activate in accordance with the frequency specified by the user (20) in the system settings table (140), retrieve the information from the system settings table (140), the metadata mapping table (141), the component of value definition table (156) and the element variables table (158) as required to initialize vector generation bots for each enterprise, element of value and sub-element of value in accordance with the frequency specified by the user (20) in the system settings table (140).

Bots are independent components of the application that have specific tasks to perform. In the case of vector generation bots, their primary task is to produce formulas, (hereinafter, vectors) that summarize the relationship between the item variables, item performance indicators and composite variables for the element or sub-element and changes in the component or sub-component of value being examined. (Note: these variables are simply grouped together to represent an element vector when they are dependent). A series of vector generation bots are initialized at this stage because it is impossible to know in advance which vector generation algorithm will produce the "best" vector for the best fit variables from each model. The series for each model includes four vector generation bot types: data fusion, polynomial, induction and LaGrange. Other vector generation algorithms can be used to the same effect. The software in block 326 generates this series of vector generation bots for each set of variables stored in the element variables table (158). Every vector generation bot contains the information shown in Table 28.

TABLE 28

1. Unique ID number (based on date, hour, minute, second of creation)
2. Creation date (date, hour, minute, second)
3. Mapping information
4. Storage location
5. Maximum number of regimes
6. Enterprise or Industry
7. Factor 1
... to
7 + n. Factor n When bots in block 326 have identified and stored vectors for all time periods with data, processing advances to a software block 327.

The software in block 327 checks the bot date table (149) and deactivates any temporal clustering bots with creation dates before the current system date. The software in block 327 then initializes bots for market value factors for each enterprise with a market price and for the industry. The bots activate in accordance with the frequency specified by the user (20) in the system settings table (140), retrieve the information from the system settings table (140), the metadata mapping table (141) and the sentiment factors table (169) as required and define regimes for the market value factor data before saving the resulting regime information in the application database (50).

Bots are independent components of the application that have specific tasks to perform. In the case of temporal clustering bots for market value factors, their primary tasks are to identify the best market value indicator (price, relative price, yield or first derivative of price change) to use for market factor analysis and then to segment the market value factors into distinct time regimes that share similar characteristics. The temporal clustering bots select the best value indicator by grouping the universe of stocks using each of the four value indicators and then comparing the clusters to the known groupings of the S&P 500. The temporal clustering bots then use the identified value indicator in the analysis of temporal clustering. The bots assign a unique id number to each "regime" it identifies and stores the unique id numbers in the cluster id table (157). Every time period with data is assigned to one of the regimes. The cluster id for each regime is also saved in the data record for each market value factor in the table where it resides. The market value factors are segmented into a number of regimes less than or equal to the maximum specified by the user (20) in the system settings table (140). The factors are segmented using a competitive regression algorithm that identifies an overall, global model before splitting the data and creating new models for the data in each partition. If the error from the two models is greater than the error from the global model, then there is only one regime in the data. Alternatively, if the two models produce lower error than the global model, then a third model is created. If the error from three models is lower than from two models then a fourth model is added. The process continues until adding a new model does not improve accuracy. Other temporal clustering algorithms may be used to the same effect. Every temporal clustering bot contains the information shown in Table 29.

TABLE 29

1. Unique ID number (based on date, hour, minute, second of creation)
2. Creation date (date, hour, minute, second)
3. Mapping information
4. Storage location
5. Maximum number of regimes
6. Enterprise or Industry
7. Value indicator (price, relative price, yield, derivative, etc.)
8. Factor 1
... to
8 + n. Factor n When bots in block 327 have identified and stored regime assignments for all time periods with data, processing advances to a software block 328.

The software in block 328 checks the bot date table (149) and deactivates any causal factor bots with creation dates before the current system date. The software in block 328 then retrieves the information from the system settings table (140), the metadata mapping table (141), the element of value definition table (155) and the sentiment factors table (169) as required to initialize causal market value factor bots for the enterprise and for the industry in accordance with the frequency specified by the user (20) in the system settings table (140).

Bots are independent components of the application that have specific tasks to perform. In the case of causal factor bots, their primary task is to identify the item variables, item performance indicators, composite variables and market value factors that are causal factors for stock price movement. (Note: these variables are grouped together when they are dependent). For each enterprise and industry the causal factors are those that drive changes in the value indicator identified by the temporal clustering bots. A series of causal factor bots are initialized at this stage because it is impossible to know in advance which causal factors will produce the "best" model for each enterprise and industry. The series for each model includes five causal model bot types: Tetrad, LaGrange, MML, Bayesian and path analysis. Other causal models can be used to the same effect. The software in block 328 generates this series of causal model bots for each set of variables stored in the element variables table (158) in the previous stage in processing. Every causal factor bot activated in this block contains the information shown in Table 30.

TABLE 30

1. Unique ID number (based on date, hour, minute, second of creation)
2. Creation date (date, hour, minute, second)
3. Mapping information
4. Storage location
6. Enterprise or Industry
7. Regime
8. Value indicator (price, relative price, yield, derivative, etc.)
9. Causal model type After the causal factor bots are initialized by the software in block 328, the bots activate in accordance with the frequency specified by the user (20) in the system settings table (140). Once activated, they retrieve the required information from the element of value definition table (155) and the sentiment factors table (169) and sub-divide the data into two sets, one for training and one for testing. The same set of training data is used by each of the different types of bots for each model. After the causal factor bots complete their processing for the enterprise and/or industry, the software in block 328 uses a model selection algorithm to identify the model that best fits the data for each enterprise or industry. For the system of the present invention, a cross validation algorithm is used for model selection. The software in block 328 saves the best fit causal factors in the sentiment factors table (169) in the application database (50) and processing advances to a block 329. The software in block 329 tests to see if there are "missing" causal market value factors that are influencing the results. If the software in block 329 does not detect any missing market value factors, then system processing advances to a block 330. Alternatively, if missing market value factors are detected by the software in block 329, then processing returns to software block 321 and the processing described in the preceding section is repeated.

The software in block 330 checks the bot date table (149) and deactivates any industry rank bots with creation dates before the current system date. The software in block 330 then retrieves the information from the system settings table (140), the metadata mapping table (141), the vector table (159) and the sentiment factors table (169) as required to initialize industry rank bots for the enterprise if it has a public stock market price and for the industry in accordance with the frequency specified by the user (20) in the system settings table (140).

Bots are independent components of the application that have specific tasks to perform. In the case of industry rank bots, their primary task is to determine the relative position of the enterprise being evaluated on the causal attributes identified in the previous processing step. (Note: these variables are grouped together when they are dependent). The industry rank bots use Data Envelopement Analysis (hereinafter, DEA) to determine the relative industry ranking of the enterprise being examined. The software in block 330 generates industry rank bots for the enterprise being evaluated. Every industry rank bot activated in this block contains the information shown in Table 31.

TABLE 31

1. Unique ID number (based on date, hour, minute, second of creation)
2. Creation date (date, hour, minute, second)
3. Mapping information
4. Storage location
5. Enterprise After the industry rank bots are initialized by the software in block 330, the bots activate in accordance with the frequency specified by the user (20) in the system settings table (140). Once activated, they retrieve the item variables, item performance indicators, composite variables and market value factors for the enterprise from the application database (50) and sub-divides the factors into two sets, one for training and one for testing. After the industry rank bots complete their processing for the enterprise the software in block 330 saves the industry ranks in the vector table (159) in the application database (50) and processing advances to a block 331.

The software in block 331 checks the bot date table (149) and deactivates any option bots with creation dates before the current system date. The software in block 331 then retrieves the information from the system settings table (140), the metadata mapping table (141), the basic financial system database (143), the external database table (146) and the advanced finance system table (147) as required to initialize option bots for the industry and the enterprise.

Bots are independent components of the application that have specific tasks to perform. In the case of option bots, their primary tasks are to calculate the discount rate to be used for valuing the real options and to value the real options for the industry and the enterprise. The discount rate for enterprise real options is calculated by adding risk factors for each causal soft asset to a base discount rate. The risk factor for each causal soft asset is determined by a two step process. The first step in the process divides the maximum real option discount rate (specified by the user in system settings) by the number of causal soft assets. The second step in the process determines if the enterprise is highly rated on the causal soft assets and determines an appropriate risk factor. If the enterprise is highly ranked on the soft asset, then the discount rate is increased by a relatively small amount for that causal soft asset. Alternatively, if the enterprise has a low ranking on a causal soft asset, then the discount rate is increased by a relatively large amount for that causal soft asset as shown below in Table 32.

TABLE 32

| Maximum discount rate = 50%, Causal soft assets = 5 Maximum risk factor/soft asset = 50%/5 = 10% | | |
|---|---|---|
| Industry Rank on Soft Asset | | % of Maximum |
| 1 | | 0% |
| 2 | | 25% |
| 3 | | 50% |
| 4 | | 75% |
| 5 or higher | | 100% |
| Causal Soft Asset: | Relative Rank | Risk Factor |
| Brand | 1 | 0% |
| Channel | 3 | 5% |
| Manufacturing Process | 4 | 7.5% |
| Strategic Alliances | 5 | 10% |
| Vendors | 2 | 2.5% |
| Subtotal | | 25% |
| Base Rate | | 12% |
| Discount Rate | | 37% |

The discount rate for industry options is calculated using a weighted average total cost of capital approach in a manner that is well known. The base discount rate for enterprise options is calculated using a total average cost of capital (TACC) approach shown below.

TACO=cost of debt $X$ (debt value/total value)+cost of equity $X$ (equity value/total value)+cost of insurance $X$ (insurance value/total value)

After the appropriate discount rates are determined, the value of each real option is calculated using Black Scholes algorithms in a manner that is well known. The real option can be valued using other algorithms including binomial, neural network or dynamic programming algorithms. The software in block 331 values option bots for the industry and the enterprise. Industry option bots utilize the industry cost of capital for all calculations.

Option bots contain the information shown in Table 33.

TABLE 33

1. Unique ID number (based on date, hour, minute, second of creation)
2. Creation date (date, hour, minute, second)
3. Mapping information
4. Storage location TABLE 33-continued 5. Industry or Enterprise ID
6. Real option type (Industry or Enterprise)
7. Real option
8. Allocation percentage (if applicable)

After the option bots are initialized, they activate in accordance with the frequency specified by the user (20) in the system settings table (140). After being activated, the bots retrieve information for the industry and the enterprise from the basic financial system database (143), the external database table (146) and the advanced finance system table (147) as required to complete the option valuation. After the discount has been determined the value of the real option is calculated using Black Schole's algorithms in a manner that is well known. The resulting values are then saved in the real option value table (162) in the application database (50) before processing advances to a block 332.

The software in block 332 uses the results of the DEA analysis in the prior processing block and the percentage of industry real options controlled by the enterprise to determine the allocation percentage for industry options. The more dominant the enterprise, as indicated by the industry rank for the intangible element indicators, the greater the allocation of industry real options. When the allocation of options has been determined and the resulting values stored in the real option value table (162) in the application database (50), processing advances to a block 333.

The software in block 333 checks the system settings table (140) in the application database (50) to determine if the current calculation is a new calculation or a structure change. If the calculation is not a new calculation, a value analysis or a structure change, then processing advances to a software block 341. Alternatively, if the calculation is new a value analysis or a structure change, then processing advances to a software block 343.

The software in block 341 checks the bot date table (149) and deactivates any cash flow bots with creation dates before the current system date. The software in the block then retrieves the information from the system settings table (140), the metadata mapping table (141) and the component of value definition table (156) as required to initialize cash flow bots for the enterprise in accordance with the frequency specified by the user (20) in the system settings table (140).

Bots are independent components of the application that have specific tasks to perform. In the case of cash flow bots, their primary tasks are to calculate the cash flow for the enterprise for every time period where data are available and to forecast a steady state cash flow for the enterprise. Cash flow is calculated using a well known formula where cash flow equals period revenue minus period expense plus the period change in capital plus non-cash depreciation/amortization for the period. The steady state cash flow is calculated for the enterprise using forecasting methods identical to those disclosed previously in U.S. Pat. No. 5,615,109 to forecast revenue, expenses, capital changes and depreciation separately before calculating the cash flow. The software in block 334 initializes cash flow bots for the enterprise.

Every cash flow bot contains the information shown in Table 34.

TABLE 34

1. Unique ID number (based on date, hour, minute, second of creation)
2. Creation date (date, hour, minute, second)
3. Mapping information

TABLE 34-continued

4. Storage location
5. Enterprise ID
6. Components of value

After the cash flow bots are initialized, the bots activate in accordance with the frequency specified by the user (20) in the system settings table (140). After being activated the bots retrieve the component of value information for the enterprise from the component of value definition table (156). The cash flow bots then complete the calculation and forecast of cash flow for the enterprise before saving the resulting values by period in the cash flow table (161) in the application database (50) before processing advances to a block 342.

The software in block 342 checks the bot date table (149) and deactivates any element life bots with creation dates before the current system date. The software in block 341 then retrieves the information from the system settings table (140), the metadata mapping table (141) and the element of value definition table (155) as required to initialize element life bots for each element and sub-element of value in the enterprise being examined.

Bots are independent components of the application that have specific tasks to perform. In the case of element life bots, their primary task is to determine the expected life of each element and sub-element of value. There are three methods for evaluating the expected life of the elements and sub-elements of value. Elements of value that are defined by a population of members or items (such as: channel partners, customers, employees and vendors) will have their lives estimated by analyzing and forecasting the lives of the members of the population. The forecasting of member lives will be determined by the "best" fit solution from competing life estimation methods including the Iowa type survivor curves, Weibull distribution survivor curves, Gompertz-Makeham survivor curves, polynomial equations and the forecasting methodology disclosed in U.S. Pat. No. 5,615,109. Elements of value (such as some parts of Intellectual Property i.e. patents) that have legally defined lives will have their lives calculated using the time period between the current date and the expiration date of the element or sub-element. Finally, elements of value and sub-element of value (such as brand names, information technology and processes) that may not have defined lives and that may not consist of a collection of members will have their lives estimated by comparing the relative strength and stability of the element vectors with the relative stability of the enterprise Competitive Advantage Period (CAP) estimate. The resulting values are stored in the element of value definition table (155) for each element and sub-element of value.

Every element life bot contains the information shown in Table 35.

TABLE 35

1. Unique ID number (based on date, hour, minute, second of creation)
2. Creation date (date, hour, minute, second)
3. Mapping information
4. Storage location
5. Element or Sub-Element of value
6. Life estimation method (item analysis, date calculation or relative CAP)

After the element life bots are initialized, they are activated in accordance with the frequency specified by the user (20) in the system settings table (140). After being activated, the bots retrieve information for each element and sub-element of value from the element of value definition table (155) as required to complete the estimate of element life. The resulting values are then saved in the element of value definition table (155) in the application database (50) before processing advances to a block 343.

The software in block 343 checks the system settings table (140) in the application database (50) to determine if the current calculation is a new calculation, a value analysis or a structure change. If the calculation is not a new calculation or a structure change, then processing advances to a software block 402. Alternatively, if the calculation is new or a structure change, then processing advances to a software block 345.

The software in block 345 checks the bot date table (149) and deactivates any component capitalization bots with creation dates before the current system date. The software in block 341 then retrieves the information from the system settings table (140), the metadata mapping table (141) and the component of value definition table (156) as required to initialize component capitalization bots for the enterprise.

Bots are independent components of the application that have specific tasks to perform. In the case of component capitalization bots, their task is to determine the capitalized value of the components and subcomponents of value, forecast revenue, expense or capital requirements for the enterprise in accordance with the formula shown in Table 36.

TABLE 36

Value = $F_{f1}/(1 + K) + F_{f2}/(1 + K)^2 + F_{f3}/(1 + K)^3 + F_{f4}/(1 + K)^4 + (F_{f4} \times (1 + g))/(1 + K)^5) + (F_{f4} \times (1 + g)^2)/(1 + K)^6) \ldots + (F_{f4} \times (1 + g)^N)/(1 + K)^{N+4})$ Where:
$F_{fx}$ = Forecast revenue, expense or capital requirements for year x after valuation date (from advanced finance system)
N = Number of years in CAP (from prior calculation)
K = Total average cost of capital – % per year (from prior calculation)
g = Forecast growth rate during CAP – % per year (from advanced financial system)

After the capitalized value of every component and sub-component of value is complete, the results are stored in the component of value definition table (156) in the application database (50).

Every component capitalization bot contains the information shown in Table 37.

TABLE 37

1. Unique ID number (based on date, hour, minute, second of creation)
2. Creation date (date, hour, minute, second)
3. Mapping information
4. Storage location
5. Enterprise ID
6. Component of value (revenue, expense or capital change)
7. Sub component of value After the component capitalization bots are initialized they activate in accordance with the frequency specified by the user (20) in the system settings table (140). After being activated, the bots retrieve information for each component and sub-component of value from the advanced finance system table (147) and the component of value definition table (156) as required to calculate the capitalized value of each component. The resulting values are then saved in the component of value definition table (156) in the application database (50) before processing advances to a block 347.

The software in block 347 checks the bot date table (149) and deactivates any element valuation bots with creation dates before the current system date. The software in block 347 then retrieves the information from the system settings table (140), the metadata mapping table (141), the element of value definition table (155), the component of value definition table (156) as required to initialize valuation bots for each element and sub-element of value.

Bots are independent components of the application that have specific tasks to perform. In the case of element valuation bots, their task is to calculate the contribution of every element of value and sub-element of value in the enterprise using the overall procedure outlined in Table 5. The first step in completing the calculation in accordance with the procedure outlined in Table 5, is determining the relative contribution of element and sub-element of value by using a series of predictive models to find the best fit relationship between:

1. The element of value vectors and the enterprise components of value; and
2. The sub-element of value vectors and the element of value they correspond to.

The system of the present invention uses 12 different types of predictive models to determine relative contribution: neural network; CART; projection pursuit regression; generalized additive model (GAM); GARCH; MMDR; redundant regression network; boosted Naïve Bayes Regression; the support vector method; MARS; linear regression; and stepwise regression to determine relative contribution. The model having the smallest amount of error as measured by applying the mean squared error algorithm to the test data is the best fit model. The "relative contribution algorithm" used for completing the analysis varies with the model that was selected as the "best-fit". For example, if the "best-fit" model is a neural net model, then the portion of revenue attributable to each input vector is determined by the formula shown in Table 38.

TABLE 38

$$\left(\sum_{k=1}^{k=m}\sum_{j=1}^{j=n} I_{jk} \times O_k \Big/ \sum_{j=1}^{j=n} I_{ik}\right) \left(\sum_{k=1}^{k=m}\sum_{j=1}^{j=n} I_{jk} \times O_k\right)$$

Where
$I_{jk}$ = Absolute value of the input weight from input node j to hidden node k
$O_k$ = Absolute value of output weight from hidden node k
m = number of hidden nodes
n = numbr of input nodes After the relative contribution of each enterprise, element of value and sub-element of value is determined, the results of this analysis are combined with the previously calculated information regarding element life and capitalized component value to complete the valuation of each: enterprise contribution, element of value and sub-element using the approach shown in Table 39.

TABLE 39

| Gross Value | Percentage | Element Life/ CAP | Net Value |
| --- | --- | --- | --- |
| Revenue value = $120M | 20% | 80% | Value = $19.2 M |
| Expense value = ($80M) | 10% | 80% | Value = ($6.4) M |
| Capital value = ($5M) | 5% | 80% | Value = ($0.2) M |
| Total value = $35M | | | |
| Net value for this element: | | | Value = $12.6 M |

The resulting values are stored in the element of value definition table (155) for each element and sub-element of value of the enterprise.

Every valuation bot contains the information shown in Table 40.

TABLE 40

1. Unique ID number (based on date, hour, minute, second of creation)
2. Creation date (date, hour, minute, second)
3. Mapping information
4. Storage location
5. Element of value or sub-element of value
6. Element of value ID After the valuation bots are initialized by the software in block 347 they activate in accordance with the frequency specified by the user (20) in the system settings table (140). After being activated, the bots retrieve information from the element of value definition table (155) and the component of value definition table (156) as required to complete the valuation. The resulting values are then saved in the element of value definition table (155) in the application database (50) before processing advances to a block 351.

The software in block 351 checks the bot date table (149) and deactivates any residual bots with creation dates before the current system date. The software in block 351 then retrieves the information from the system settings table (140), the metadata mapping table (141) and the element of value definition table (155) as required to initialize residual bots for the enterprise.

Bots are independent components of the application that have specific tasks to perform. In the case of residual bots, their task is to retrieve data as required from the element of value definition table (155) and the component of value definition table (156) and then calculate the residual going concern value for the enterprise in accordance with the formula shown in Table 41.

TABLE 41

Residual Going Concern Value = Total Current-Operation Value –
Σ Financial Asset Values – Σ Elements of Value Every residual bot contains the information shown in Table 42.

TABLE 42

1. Unique ID number (based on date, hour, minute, second of creation)
2. Creation date (date, hour, minute, second)
3. Mapping information
4. Storage location
5. Enterprise ID After the residual bots are initialized they activate in accordance with the frequency specified by the user (20) in the system settings table (140). After being activated, the bots retrieve information from the element of value definition table (155) and the component of value definition table (156) as required to complete the residual calculation for the enterprise. After the calculation is complete, the resulting values are then saved in the element of value definition table (155) in the application database (50) before processing advances to a block 352.

The software in block 352 checks the bot date table (149) and deactivates any sentiment calculation bots with creation dates before the current system date. The software in block 352 then retrieves the information from the system settings table (140), the metadata mapping table (141), the external database table (146), the element of value definition table (155), the component of value definition table (156) and the real option value table (162) as required to initialize sentiment calculation bots for the enterprise.

Bots are independent components of the application that have specific tasks to perform. In the case of sentiment calculation bots, their task is to retrieve data as required from: the external database table (146), the element of value definition table (155), the component of value definition table (156) and the real option value table (162) and then calculate the sentiment for the enterprise in accordance with the formula shown in Table 43.

TABLE 43

Sentiment = Total Market Value − Total Current-Operation Value − Σ Real Option Values Every sentiment calculation bot contains the information shown in Table 44.

TABLE 44

1. Unique ID number (based on date, hour, minute, second of creation)
2. Creation date (date, hour, minute, second)
3. Mapping information
4. Storage location
5. Enterprise ID After the sentiment calculation bots are initialized they activate in accordance with the frequency specified by the user (20) in the system settings table (140). After being activated, the bots retrieve information from the external database table (146), the element of value definition table (155), the component of value definition table (156) and the real option value table (162) as required to complete the sentiment calculation for each enterprise. After the calculation is complete, the resulting values are then saved in the enterprise sentiment table (166) in the application database (50) before processing advances to a block 353.

The software in block 353 checks the bot date table (149) and deactivates any sentiment analysis bots with creation dates before the current system date. The software in block 353 then retrieves the information from the system settings table (140), the metadata mapping table (141), the external database table (146), the element of value definition table (155), the component of value definition table (156), the real option value table (162), the enterprise sentiment table (166) and the sentiment factors table (169) as required to initialize sentiment analysis bots for the enterprise.

Bots are independent components of the application that have specific tasks to perform. In the case of sentiment analysis bots, their primary task is to determine the composition of the calculated sentiment by comparing the portion of overall market return that related to the different elements of value and the calculated valuation for each element of value as shown below in Table 45.

TABLE 45

Total Enterprise Market Value = $100 Billion, 10% related to Brand factors
Implied Brand Value = $100 Billion × 10% = $10 Billion
Valuation of Brand Element of Value = $6 Billion
Increase/(Decrease) in Enterprise Real Option Values Due to Brand = $1.5 Billion
Industry Option Allocation Due to Brand = $1.0 Billion
Brand Sentiment = $10 − $6 − $1.5 − $1.0 = $1.5 Billion Every sentiment analysis bot contains the information shown in Table 46.

TABLE 46

1. Unique ID number (based on date, hour, minute, second of creation)
2. Creation date (date, hour, minute, second)
3. Mapping information
4. Storage location
5. Enterprise ID After the sentiment analysis bots are initialized, they activate in accordance with the frequency specified by the user (20) in the system settings table (140). After being activated, the bots retrieve information from the system settings table (140), the metadata mapping table (141), the enterprise sentiment table (166) and the sentiment factors table (169) as required to analyze sentiment. The resulting breakdown of sentiment is then saved in the enterprise sentiment table (169) in the application database (50) before processing advances to a block 402.

Risk Reduction Bots

Figure 7:
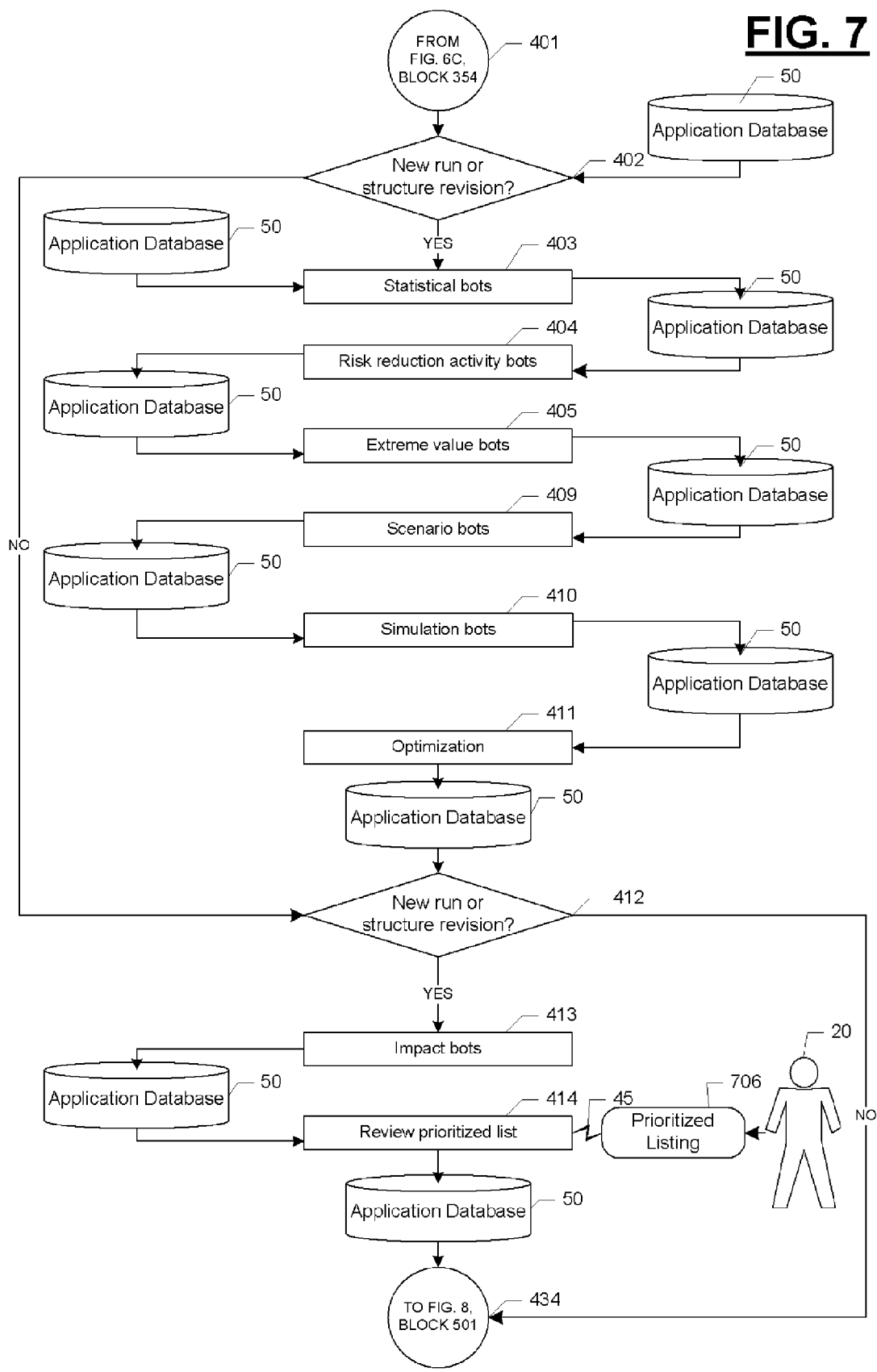
FIG. 7 is a block diagram showing the sequence of steps in the present invention used for developing the optimal risk reduction strategy for each enterprise.

The flow diagram in FIG. 7 details the processing that is completed by the portion of the application software (400) that analyzes and develops a risk reduction strategy for the commercial enterprise using the system.

System processing in this portion of the application software (400) begins in a block 402. The software in block 402 checks the system settings table (140) in the application database (50) to determine if the current calculation is a new calculation or a structure change. If the calculation is not a new calculation or a structure change, then processing advances to a software block 412. Alternatively, if the calculation is new or a structure change, then processing advances to a software block 403.

The software in block 403 checks the bot date table (149) and deactivates any statistical bots with creation dates before the current system date. The software in block 403 then retrieves the information from the system settings table (140), the external database table (146), the element of value definition table (155), the element variables table (158) and the sentiment factor table (169) as required to initialize statistical bots for each causal value driver and market value factor.

Bots are independent components of the application that have specific tasks to perform. In the case of statistical bots, their primary tasks are to calculate and store statistics such as mean, median, standard deviation, slope, average period change, maximum period change, variance and covariance for each causal value driver and market value factor for every regime. Covariance with the market as a whole is also calculated for each value driver and market value factor. Every statistical bot contains the information shown in Table 47.

TABLE 47

1. Unique ID number (based on date, hour, minute, second of creation)
2. Creation date (date, hour, minute, second)
3. Mapping information
4. Storage location
5. Regime
6. Value Driver or Market Value Factor When bots in block 403 have identified and stored statistics for each causal value driver and market value factor in the statistics table (170), processing advances to a software block 404.

The software in block 404 checks the bot date table (149) and deactivates any risk reduction activity bots with creation dates before the current system date. The software in block

404 then retrieves the information from the system settings table (140), the external database table (146), the element of value definition table (155), the element variables table (158), the sentiment factor table (169) and the statistics table (170) as required to initialize risk reduction activity bots for each causal value driver and market value factor.

Bots are independent components of the application that have specific tasks to perform. In the case of risk reduction activity bots, their primary tasks are to identify actions that can be taken by the enterprise to reduce risk. For example, if one customer presents a significant risk to the enterprise, then the risk reduction bot might identify a reduction in the credit line for that customer to reduce the risk. Every risk reduction activity bot contains the information shown in Table 48.

TABLE 48

1. Unique ID number (based on date, hour, minute, second of creation)
2. Creation date (date, hour, minute, second)
3. Mapping information
4. Storage location
5. Value driver or Market value factor When bots in block 404 have identified and stored risk reduction activities in the risk reduction activity table (179), processing advances to a software block 405.

The software in block 405 checks the bot date table (149) and deactivates any extreme value bots with creation dates before the current system date. The software in block 405 then retrieves the information from the system settings table (140), the external database table (146), the element of value definition table (155), the element variables table (158) and the sentiment factor table (169) as required to initialize extreme value bots in accordance with the frequency specified by the user (20) in the system settings table (140).

Bots are independent components of the application that have specific tasks to perform. In the case of extreme value bots, their primary task is to identify the extreme values for each causal value driver and market value factor. The extreme value bots use the Blocks method and the peak over threshold method to identify extreme values. Other extreme value algorithms can be used to the same effect. Every extreme value bot activated in this block contains the information shown in Table 49.

TABLE 49

1. Unique ID number (based on date, hour, minute, second of creation)
2. Creation date (date, hour, minute, second)
3. Mapping information
4. Storage location
5. Method
6. Value driver or Market value factor After the extreme value bots are initialized, they activate in accordance with the frequency specified by the user (20) in the system settings table (140). Once activated, they retrieve the required information from the system settings table (140), the external database table (146), the element of value definition table (155), the element variables table (158) and the sentiment factor table (169) and determine the extreme value range for each value driver or market value factor. The bot saves the extreme values for each causal value driver and market value factor in the statistics table (170) in the application database (50) and processing advances to a block 409.

The software in block 409 checks the bot date table (149) and deactivates any scenario bots with creation dates before the current system date. The software in block 409 then retrieves the information from the system settings table (140), the operation system table (144), the external database table (146), the advanced finance system table (147), the element of value definition table (155), the sentiment factors table (169) and the statistics table (170) as required to initialize scenario bots in accordance with the frequency specified by the user (20) in the system settings table (140).

Bots are independent components of the application that have specific tasks to perform. In the case of scenario bots, their primary task is to identify likely scenarios for the evolution of the causal value drivers and market value factors. The scenario bots use information from the advanced finance system and external databases to obtain forecasts for individual causal factors before using the covariance information stored in the statistics table (170) to develop forecasts for the other causal value drivers and factors under normal conditions. They also use the extreme value information calculated by the previous bots and stored in the statistics table (170) to calculate extreme scenarios. Every scenario bot activated in this block contains the information shown in Table 50.

TABLE 50

1. Unique ID number (based on date, hour, minute, second of creation)
2. Creation date (date, hour, minute, second)
3. Mapping information
4. Storage location
5. Type: Normal or Extreme
5. Enterprise After the scenario bots are initialized, they activate in accordance with the frequency specified by the user (20) in the system settings table (140). Once activated, they retrieve the required information and develop a variety of scenarios as described previously. After the scenario bots complete their calculations they save the resulting scenarios in the scenarios table (171) in the application database (50) and processing advances to a block 410.

The software in block 410 checks the bot date table (149) and deactivates any simulation bots with creation dates before the current system date. The software in block 410 then retrieves the information from the system settings table (140), the operation system table (144), the advanced finance system table (147), the element of value definition table (155), the external database table (156), the sentiment factors table (169), the statistics table (170), the scenarios table (171) and the generic risk table (178) as required to initialize simulation bots in accordance with the frequency specified by the user (20) in the system settings table (140).

Bots are independent components of the application that have specific tasks to perform. In the case of simulation bots, their primary task is to run three different types of simulations for the enterprise. The simulation bots run simulations of organizational financial performance and valuation using: the two types of scenarios generated by the scenario bots—normal and extreme, they also run an unconstrained genetic algorithm simulation that evolves to the most negative scenario. In addition to examining the economic factors that were identified in the previous analysis, the bots simulate the impact of generic risks like fire, earthquakes, floods and other weather-related phenomenal that are un-correlated with the economic scenarios. Every simulation bot activated in this block contains the information shown in Table 51.

TABLE 51

1. Unique ID number (based on date, hour, minute, second of creation)
2. Creation date (date, hour, minute, second)
3. Mapping information
4. Storage location
5. Type: Normal, Extreme or Genetic Algorithm
6. Enterprise After the simulation bots are initialized, they activate in accordance with the frequency specified by the user (20) in the system settings table (140). Once activated, they retrieve the required information and simulate the financial performance and value impact of the different scenarios. After the simulation bots complete their calculations, the resulting forecasts are saved in the simulations table (168) and the summary xml table (177) in the application database (50) and processing advances to a block 411.

The software in block 411 continually runs an analysis to define the optimal risk reduction strategy for each of the identified normal and extreme scenarios. It does this by first retrieving from the system settings table (140), the operation system table (144), the external database table (146), the advanced finance system table (147), the element of value definition table (155), the sentiment factors table (169), the statistics table (170), the scenario table (171), the risk reduction products table (173) and the risk reduction activity table (179) which is the information required to initialize the optimization algorithm. The software in the block determines the optimal mix of risk reduction products (derivative purchase, insurance purchase, etc.) and risk reduction activities (reducing credit limits for certain customers, shifting production from high risk to lower risk countries, etc.) for the company under each scenario given the confidence interval established by the user (20) in the system settings using a linear programming optimization algorithm. A multi criteria optimization determines the best mix for reducing risk under both normal and extreme scenarios. Other optimization algorithms can be used at this point and all optimizations consider the effect of changes in the cost of capital on the optimal solution. In any event, the resulting product and activity mix for each set of scenarios and the combined analysis is saved in the optimal mix table (175) and the xml summary table (177) in the application database (50) and the revised simulations are saved in the simulations table (168) before processing passes to a software block 412. The shadow prices from these optimizations are also stored in the risk reduction products table (173) and the xml summary table (177) for use in identifying new risk reduction products that the company may wish to purchase and/or new risk reduction activities the company may wish to develop.

The software in block 412 checks the system settings table (140) in the application database (50) to determine if the current calculation is a new calculation or a structure change. If the calculation is not a new calculation or a structure change, then processing advances to a software block 502. Alternatively, if the calculation is new or a structure change, then processing advances to a software block 413.

The software in block 413 checks the bot date table (149) and deactivates any impact bots with creation dates before the current system date. The software in block 413 then retrieves the information from the system settings table (140), the operation system table (144), the external database table (146), the advanced finance system table (147), the element of value definition table (155), the simulations table (168), the sentiment factors table (169), the statistics table (170), the scenario table (171) and the optimal mix table (175) as required to initialize value impact bots in accordance with the frequency specified by the user (20) in the system settings table (140).

Bots are independent components of the application that have specific tasks to perform. In the case of impact bots, their primary task is to determine the value impact of each risk reduction product and activity—those included in the optimal mix and those that aren't—on the different scenarios. Every impact bot contains the information shown in Table 52.

TABLE 52

1. Unique ID number (based on date, hour, minute, second of creation)
2. Creation date (date, hour, minute, second)
3. Mapping information
4. Storage location
5. Enterprise
6. Risk reduction product or activity After the value impact bots are initialized by the software in block 413, they activate in accordance with the frequency specified by the user (20) in the system settings table (140). After being activated, the bots retrieve information as required to revise the simulations of enterprise performance and determine the risk reduction impact of each product on each simulation. The resulting forecast of value impacts are then saved in the risk reduction products table (173) or the risk reduction activity table (179) as appropriate in the application database (50) before processing advances to a block 414.

The software in block 414 prepares and displays a listing from highest impact to lowest impact for each risk reduction product under the normal scenarios, the extreme scenarios and the combined (multi-criteria) analysis using the prioritized listing display window (706). The optimal mix for the normal and extreme scenarios are determined by calculating the weighted average sum of the different scenarios where the weighting is determined by the relative likelihood of the scenario. The display identifies the optimal mix from the combined analysis as the recommended solution for enterprise risk reduction. At this point, the user (20) is given the option of:

1. Editing (adding or deleting products and activities) from the recommended solution;
2. Selecting the optimal mix from the normal scenario;
3. Selecting and then editing the optimal mix from the normal scenarios;
4. Selecting the optimal mix from the extreme scenario;
5. Selecting and then editing the optimal mix from the extreme scenarios; or
6. Leaving the default choice in place.

After the user (20) has finished the review and the optional edit of the selected mix, any changes are saved in the optimal mix table (175) in the application database (50) and processing advances to a software block 502. It should be noted that the processing of the risk reduction bot segment can, with very minor changes, also be used to analyze the impact of value enhancing changes on the enterprise. This could include a value maximization analysis and/or a multi-criteria maximum value, minimum risk optimization.

Output

Figure 8:
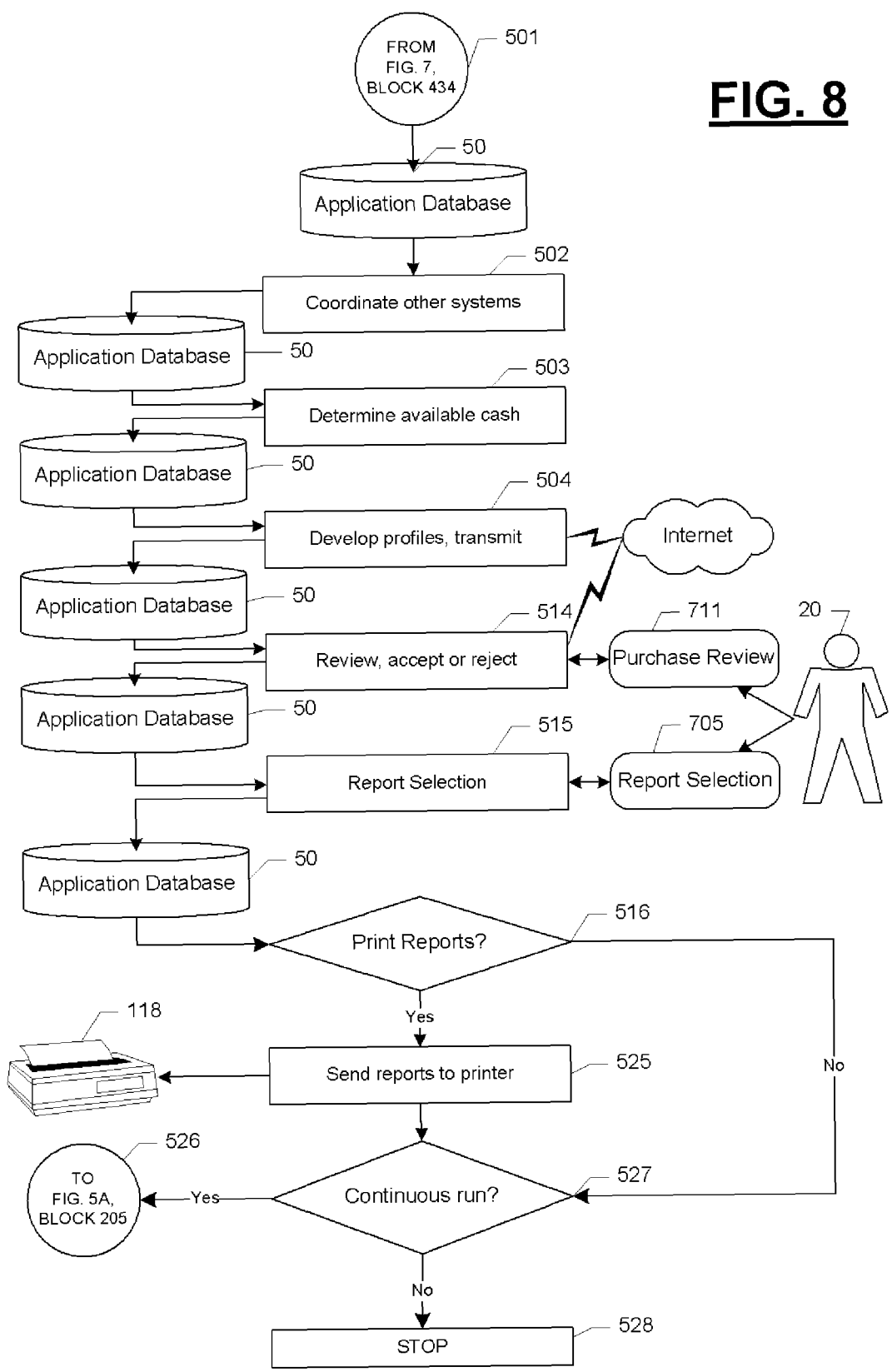
FIG. 8 is a block diagram showing the sequence of steps in the present invention used in communicating the summary information, printing reports, and receiving information concerning swaps and coverage from the central exchange.

The flow diagram in FIG. 8 details the processing that is completed by the portion of the application software (500) that generates a summary of the risk, liquidity and foreign exchange position of the company, places orders to purchase the optimal mix of risk reduction products and optionally prints management reports. Processing in this portion of the application starts in software block 502.

The software in block 502 checks the optimal mix table (175) in the application database (50) to determine which risk reduction activities have been included in the optimal mix. If risk reduction activities have been included in the optimal mix, then the software in this block prepares summaries of the changes and transmits them to the affected financial, operational and/or soft asset management system(s). For example, if the option to reduce the credit line for a certain customer has been accepted, then the customer relationship management system and the accounts receivable system will be updated with the new credit limit information by a transmission from the software in this block. Alternatively, if there are no risk reduction activities in the optimal mix, then processing advances directly to a software block 503.

The software in block 503 retrieves information from the system settings table (140) and the advanced finance system table (147) that is required to calculate the minimum amount of cash that will be available for investment in risk reduction during the next 36 month period. The system settings table (140) contains the minimum amount of cash and available securities that the user (20) indicated was required for enterprise operation while the advanced finance system table (147) contains a forecast of the cash balance for the enterprise for each period during the next 36 months. A summary of the available cash and cash deficits by currency, by month, by enterprise for the next 36 months is stored in a summary xml format in the xml summary table (177) during this stage of processing. After the amount of available cash for each enterprise is calculated and stored in the risk reduction purchase table (165), processing advances to a software block 504.

The software in block 504 assembles the previously developed summaries of cash position, foreign exchange requirements, risks, scenarios and statistics into a xml summary profile of the enterprise. This summary profile is transferred via the network (45) to a software block 604 to start the processing in block 600. The software in block 600 reviews the enterprise profile and develops a recommended list of products and/or swaps that the enterprise should purchase to reduce risk. The recommended list of products and/or swaps is then transmitted by a software block 616 via a network (45) to a software block 514.

After the software in block 504 transmits the summary profile, processing advances to a software block 507. The software in block 507 checks the summary profile to see if there are any new losses in the profile. If there are new losses, then the information regarding the losses is transmitted via a network (45) to a software block 618. After the software in block 618 analyzes the The software in block 514 analyzes the risk reduction products and swaps transmitted by the exchange to determine the percentage reduction in financial performance volatility that their purchase will produce for the enterprise. If the previously completed sentiment analysis indicated that financial performance volatility was a driver of market value, then the software in block 514 will retrieve the required information from the sentiment factors table (169) and estimate the value increase that will be produced by the decreased volatility. The software in block 514 also confirms that the products and/or swaps recommended by the exchange can be purchased using available cash for a total expenditure, counting both prior purchases and planned purchases, that is less than or equal to the maximum investment amount established by the user (20) in system settings table (140). If the planned purchases are within the guidelines established by the user (20), then the software generates a purchase order for the additional risk reduction products and/or swaps. Alternatively, if there isn't available cash or if the planned purchase exceeds the expenditure guideline established by the user (20), then a message indicating the problem(s) is prepared. In any event, the software in block 514 displays the resulting message or purchase order to the user (20) via the purchase review data window (711). The purchase review data window (711) also displays the estimate of value increase, if any, that the implementation of the risk reduction program will provide. The user (20) can optionally edit or confirm the purchase order, increase the amount that can be spent on risk reduction or chose to purchase a mix that is not the optimal mix. After the user (20) completes his or her review and optional edit, the software in block 514 transmits any orders to purchase the risk reduction products that were approved via the network (45) to a software block 617 which accepts the order transmits a confirmation. The software at this point could, of course, initialize one or more bots to search the various web sites and exchanges to get the best price for the company using the system of the present invention. In any event, the details of the purchase transaction and confirmation are then saved in the risk reduction purchase table (165) before processing advances to block 515.

The software in block 515 displays the report selection window (705) to the user (20). The user (20) optionally selects reports for printing. If the user (20) selects any reports for printing, then the information regarding the reports selected is saved in the reports table (164). After the user (20) has finished selecting reports, processing advances to a software block 516.

The software in block 516 checks the reports tables (164) to determine if any reports have been designated for printing. If reports have been designated for printing, then processing advances to a block 525. The software in block 525 sends the designated reports to the printer (118). After the reports have been sent to the printer (118), processing advances to a software block 527. Alternatively, if no reports were designated for printing, then processing advances directly from block 516 to block 527.

The software in block 527 checks the system settings table (140) to determine if the system is operating in a continuous run mode. If the system is operating in a continuous run mode, then processing returns to block 205 and the processing described previously is repeated. Alternatively, if the system is not running in continuous mode, then the processing advances to a block 528 where the system stops.

Exchange

Figure 9:
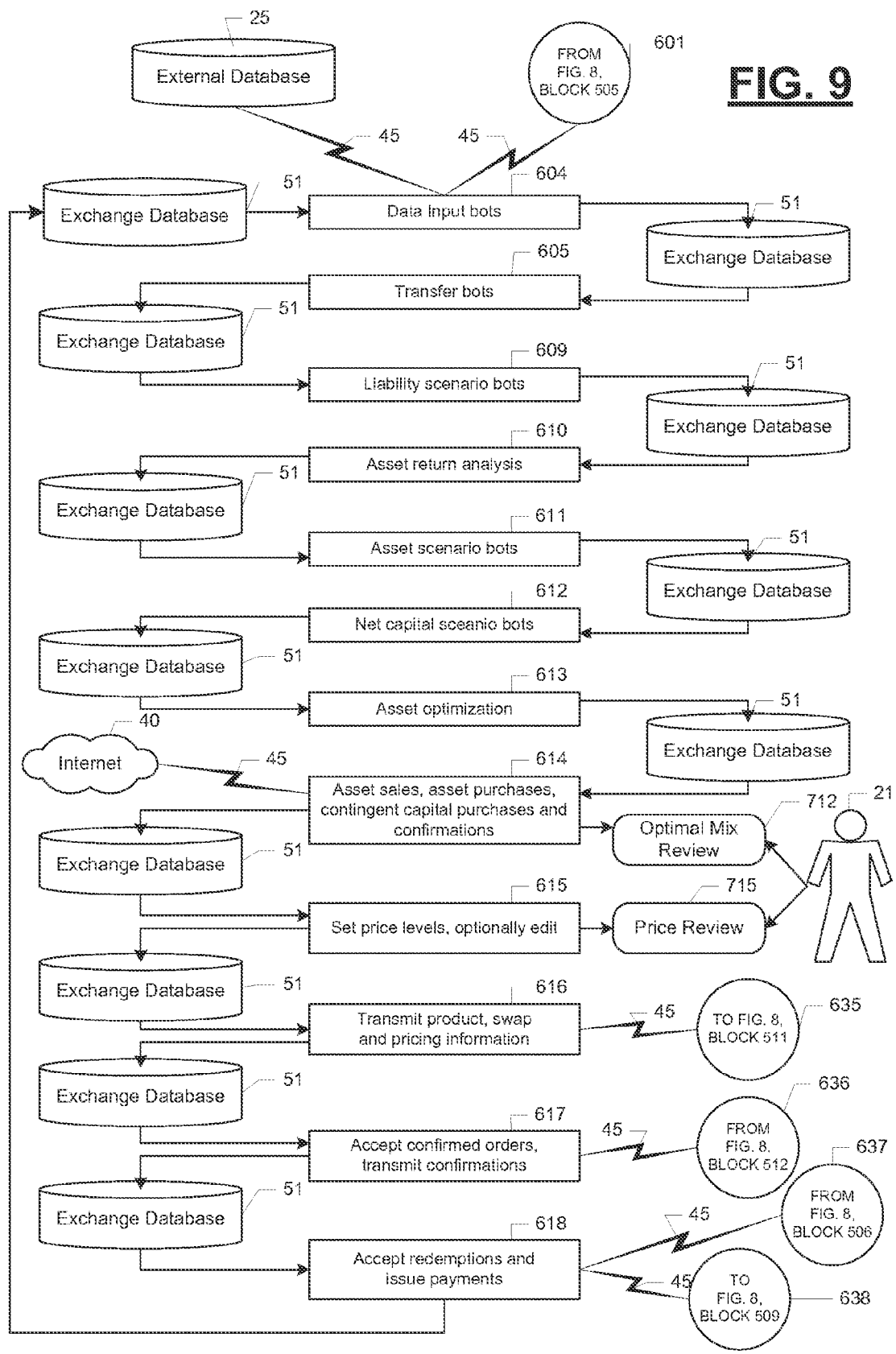
FIG. 9 is a block diagram showing the sequence in steps in the present invention used in operating the central exchange for risk transfer.

The flow diagram in FIG. 9 details the processing that is completed by the portion of the application software (600) that analyzes information from a number of enterprises and arranges for risk "swaps" and/or the sale of risk reduction products to each enterprise at a price that meets the profit goals and reserve requirements of the exchange. The description below will follow the processing and activities of the system of the present invention when one new customer profile is transmitted to the exchange.

System processing in this portion of the application software (400) begins in a block 602. The software in block 602 checks the exchange bot date table (181) in the exchange database (51) and deactivates any data bots with creation dates before the current system date. The software in block 602 then retrieves the information from the xml profile table (180), the customer table (182), the risk products table (183), the swaps table (184), the customer profiles table (185) the generic risk table (187), the external exchange database table (190) and the contingent capital table (195) as required to initialize exchange data bots.

Bots are independent components of the application that have specific tasks to perform. In the case of exchange data bots, their primary tasks are to:
1. Store the latest version of the customer profile in the customer profile table (182);
2. Update the external exchange database table (190) with information required to analyze asset returns on existing and potential investments;
3. Update the exchange generic risk table (187); and
4. Update the contingent capital table (195).

Every exchange data bot contains the information shown in Table 53.

TABLE 53

1. Unique ID number (based on date, hour, minute, second of creation)
2. Creation date (date, hour, minute, second)
3. Mapping information
4. Storage location
5. Type: Customer, Generic risk, Contingent Capital or External database When the bots in block 604 have stored the profile for the customer transmitting data to the exchange in the customer profiles table (185), the generic risk information in the generic risk table (187), the contingent capital information in the contingent capital table (195) and the external data required for asset return analysis in the external exchange database table (190) in the exchange database (51), processing advances to a software block 605.

The software in block 605 checks the exchange bot date table (181) and deactivates any transfer bots with creation dates before the current system date for the customer transmitting data to the exchange. The software in block 605 then retrieves the information from the xml profile table (180), the customer table (182), the risk products table (183), the swaps table (184) and the customer profile table (185) as required to initialize transfer bots for the enterprise transmitting a summary profile to the exchange.

Bots are independent components of the application that have specific tasks to perform. In the case of transfer bots, their primary tasks are to identify swaps, existing product and new products that can be made to satisfy the risk transfer needs of the enterprise transmitting data to the exchange. For example, if one enterprise has a significant risk from oil prices dropping (a heating oil company, for example) and another enterprise faces a significant risk when oil prices rise (a trucking company, for example), then the transfer bot will identify the offsetting risk factors and record a swap. If the risk transfer can be completed by both an existing risk transfer product and a swap, then preference is given to the swap. Every transfer bot contains the information shown in Table 54.

TABLE 54

1. Unique ID number (based on date, hour, minute, second of creation)
2. Creation date (date, hour, minute, second)
3. Mapping information
4. Storage location
5. Risk factor
6. Type: Swap, Existing product or New product
7. Amount(s)
8. Date(s)
9. Customer 1 (for swaps only)
... to
9 + n. Customer n (for swaps only)

After the transfer bot identifies the swaps, existing products and new products that will satisfy the needs of the enterprise for risk transfer the results are saved to the exchange database (51). Information on swaps is saved on the swaps table (184) and the customer profile table (185) and information on new products is saved in the risk products table (183) without a price. The price for new products will be established later in the processing. After data storage is complete, processing advances to a software block 609.

The software in block 609 checks the exchange bot date table (181) and deactivates any liability scenario bots with creation dates before the current system date. The software in block 605 then retrieves the information from the xml profile table (180), the customer table (182), the risk products table (183), the swaps table (184), the customer profile table (185), the exchange payout history table (186), the generic risk table (187) and the exchange premium history table (196) as required to initialize new liability scenario bots.

Bots are independent components of the application that have specific tasks to perform. In the case of liability scenario bots, their primary tasks are to create a series of scenarios estimating the net payout (premiums minus payout=net payout) associated the risks transferred via swaps or insurance from all customers. As with the prior analysis at the enterprise level, there are two types of scenarios developed at this stage of processing, normal scenarios and extreme scenarios. The scenarios are developed by combining the information and statistics from summary profiles transmitted by the customers of the exchange with the exchange payout history, the exchange premium history and generic risk information. Every liability scenario bot activated in this block contains the information shown in Table 55.

TABLE 55

1. Unique ID number (based on date, hour, minute, second of creation)
2. Creation date (date, hour, minute, second)
3. Mapping information
4. Storage location
5. Type: Extreme or Normal After the liability scenario bots are initialized, they retrieve the required information from the xml profile table (180), the customer table (182), the risk products table (183), the swaps table (184), the customer profile table (185), the exchange payout history table (186), the generic risk table (187), the external exchange database table (190) and the exchange premium history (196) before generating a series of net payout scenarios that are appropriate for the type of analysis being completed—extreme or normal. The bot saves the scenarios in the liability scenario table (188) in the exchange database (51) and processing advances to a block 610.

The software in block 610 continually completes analyses similar to those completed by the analysis bots in the enterprise portion of the system of the present invention. The software in this block uses the publicly available information stored in the external exchange database table (190) to complete the analyses shown in Table 56 for each equity investment listed in the asset position table (189) and described in data obtained from the external database (25).

TABLE 56

1. Identify market value factors causing changes in the equity market price;
2. Forecast the value of the current operation for the company as a function of the causal factors identified in 1 and prior performance using forecasting method for revenue, expense and capital change similar to that described in related U.S. Pat. No. 5,615,109;

TABLE 56-continued

3. Forecast the allocation of industry real options to the company on the basis of relative causal intangible element strength using forecasting method similar to that described in related U.S. Pat. No. 5,615,109; and
4. Forecast the income (dividends) provided by the equity as a function of the causal factors identified in 1 and prior performance The results of the first three forecasts (items 2, 3 and 4 from Table 56) are saved in the asset forecasts table (191) in the exchange database (51) and the market value factors (item 1 from Table 56) are saved with the appropriate equity in the asset position table (189). The software in this block uses the publicly available information stored in the external exchange database table (190) to complete the analyses shown in Table 56 for each income generating investments (i.e. bonds or real estate) listed in the asset position table (189) and described in data obtained from the external database (25).

TABLE 57

1. Identify the market value factors causing changes in the market price of the investment
2. Forecast the income provided by the investment as a function of the causal factors identified in 1 and prior performance The results of the forecast (items 2 from Table 57) are saved in the asset forecasts table (191) in the exchange database (51) and the market value factors (item 1 from Table 57) are saved with the appropriate investment in the asset position table (189). The software in block 610 then analyzes the covariance between the causal factors for each of the assets to determine the covariance between these assets under both normal and extreme conditions. The results of these analyses are then stored in the asset correlation table (192) before processing advances to a block 611.

The software in block 611 checks the exchange bot date table (181) and deactivates any asset scenario bots with creation dates before the current system date. The software in block 610 then retrieves the information from the asset position table (189), the external exchange database table (190) and the asset correlation table (192) as required to initialize the asset scenario bots.

Bots are independent components of the application that have specific tasks to perform. In the case of asset scenario bots, their primary task is to identify likely scenarios for the evolution of the causal market value factors. The asset scenario bots use information from the external databases to obtain forecasts for individual causal factors before using the covariance information stored in the asset correlation table (192) to develop scenarios for the other causal factors under normal and extreme conditions. Every scenario bot activated in this block contains the information shown in Table 58.

TABLE 58

1. Unique ID number (based on date, hour, minute, second of creation)
2. Creation date (date, hour, minute, second)
3. Mapping information
4. Storage location
5. Type: Normal or Extreme After the asset scenario bots are initialized, they retrieve the required information and develop a variety of normal and extreme scenarios as described previously. After the scenario bots complete their calculations they save the resulting scenarios in the asset scenario table (193) in the exchange database (51) and processing advances to a block 612.

The software in block 612 checks the exchange bot date table (181) and deactivates any net capital scenario bots with creation dates before the current system date. The software in block 612 then retrieves the information from the liability scenario table (183), and the asset scenario table (193) as required to initialize net capital scenarios bots.

Bots are independent components of the application that have specific tasks to perform. In the case of net capital scenario bots, their primary task is to run four different types of simulations for the exchange. The net capital scenario bots run simulations of the exchange financial performance using the two types of scenarios generated by the asset and liability scenario bots—normal and extreme. The net capital scenario bots also run an unconstrained genetic algorithm simulation that evolves to the most negative scenario and simulations specified by regulatory agencies. Every net capital scenario bot activated in this block contains the information shown in Table 59.

TABLE 59

1. Unique ID number (based on date, hour, minute, second of creation)
2. Creation date (date, hour, minute, second)
3. Mapping information
4. Storage location
5. Type: Normal, Extreme, Genetic Algorithm or Compliance After the net capital scenario bots are initialized, they retrieve the required information and simulate the financial performance of the exchange under the different scenarios. After the net capital scenarios complete their calculations, the resulting forecasts are saved in the exchange simulations table (194) in the exchange database (51) and processing advances to a block 613.

The software in block 613 checks the exchange bot date table (181) and deactivates any asset optimization bots with creation dates before the current system date. The software in block 613 then retrieves the information from the asset position table (189), the external exchange database table (190), the asset forecasts table (191), the asset correlation table (192), the asset scenario table (193), the exchange simulations table (194) and the as required to initialize asset optimization bots.

Bots are independent components of the application that have specific tasks to perform. In the case of asset optimization bots, their primary task is to determine the optimal mix of assets and risk reduction activities (purchase reinsurance and/or other contingent capital purchases, etc.) for the exchange under each scenario using a linear programming optimization algorithm that is constrained by any limitations imposed by regulatory requirements. A multi criteria optimization is also run at this stage to determine the best mix for maximizing value under both normal and extreme scenarios. A penalty function for asset liability mismatch can be added as required to minimize the difference between asset and liability lives. Other optimization algorithms can be used at this point to achieve the same result. Every asset optimization bot activated in this block contains the information shown in Table 60.

TABLE 60

1. Unique ID number (based on date, hour, minute, second of creation)
2. Creation date (date, hour, minute, second)
3. Mapping information
4. Storage location
5. Type: Normal, Extreme or Combined After the asset optimization bots complete their analyses, the resulting asset and contingent capital mix for each set of scenarios and the combined analysis is saved in the optimal exchange mix table (196) in the exchange database (51) and the revised simulations are saved in the exchange simulations table (194) before processing passes to a software block 614.

The software in block 614 prepares and displays the optimal mix of asset purchases, asset sales and contingent capital purchases for the normal, extreme and combined scenario analysis using the optimal mix review display window (712). The optimal mix for the normal and extreme scenarios are determined by calculating the weighted average sum of the different scenarios where the weighting is determined by the relative likelihood of the scenario. The display identifies the optimal mix from the combined analysis as the recommended solution for exchange value maximization. At this point, the exchange operator (21) is given the option of:

1) Editing (adding or deleting products and activities) from the recommended solution;
2) Selecting the optimal mix from the normal scenarios;
3) Selecting and then editing the optimal mix from the normal scenarios;
4) Selecting the optimal mix from the extreme scenarios;
5) Selecting and then editing the optimal mix from the extreme scenarios; or
6) Leaving the default choice in place.

After the exchange operator (21) has finished the review and the optional edit of the selected mix, any changes are saved in the optimal exchange mix table (196) in the exchange database (51). The new optimal mix is compared to the existing asset position stored in the asset position table (189) and orders are generated to purchase assets, sell assets and/or purchase contingent capital as required to bring the current asset position in line with the new optimal mix. These orders are then transmitted via a network (45) to other exchanges on the internet. When the order confirmations are received, the asset position table (189) is updated with the new information and processing advances to a block 615. It is worth noting at this point that the processing described in blocks 611, 612 and 614 could also be used to manage an investment portfolio on a stand alone basis.

The software in block 615 prepares and displays the proposed prices for the risk transfer products and the swaps that are being offered to the customer using the price review display window (715). The list prices from the risk products table (183) are used for the existing risk products. Pricing for swaps are calculated by marking up the cost of the swap by a standard amount. The software in block 615 marks up the calculated breakeven price for any new risk transfer products that were introduced by the bots in block 605. At this point, the exchange operator (21) is given the option of:

1) Editing the recommended prices for any and all of the risk transfers—swaps, existing products and new products;
2) Accepting the recommended prices; or
3) Removing some of swaps and/or risk transfer products from the list.

After the exchange operator (21) completes the review, all price changes and the prices for any new risk transfer products are saved in the risk products table (183) before processing advances to a block 616.

The software in block 616 transmits the information regarding the products, swaps and pricing that will be used to transfer the risks identified in the initial xml risk transfer summary from the customer to block 514. The transmission to the enterprise is in a summary xml format that is similar to the one initially transmitted to the exchange by the enterprise.

As described previously, the user (20) can reject, edit and/or accept the proposed mix of products and swaps contained in the xml risk transfer summary via the purchase review window (711). The information regarding the decisions made regarding the accepted risk transfers (swaps or purchases) is communicated via a network (45) by the software in block 514 to a software block 617. The software in block 617 accepts the confirmed orders, updates the information in the risk products table (183), the swaps table (184), the customer profiles table (185) and the exchange premium history table (197) before advancing to a software block 618.

The software in block 618 accepts input from block 507 regarding any new losses that are contained in the profiles being transmitted to the exchange. The software in block 618 verifies the loss is for an insured risk, updates the customer profiles table (185), updates the exchange payout history table (186) and arranges for payment of the claim in a manner that is well known. After the processing of claims is completed, exchange processing returns to block 604 and the process described above is repeated.

Thus, the reader will see that the system and method described above transforms extracted transaction data, corporate information, information from external databases and information from the internet into detailed valuations and risk analyses for specific elements of value within the enterprise and for the enterprise as a whole. The system and method described above goes on to use the detailed valuation and risk analysis information to develop and implement a comprehensive program of risk reduction activities and risk transfers specifically tailored to the enterprise using the system. The level of detail, breadth and speed of the risk analysis allows users of the system to manage their risks in an fashion that is superior to the method currently available to users of existing risk analysis systems and traditional insurance products.

Because the xml profiles used in the system (100) provide a comprehensive picture of the financial status of the companies transferring risk through the exchange, the system and method of the present invention can be used with essentially no modifications to provide an on-line transfer system for:

1. Foreign exchange;
2. Liquidity (aka credit);
3. Any combination of foreign exchange, liquidity and risk.

With relatively minor modifications the system of the present invention could be used to manage transfers of ownership rights alone or in combination with foreign exchange, liquidity and risk.

While the above description contains many specificity's, these should not be construed as limitations on the scope of the invention, but rather as an exemplification of one preferred embodiment thereof. Accordingly, the scope of the invention should be determined not by the embodiment illustrated, but by the appended claims and their legal equivalents.

The invention claimed is:

1. A computer-implemented method for performing an analysis of financial data, comprising the steps of:

storing, in a computer readable memory, financial data related to a population of financial data records and segmented into a number of categories, wherein the categories are mutually exclusive and collectively exhaustive of the financial data, and scenario data for one or more scenarios, wherein each of the scenarios is defined at least in part by a set of variables, and wherein the scenario data for each of the scenarios comprise at least some parameter values for the set of variables;

providing a computer processor associated with the computer readable memory with a model of an organization that physically exists defined at least in part by the set of variables;

processing, with the computer processor, the financial data and the scenario data using the model to obtain an estimated model outcome distribution comprising a distribution of estimated model outcomes relating to the organization and based on the one or more scenarios; and outputting the estimated model outcome distribution where the model of the organization is developed by learning from the financial data using an intelligent variable group modeling method and where the model of the organization comprises at least one predictive model for each of one or more components of value.

2. The computer-implemented method of claim 1, wherein the population of financial data records comprise one or more item variables and one or more factor variables obtained from one or more systems selected from the group consisting of advanced financial systems, basic financial systems, web site management systems, alliance management systems, brand management systems, customer relationship management systems, channel management systems, intellectual property management systems, process management systems, vendor management systems, operation management systems, sales management systems, human resource systems, accounts receivable systems, accounts payable systems, capital asset systems, inventory systems, invoicing systems, payroll systems, enterprise resource planning systems (ERP), material requirement planning systems (MRP), scheduling systems, supply chain management systems, quality control systems, purchasing systems, risk management systems and combinations thereof and wherein the population of financial data records further comprises one or more indicators and one or more composite variables where said indicators and composite variables are derived from the group consisting of item variables, factor variables and combinations thereof.

3. The computer-implemented method of claim 1, wherein the one or more categories of value comprise a current operation, a real option category of value and a market sentiment category of value.

4. The computer-implemented method of claim 1, wherein the processing of the financial data and the scenario data with the processor using the model to obtain the estimated model outcome distribution is repeated by one or more bots or intelligent agents in accordance with a frequency specified by a user.

5. The computer-implemented method of claim 1, wherein the method further comprises segmenting the financial data into the selected number categories before storing the financial data in the computer readable memory where the categories comprise current operation revenue, current operation expense, current operation capital change, real options and market sentiment.

6. The computer-implemented method of claim 1, wherein the model outcomes comprise measures of at least one risk.

7. The computer implemented method of claim 1, wherein developing the model of the organization by learning from the financial data using the intelligent variable group modeling method comprises developing the at least one predictive model for each of one or more components of value by:

using a plurality of predictive models and a plurality of causal models to analyze and select a portion of the data to use as a value driver when modeling the value contribution of each of one or more elements of value;

learning which model from a plurality of causal models comprises a best fit for modeling the value contribution of each of the one or more elements of value when using the selected value driver data where at least one of the one or more elements of value is represented by a variable group that comprises an input to each of the causal models;

learning which algorithm from a plurality of linear and nonlinear predictive model algorithms to include in the model for each of the components of value where at least one of the one or more elements of value is represented by a variable group that comprises an input into each of the linear and nonlinear predictive model algorithms; and learning a relative contribution of each of the elements of value to the value of the component of value where the plurality of causal models are selected from the group consisting of Tetrad, LaGrange, Bayesian and path analysis, where the elements of value physically exist and are selected from the group consisting of customers, equipment, partners and suppliers and where the plurality of predictive models are selected from the group consisting of classification and regression tree; projection pursuit regression; generalized additive model (GAM), redundant regression network; neural network, multivariate adaptive regression splines; linear regression; and stepwise regression when the variable group is being used as an input to represent the at least one of the elements of value in the component of value predictive model.

8. A non-transitory computer program product tangibly embodied on a computer readable medium and comprising a program code for directing at least one computer to perform an automated risk management method, comprising:

store, in a computer readable memory, financial data related to a population of financial data records and segmented into a number of categories, wherein the categories are mutually exclusive and collectively exhaustive of the financial data, and scenario data for one or more scenarios, wherein each of the scenarios is defined at least in part by a set of variables, and wherein the scenario data for each of the scenarios comprise at least some parameter values for the set of variables;

provide a computer processor associated with the computer readable memory with a model of an organization that physically exists defined at least in part by the set of variables;

process, with the computer processor, the financial data and the scenario data using the model to obtain an estimated model outcome distribution comprising a distribution of estimated model outcomes relating to the organization and based on the one or more scenarios; and output the estimated model outcome distribution where the model of the organization is developed by learning from the financial data using an intelligent variable group modeling method and where the model of the organization comprises at least one predictive model for each of one or more components of value.

9. The non-transitory computer program product of claim 8, wherein the wherein the population of financial data records comprise one or more item variables and one or more factor variables obtained from one or more systems selected from the group consisting of advanced financial systems, basic financial systems, web site management systems, alliance management systems, brand management systems, customer relationship management systems, channel management systems, intellectual property management systems, process management systems, vendor management systems, operation management systems, sales management systems, human resource systems, accounts receivable systems, accounts payable systems, capital asset systems, inventory systems, invoicing systems, payroll systems, enterprise resource planning systems (ERP), material requirement planning systems (MRP), scheduling systems, supply chain management systems, quality control systems, purchasing systems, risk management systems and combinations thereof and wherein the population of financial data records further comprises one or more indicators and one or more composite variables where said indicators and composite variables are derived from the group consisting of item variables, factor variables and combinations thereof.

10. The non-transitory computer program product of claim 8, wherein the one or more categories of value comprise a current operation, a real option category of value and a market sentiment category of value.

11. The non-transitory computer program product of claim 8, wherein the processing of the financial data and the scenario data with the processor using the model to obtain the estimated model outcome distribution is repeated by one or more bots or intelligent agents in accordance with a frequency specified by a user.

12. The non-transitory computer program product of claim 8, wherein the method further comprises segmenting the financial data into the selected number categories before storing the financial data in the computer readable memory where the categories comprise current operation revenue, current operation expense, current operation capital change, real options and market sentiment.

13. The non-transitory computer program product of claim 8, wherein the model outcomes comprise measures of at least one risk.

14. The non-transitory computer program product of claim 8, wherein developing the model of the organization by learning from the financial data using the intelligent variable group modeling method comprises developing the at least one predictive model for each of one or more components of value by:
using a plurality of predictive models and a plurality of causal models to analyze and select a portion of the data to use as a value driver when modeling the value contribution of each of one or more elements of value;
learning which model from a plurality of causal models comprises a best fit for modeling the value contribution of each of the one or more elements of value when using the selected value driver data where at least one of the one or more elements of value is represented by a variable group that comprises an input to each of the causal models;
learning which algorithm from a plurality of linear and nonlinear predictive model algorithms to include in the model for each of the components of value where each of the one or more elements of value are represented by a summary that comprises an input into each of the linear and nonlinear predictive model algorithms; and
learning a relative contribution of each of the elements of value to the value of the component of value
where the plurality of causal models are selected from the group consisting of Tetrad, LaGrange, Bayesian and path analysis, where the elements of value physically exist and are selected from the group consisting of customers, equipment, partners and suppliers and where the plurality of predictive models are selected from the group consisting of classification and regression tree; projection pursuit regression; generalized additive model (GAM), redundant regression network; neural network, multivariate adaptive regression splines; linear regression; and stepwise regression when a variable group is not being used as an input to represent at least one of the elements of value in the component of value predictive model.

15. An automated risk management system, comprising:
a computer with at least one processor having circuitry to execute instructions; a storage device available to each of said processors with sequences of instructions stored therein, which when executed cause at least one of the processors to:
store, in a computer readable memory, financial data related to a population of financial data records and segmented into a number of categories, wherein the categories are mutually exclusive and collectively exhaustive of the financial data, and scenario data for one or more scenarios, wherein each of the scenarios is defined at least in part by a set of variables, and wherein the scenario data for each of the scenarios comprise at least some parameter values for the set of variables;
provide the computer processors associated with the storage device with a model of an organization that physically exists defined at least in part by the set of variables;
process, with the computer processor, the financial data and the scenario data using the model to obtain an estimated model outcome distribution comprising a distribution of estimated model outcomes relating to the organization and based on the one or more scenarios; and
output the estimated model outcome distribution where the model of the organization is developed by learning from the financial data using an intelligent variable group modeling method and where the model of the organization comprises at least one predictive model for each of one or more components of value.

16. The system of claim 15, wherein the wherein the population of financial data records comprise one or more item variables and one or more factor variables obtained from one or more systems selected from the group consisting of advanced financial systems, basic financial systems, web site management systems, alliance management systems, brand management systems, customer relationship management systems, channel management systems, intellectual property management systems, process management systems, vendor management systems, operation management systems, sales management systems, human resource systems, accounts receivable systems, accounts payable systems, capital asset systems, inventory systems, invoicing systems, payroll systems, enterprise resource planning systems (ERP), material requirement planning systems (MRP), scheduling systems, supply chain management systems, quality control systems, purchasing systems, risk management systems and combinations thereof and wherein the population of financial data records further comprises one or more indicators and one or more composite variables where said indicators and composite variables are derived from the group consisting of item variables, factor variables and combinations thereof.

17. The system of claim 15, wherein the one or more categories of value comprise a current operation, a real option category of value and a market sentiment category of value.

18. The system of claim 15, wherein the processing of the financial data and the scenario data with the processors using the model to obtain the estimated model outcome distribution is repeated by one or more bots or intelligent agents in accordance with a frequency specified by a user.

19. The system of claim 15, the processors further segment the financial data into the selected number categories before storing the financial data in the computer readable memory where the categories comprise current operation revenue, current operation expense, current operation capital change, real options and market sentiment.

20. The system of claim 15, wherein developing the model of the organization by learning from the financial data using the intelligent variable group modeling method comprises developing the at least one predictive model for each of one or more components of value by:
  using a plurality of predictive models and a plurality of causal models to analyze and select a portion of the data to use as a value driver when modeling the value contribution of each of one or more elements of value;
  learning which model from a plurality of causal models comprises a best fit for modeling the value contribution of each of the one or more elements of value when using the selected value driver data where at least one of the one or more elements of value is represented by a variable group that comprises an input to each of the causal models;
  learning which algorithm from a plurality of linear and nonlinear predictive model algorithms to include in the model for each of the components of value where each of the one or more elements of value are is represented by a summary that comprises an input into each of the linear and nonlinear predictive model algorithms; and
  learning a relative contribution of each of the elements of value to the value of the component of value where the plurality of causal models are selected from the group consisting of Tetrad, LaGrange, Bayesian and path analysis, where the elements of value physically exist and are selected from the group consisting of customers, equipment, partners and suppliers and where the plurality of predictive models are selected from the group consisting of classification and regression tree; projection pursuit regression; generalized additive model (GAM), redundant regression network; neural network, multivariate adaptive regression splines; linear regression; and stepwise regression when a variable group is not being used as an input to represent at least one of the elements of value in the component of value predictive model.

* * * * *